(12) United States Patent
Irudayam et al.

(10) Patent No.: US 10,546,468 B2
(45) Date of Patent: Jan. 28, 2020

(54) ACCEPTING A CHECK DEPOSIT FROM A MOBILE DEVICE IN COMMUNICATION WITH AN AUTOMATED TELLER MACHINE

(71) Applicant: Diebold Nixdorf, Incorporated, North Canton, OH (US)

(72) Inventors: Sathish M. Irudayam, North Canton, OH (US); Nicholas Schott, North Canton, OH (US); Willis Miller, Cuyahoga Falls, OH (US); Matthew R. Zaugg, Munroe Falls, OH (US); James Block, North Lawrence, OH (US); H. Thomas Graef, Bolivar, OH (US); Natarajan Ramachandran, Monroe Township, NJ (US); Jeffrey M. Enright, Akron, OH (US); Mark A. Douglass, North Canton, OH (US)

(73) Assignee: Diebold Nixforf Incorporated, North Canton, OH (US)

( * ) Notice: Subject to any disclaimer, the term of this patent is extended or adjusted under 35 U.S.C. 154(b) by 294 days.

(21) Appl. No.: 15/584,279

(22) Filed: May 2, 2017

(65) Prior Publication Data
US 2017/0236101 A1  Aug. 17, 2017

Related U.S. Application Data

(63) Continuation of application No. 13/963,529, filed on Aug. 9, 2013, now Pat. No. 9,640,040.
(Continued)

(51) Int. Cl.
*G06Q 40/00* (2012.01)
*G07D 11/00* (2019.01)
(Continued)

(52) U.S. Cl.
CPC ......... *G07F 19/202* (2013.01); *G06Q 20/042* (2013.01); *G06Q 20/32* (2013.01);
(Continued)

(58) Field of Classification Search
USPC ........................................................ 235/379
See application file for complete search history.

(56) References Cited

U.S. PATENT DOCUMENTS

| | | | |
|---|---|---|---|
| 2006/0041506 A1* | 2/2006 | Mason | G06Q 10/10 705/42 |
| 2006/0243806 A1* | 11/2006 | Goodman | G06K 1/12 235/462.13 |
| 2010/0318461 A1* | 12/2010 | Smith | G06Q 20/042 705/43 |

* cited by examiner

*Primary Examiner* — Tuyen K Vo
(74) *Attorney, Agent, or Firm* — Black, McCuskey, Souers & Arbaugh, LPA

(57) ABSTRACT

An automated banking machine operates to cause financial transfers responsive at least in part to data read from data bearing records. The automated banking machine includes a card reader that is operative to read card data corresponding to financial accounts from user cards. The card data is linked in at least one data store to data indicating that the card data corresponds to a financial account that is authorized to be used to conduct at least one transaction through use of the automated banking machine. The automated banking machine may be used to carry out financial transfers involving financial accounts by users who are determined to be authorized users of such accounts. Data corresponding to a financial account can also be linked to a mobile wireless device so as to enable financial transfers by authorized users of such accounts.

20 Claims, 37 Drawing Sheets

Related U.S. Application Data

(60) Provisional application No. 61/742,391, filed on Aug. 9, 2012.

(51) Int. Cl.
| | | |
|---|---|---|
| *G07F 19/00* | (2006.01) | |
| *G06Q 20/32* | (2012.01) | |
| *G06Q 20/40* | (2012.01) | |
| *G06Q 20/42* | (2012.01) | |
| *G06Q 20/04* | (2012.01) | |

(52) U.S. Cl.
CPC ........... *G06Q 20/40* (2013.01); *G06Q 20/401* (2013.01); *G06Q 20/4016* (2013.01); *G06Q 20/425* (2013.01); *G07F 19/00* (2013.01)

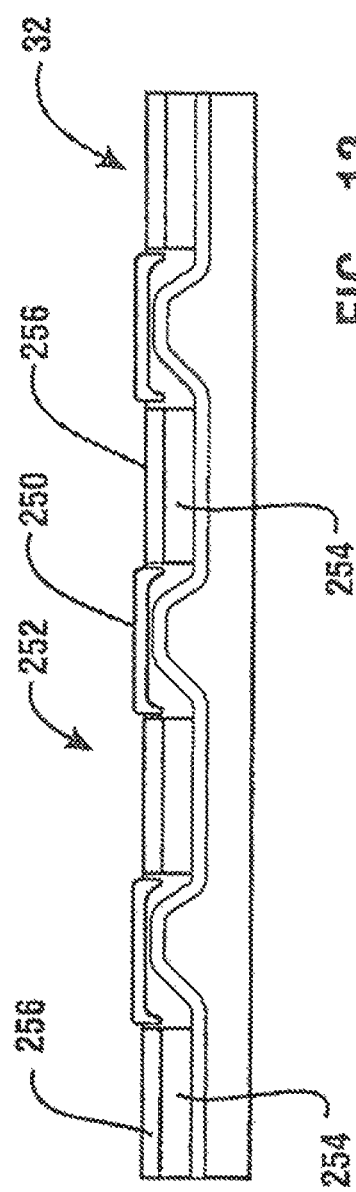
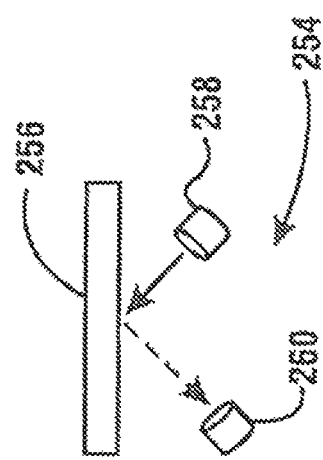

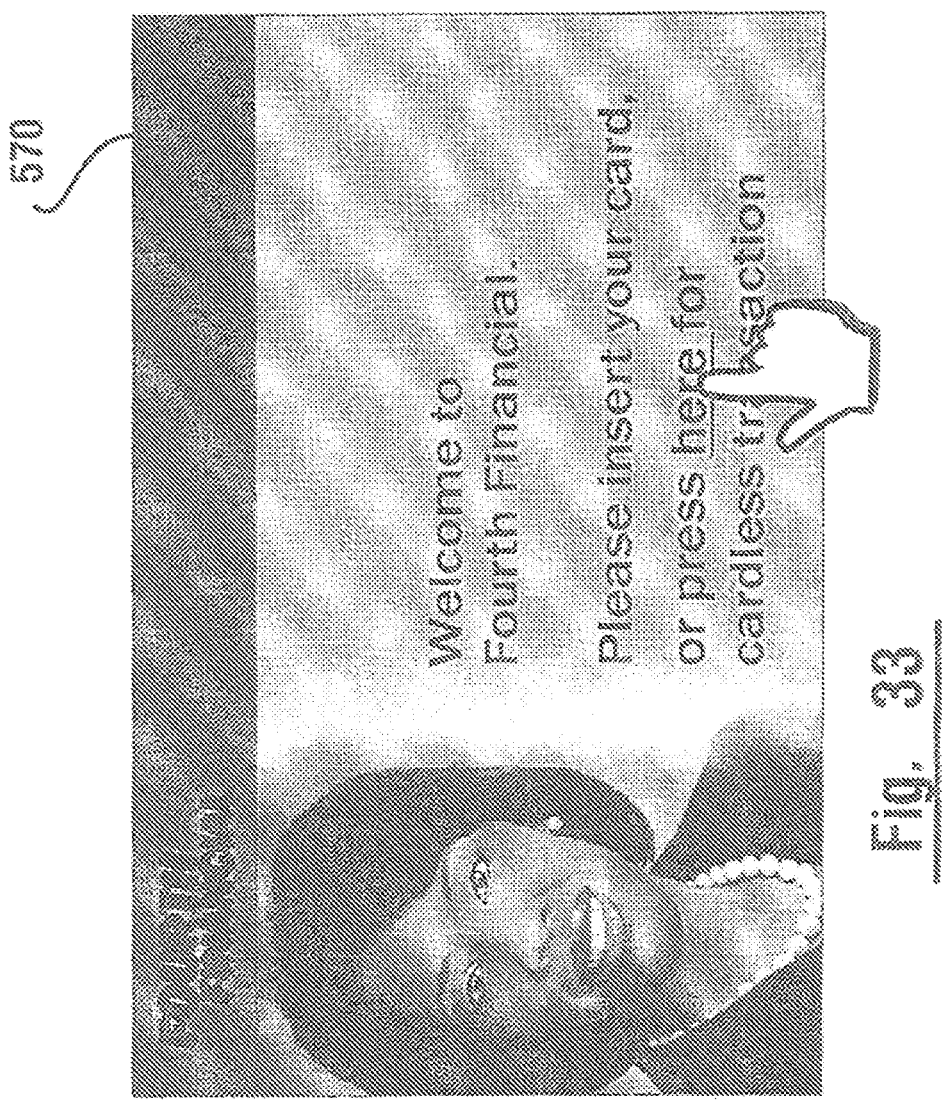
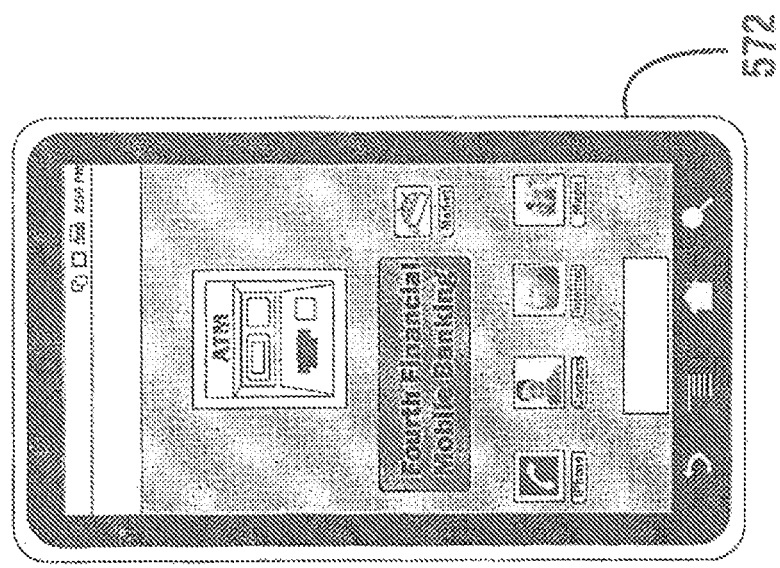
Fig. 33

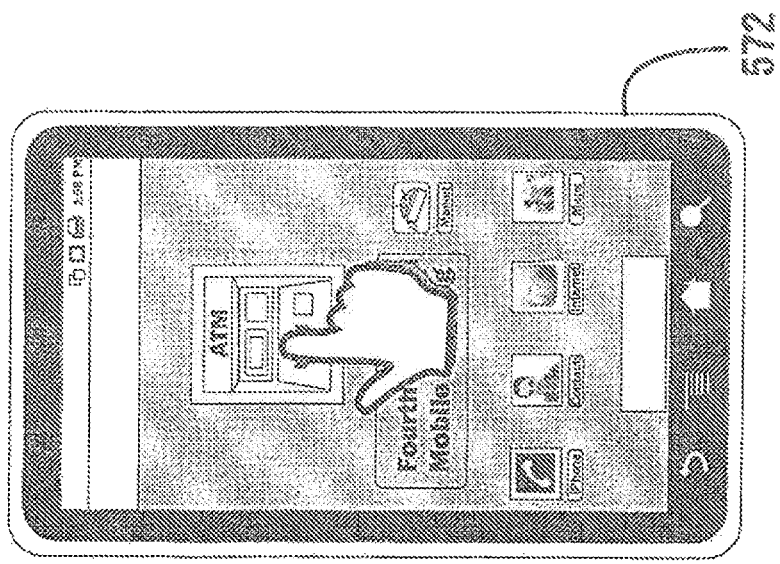
Fig. 34

ACCEPTING A CHECK DEPOSIT FROM A MOBILE DEVICE IN COMMUNICATION WITH AN AUTOMATED TELLER MACHINE

CROSS REFERENCE TO RELATED APPLICATIONS

This application is a continuation of U.S. application Ser. No. 13/963,529 filed on Aug. 9, 2013, now U.S. Pat. No. 9,640,040 that claims the benefit of U.S. Provisional Application No. 61/742,391 filed Aug. 9, 2012.

TECHNICAL FIELD

This invention relates to automated banking machines that operate responsive to data read from data bearing records including user cards

BACKGROUND ART

Automated banking machines may include a card reader that operates to read data from a bearer record such as a user card. Automated banking machines may operate to cause the data read from the card to be compared with other computer stored data related to the bearer or their financial accounts. The machine operates in response to the comparison determining that the bearer record corresponds to an authorized user or an authorized account, to carry out at least one transaction which may be operative to transfer value to or from at least one financial account. A record of the transaction is also often printed through operation of the automated banking machine and provided to the user. Automated banking machines may be used to carry out transactions such as dispensing cash, the making of deposits, the transfer of funds between accounts and account balance inquiries. The types of banking transactions that may be carried out are determined by the capabilities of the particular banking machine and system, as well as the programming of the institution operating the machine.

Other types of automated banking machines may be operated by merchants to carry out commercial transactions. These transactions may include, for example, the acceptance of deposit bags, the receipt of checks or other financial instruments, the dispensing of rolled coin, or other transactions required by merchants. Still other types of automated banking machines may be used by service providers in a transaction environment such as at a bank to carry out financial transactions. Such transactions may include for example, the counting and storage of currency notes or other financial instrument sheets, the dispensing of notes or other sheets, the imaging of checks or other financial instruments, and other types of transactions. For purposes of this disclosure an automated banking machine, automated transaction machine or an automated teller machine (ATM) shall be deemed to include any machine that may be used to automatically carry out transactions involving transfers of value.

BRIEF DESCRIPTION OF DRAWINGS

FIG. 12 is an exemplary side, cross sectional view of an automated banking machine keypad.

FIG. 13 is a schematic representation of a sensor for sensing whether an unauthorized key input sensing device has been placed adjacent to the keypad.

FIG. 33 is an exemplary view of an output from an automated banking machine that enables carrying out transactions through a mobile wireless device.

FIG. 34 shows a further screen that is output through an automated banking machine in connection with carrying out transactions through a mobile wireless device.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein, an apparatus comprising an automated banking machine that operates to cause financial transfers responsive at least in part to data read from data bearing records. The automated banking machine comprises a card reader operative to read card data from a card associated with a user that correspond to a financial account, an input device operative to receive inputs from a user, a cash dispenser operative to selectively cause cash stored in the machine to be accessible to the associated user, and an automated banking machine computer operatively coupled with the card reader and the input device. The automated banking machine computer is operable to obtain card data from a card associated with the associated user from the card reader, and determine from the card data a financial account for conducting a transaction. The automated banking machine computer is operable to receive data representative of a check from the input device, wherein the data representative of the check corresponds to check data that was sent from a mobile device to a remote computer associatively coupled with the automated banking machine computer via a communication path that does not include the automated banking machine.

In accordance with an example embodiment, there is disclosed herein, an apparatus comprising an automated banking machine that operates to cause financial transactions responsive in part to data read from data bearing records. The automated banking machine comprises a card reader that is operative to read card data from a card associated with a financial account associated with a user, an input device that is operative to receive inputs from the user, and an automated banking machine computer that is coupled with the card reader, an input device, and the output device. The automated banking machine computer obtains card data from the card reader and determines the financial account associated with the user. The automated banking machine computer is operative to determine that a merchant affinity program is associated with the card data and cause a promotional offer associated with the merchant affinity program to be output via the output device.

In accordance with an example embodiment, there is disclosed herein,

DESCRIPTION OF EXAMPLE EMBODIMENTS

Figure 1:
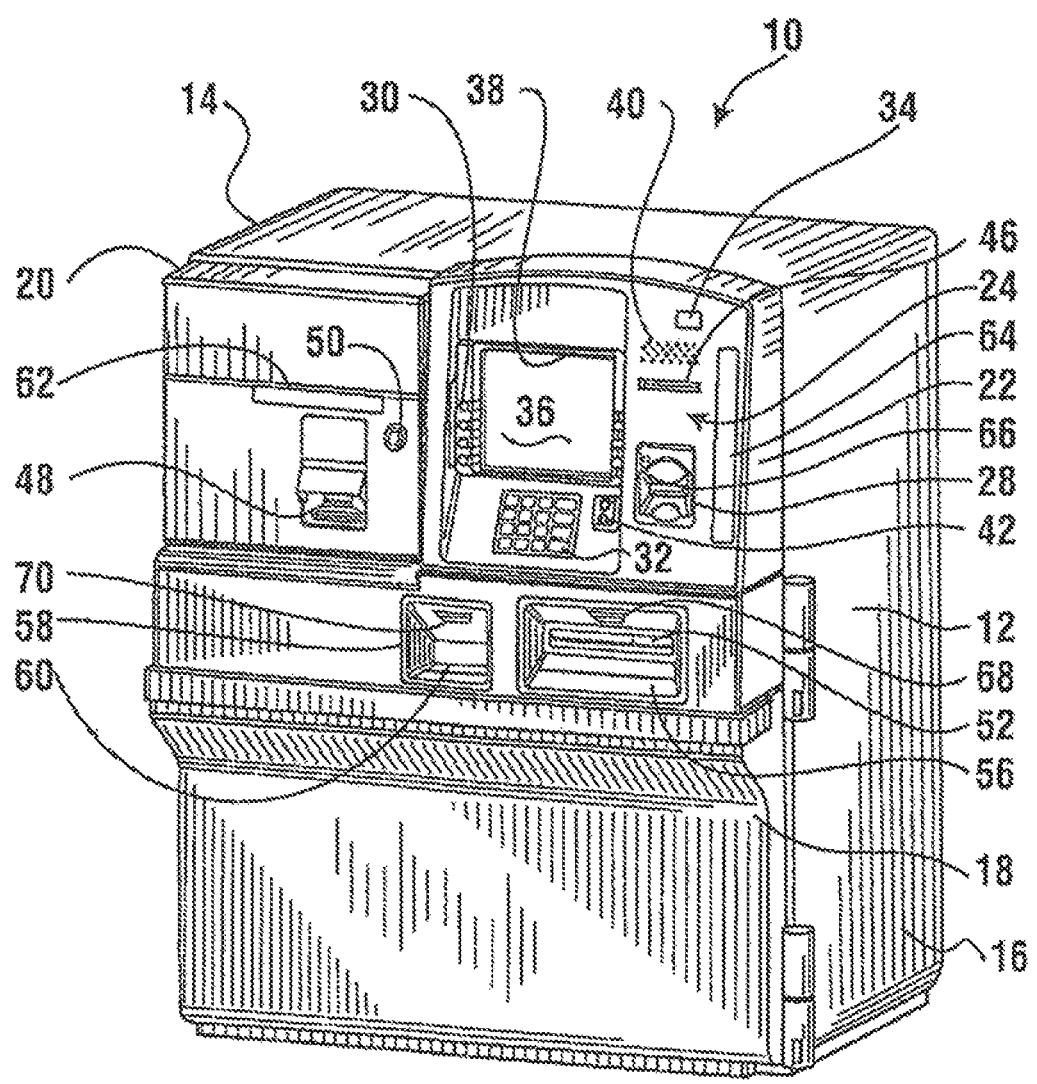
FIG. 1 is an isometric external view of an exemplary automated banking machine which is an automated banking machine and which incorporates some aspects and features described in the present application.

Referring now to the drawings and particularly to FIG. 1, there is shown therein an exemplary embodiment of an automated banking machine generally indicated 10. In the exemplary embodiment automated banking machine 10 is a drive up machine, however the features described and claimed herein are not necessarily limited to machines of this type. The exemplary machine includes a housing 12. Housing 12 includes an upper housing area 14 and a secure chest area 16 in a lower portion of the housing. Access to the chest area 16 is controlled by a chest door 18 which when unlocked by authorized persons in the manner later explained, enables gaining access to the interior of the chest area.

The exemplary machine 10 further includes a first fascia portion 20 and a second fascia portion 22. Each of the fascia portions is movably mounted relative to the housing as later explained, which in the exemplary embodiment facilitates servicing.

The machine includes a user interface generally indicated 24. The exemplary user interface includes input devices such as a card reader 26 (shown in FIG. 3) which is in connection with a card reader slot 28 which extends in the second fascia portion. Other input devices of the exemplary user interface 24 include function keys 30 and a keypad 32. The exemplary machine 10 also includes a camera 34 which operates as an image capture device and which also may serve as an input device for biometric features and the like. The exemplary user interface 24 also includes output devices such as a display 36. Display 36 is viewable by an operator of the machine when the machine is in the operative condition through an opening 38 in the second fascia portion 22. Further output devices in the exemplary user interface include a speaker 40. A headphone jack 42 also serves as an output device. The headphone jack may be connected to a headphone provided by a user who is visually impaired to provide the user with voice guidance in the operation of the machine. The exemplary machine further includes a receipt printer 44 (see FIG. 3) which is operative to provide users of the machine with receipts for transactions conducted. Transaction receipts are provided to users through a receipt delivery slot 46 which extends through the second fascia portion. Exemplary receipt printers that may be used in some embodiments are shown in U.S. Pat. Nos. 5,729,379 and 5,850,075, the entire disclosures of which are incorporated by reference herein. It should be understood that these input and output devices of the user interface 24 are exemplary and in other embodiments, other or different input and output devices may be used.

In the exemplary embodiment the second fascia portion has included thereon a deposit envelope providing opening 48. Deposit envelopes may be provided from the deposit envelope providing opening to users who may place deposits in the machine. The second fascia portion 20 also includes a fascia lock 50. Fascia lock 50 is in operative connection with the second fascia portion and limits access to the portion of the interior of the upper housing behind the fascia to authorized persons. In the exemplary embodiment fascia lock 50 comprises a key type lock. However, in other embodiments other types of locking mechanisms may be used. Such other types of locking mechanisms may include for example, other types of mechanical and electronic 20 locks that are opened in response to items, inputs, signals, conditions, actions or combinations or multiples thereof.

The exemplary machine 10 further includes a delivery area 52. Delivery area 52 is in connection with a currency dispenser device 54 which is alternatively referred to herein as a cash dispenser, which is positioned in the chest portion and is shown schematically in FIG. 3. For purposes hereof, a cash dispenser shall be deemed to include any device that causes stored currency such as coins and/or currency bills that are stored in the machine to be made available externally of the machine so that they may be taken by machine users. The delivery area 52 is a transaction area on the machine in which currency sheets are delivered to a user. In the exemplary embodiment the delivery area 52 is positioned and extends within a recessed pocket 56 in the housing of the machine.

Machine 10 further includes a deposit acceptance area 58. Deposit acceptance area is an area through which deposits such as deposit envelopes to be deposited by users are placed in the machine. The deposit acceptance area 58 is in operative connection with a deposit accepting device positioned in the chest area 16 of the machine. Exemplary types of deposit accepting devices are shown in U.S. Pat. Nos. 4,884,769 and 4,597,330, the entire disclosures of which are incorporated herein by reference.

In the exemplary embodiment the deposit acceptance area serves as a transaction area of the machine and is positioned and extends within a recessed pocket 60. It should be understood that while the exemplary embodiment of machine 10 includes an envelope deposit accepting device and a currency sheet dispenser device, other or different types of transaction function devices may be included in automated banking machines. These may include for example, check and/or money order accepting devices, ticket accepting devices, stamp accepting devices, card dispensing devices, money order dispensing devices and other types of devices which are operative to carry out transaction functions.

In the exemplary embodiment the machine 10 includes certain illuminating devices which are used to illuminate transaction areas, some of which are later discussed in detail. First fascia portion 20 includes an illumination panel 62 for illuminating the deposit envelope providing opening. Second fascia portion 22 includes an illumination panel 64 for illuminating the area of the receipt delivery slot 46 and the card reader slot 28. Further, an illuminated housing 66 later discussed in detail, bounds the card reader slot 28. Also, in the exemplary embodiment an illuminating window 68 is positioned in the recessed pocket 56 of the delivery area 52. An illuminating window 70 is positioned in the recessed pocket 60 of the deposit acceptance area 58. It should be understood that these structures and features are exemplary and in other embodiments other structures and features may be used.

Figure 3:
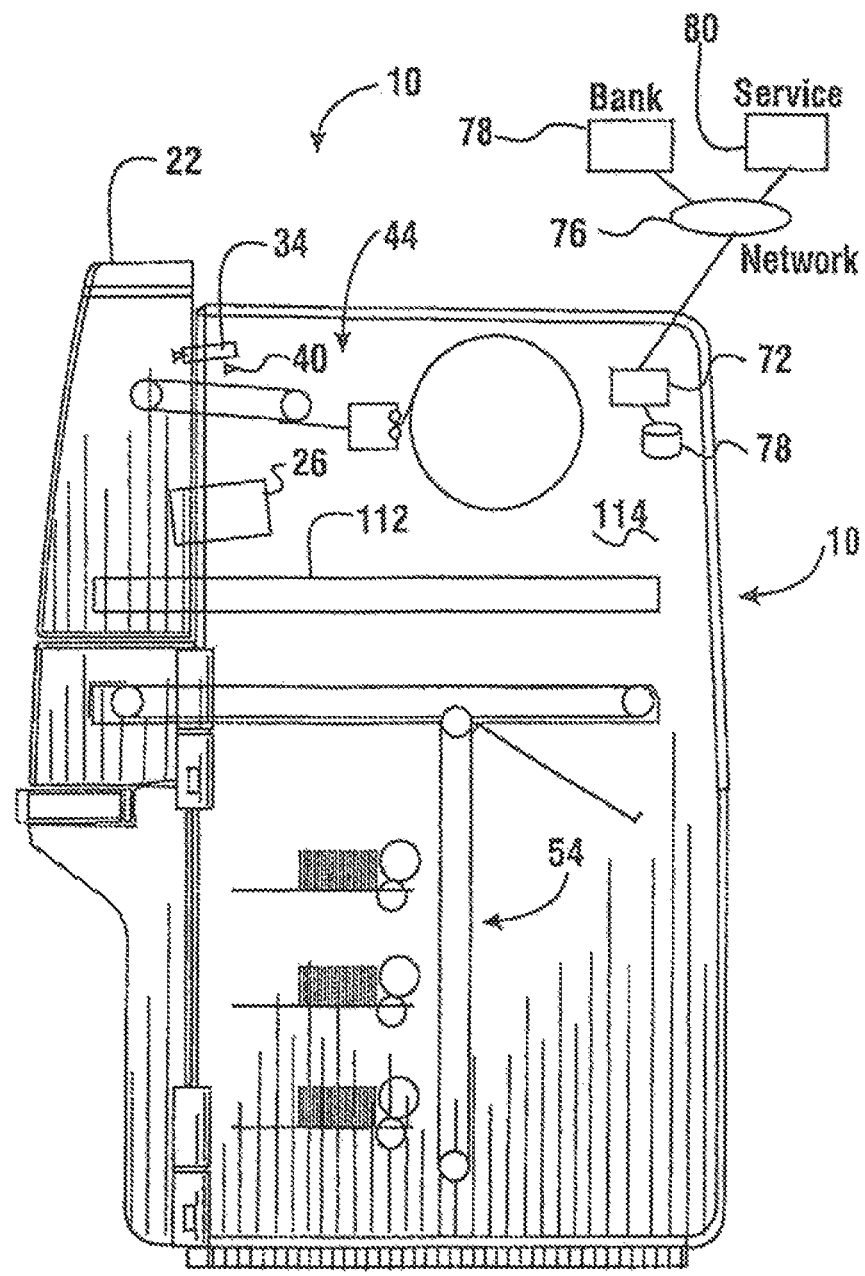
FIG. 3 is a transparent side view showing schematically some internal features of the machine.

As schematically represented in FIG. 3, the machine 10 includes one or more internal computers. Such internal computers include one or more processors. Such processors may be in operative connection with one or more data stores. In some embodiments processors may be located on certain devices within the machine so as to individually control the operation thereof. Examples such as multi-tiered processor systems are shown in U.S. Pat. Nos. 6,264,101 and 6,131,809, the entire disclosures of which are incorporated herein by reference.

For purposes of simplicity, the exemplary embodiment will be described as having a single controller which is alternatively referred to herein as a computer, which controls the operation of devices within the machine. However it should be understood that such reference shall be construed to encompass multicontroller and multiprocessor systems as may be appropriate in controlling the operation of a particular machine. In FIG. 3 the controller is schematically represented 72. Also as schematically represented, the controller is in operative connection with one or more data stores 78. Such data stores in exemplary embodiments are operative to store program instructions, values and other information used in the operation of the machine. Although the controller is schematically shown in the upper housing portion of machine 10, it should be understood that in alternative embodiments controllers may be located within various portions of the automated banking machine.

In order to conduct transactions the exemplary machine 10 communicates with remote computers. The remote computers are operative to exchange messages with the machine and authorize and record the occurrence of various transactions. This is represented in FIG. 3 by the communication of the machine through a network with a bank 78, which has at least one computer which is operative to exchange messages with the machine through a network. The bank computer is alternatively referred to herein as a host. For example, the bank 78 may receive one or more messages from the machine requesting authorization to allow a customer to withdraw $200 from the customer's account. In an exemplary embodiment the machine operates to send at least one message including data corresponding to card data read from the user's card as well as a personal identification number (PIN) and/or other identifying data to the remote computer. The data included in the one or more messages sent by the machine enables the remote computer to determine that the user at the machine is an authorized user who is permitted to conduct the requested transaction. The remote host computer at the bank 78 will operate to determine that such a withdrawal is authorized and will return one or more messages to the machine through the network authorizing the transaction. After the machine conducts the transaction, the machine will generally send one or more messages back through the network to the bank indicating that the transaction was successfully carried out. Of course these messages are merely exemplary.

Other systems may operate in a manner like that described in U.S. Pat. No. 8,201,732 the disclosure of which is incorporated herein by reference in its entirety. In such systems, an automated banking machine may be operated in a virtual environment, and the physical machine is controlled responsive to operation of the virtual machine.

It should be understood that in some embodiments the machine may communicate with other entities and through various networks. For example as schematically represented in FIG. 3, the machine will communicate with computers operated by service providers 80. Such service providers may be entities to be notified of status conditions or malfunctions of the machine as well as entities that are to be notified of corrective actions. An example of such a system for accomplishing this is shown in U.S. Pat. No. 5,984,178, the entire disclosure of which is incorporated herein by reference. Other third parties who may receive notifications from exemplary machines include entities responsible for delivering currency to the machine to assure that the currency supplies are not depleted. Other entities may be responsible for removing deposit items from the machine. Alternative entities that may be notified of actions at the machine may include entities which hold marketing data concerning consumers and who provide messages which correspond to marketing messages to be presented to consumers. For example some embodiments may operate in a manner described in U.S. Pat. No. 7,516,087, the entire disclosure of which is incorporated herein by reference. Various types of messages may be provided to remote systems and entities by the machine depending on the capabilities of the machines in various embodiments and the types of transactions being conducted.

Figure 4:
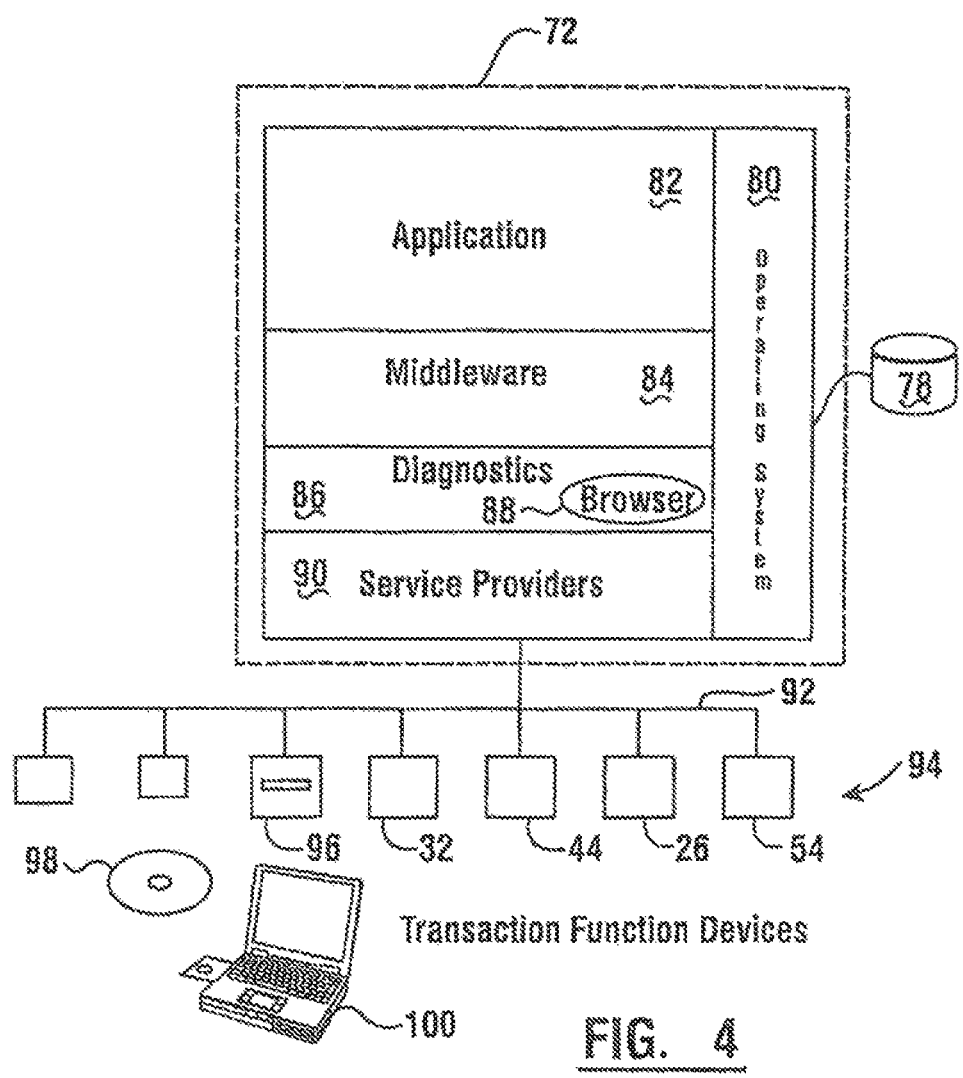
FIG. 4 is a schematic view representative of the software architecture of an exemplary embodiment.

FIG. 4 shows schematically an exemplary software architecture which may be operative in the controller 72 of machine 10. The exemplary software architecture includes an operating system such as for example Microsoft® Windows, Google® Chrome, IBM OS/2® or Linux. The exemplary software architecture also includes a machine application schematically represented 82. The exemplary application includes the instructions for the operation of the automated banking machine and may include, for example, an Agilis™ 91x application that is commercially available from Diebold, Incorporated which is a cross vendor software application for operating automated banking machines. Further examples of software applications which may be used in some embodiments are shown in U.S. Pat. Nos. 6,289,320 and 6,505,177, the entire disclosures of which are herein incorporated by reference.

In the exemplary embodiment middleware software schematically indicated 84 is operative in the controller. In the exemplary embodiment the middleware software operates to compensate for differences between various types of automated banking machines and transaction function devices used therein. The use of a middleware layer enables the more ready use of an identical software application on various types of automated banking machine hardware. In the exemplary embodiment the middleware layer may be Involve® software which is commercially available from a wholly owned subsidiary of the assignee of the present application.

The exemplary software architecture further includes a diagnostics layer 86. The diagnostics layer 86 is operative as later explained to enable accessing and performing various diagnostic functions of the devices within the machine. In the exemplary embodiment the diagnostics operate in conjunction with a browser schematically indicated 88.

The exemplary software architecture further includes a service provider layer schematically indicated 90. The service provider layer may include software such as WOSA XFS service providers for J/XFS service providers which present a standardized interface to the software layers above and which facilitate the development of software which can be used in conjunction with different types of machine hardware. Of course this software architecture is exemplary and in other embodiments other architectures may be used.

As schematically represented in FIG. 4, a controller 72 is in operative connection with at least one communications bus 92. The communications bus may in some exemplary embodiments be a universal serial bus (USB) or other standard or nonstandard type of bus architecture. The communications bus 92 is schematically shown in operative connection with transaction function devices 94. The transaction function devices include devices in the machine which are used to carry out transactions. These may include for example the currency dispenser device 54, card reader 26, receipt printer 44, keypad 32, as well as numerous other devices which are operative in the machine and controlled by the controller to carry out transactions. In the exemplary embodiment one of the transaction function devices in operative connection with the controller is a diagnostic article reading device 96 which may be operative to read a diagnostic article schematically indicated 98 which may provide software instructions useful in servicing the machine. Alternatively and/or in addition, provision may be made for connecting the bus 92 or other devices in the machine computer device 100 which may be useful in performing testing or diagnostic activities related to the machine 10.

Figure 5:
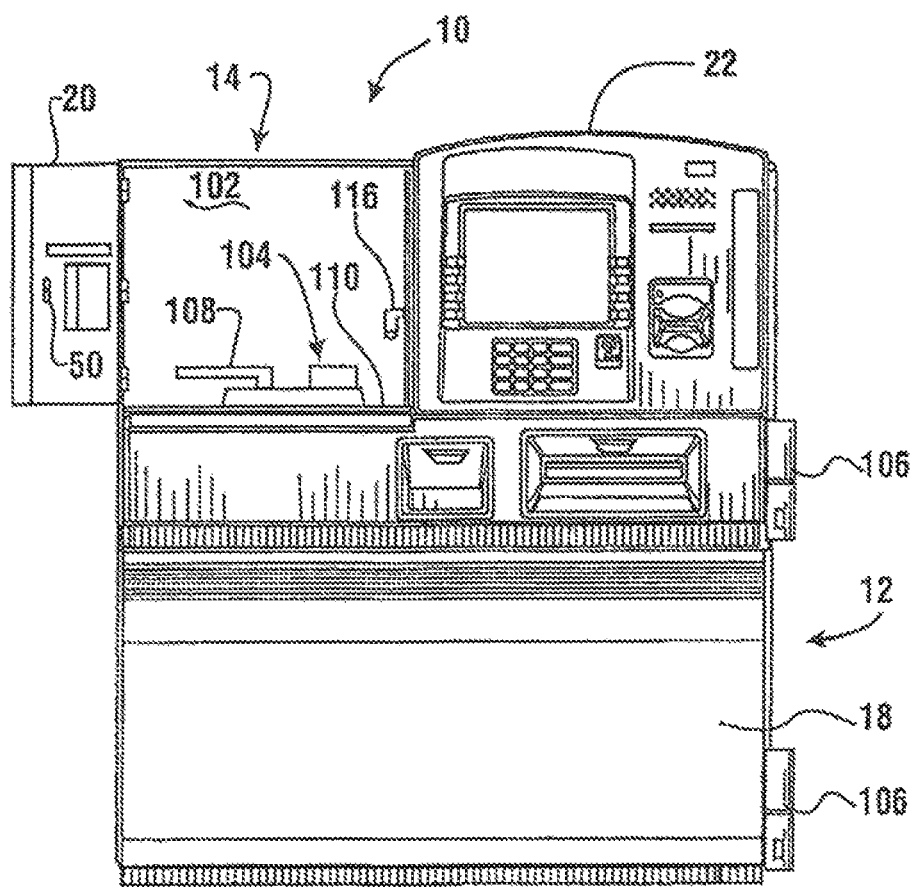
FIG. 5 is a front view showing the fascia portion moved to access a first portion of an upper housing of the machine.

In the exemplary embodiment of machine 10 the first fascia portion 20 and the second fascia portion 22 are independently movably mounted on the machine housing 12. This is accomplished through the use of hinges attached to fascia portion 20. The opening of the fascia lock 50 on the first fascia portion 20 enables the first fascia portion to be moved to an open position as shown in FIG. 5. In the open position of the first fascia portion an authorized user is enabled to gain access to a first portion 102 in the upper housing area 14. In the exemplary embodiment there is located within the first portion 102 a chest lock input device 104. In this embodiment the chest lock input device comprises a manual combination lock dial, electronic lock dial or other suitable input device through which a combination or other unlocking inputs or articles may be provided. In this embodiment, input of a proper combination enables the chest door 18 to be moved to an open position by rotating the door about hinges 106. In the exemplary embodiment the chest door is opened once the proper combination has been input by manipulating a locking lever 108 which is in operative connection with a boltwork. The boltwork which is not specifically shown is operative to hold the chest door in a locked position until the proper combination is input. Upon input of the correct combination the locking lever enables movement of the boltwork so that the chest door can be opened. The boltwork also enables the chest door to be held locked after the activities in the chest portion have been conducted and the chest door is returned to the closed position. Of course in other embodiments other types of mechanical or electrical locking mechanisms may be used. In the exemplary embodiment the chest lock input device 104 is in supporting connection with a generally horizontally extending dividing wall 110 which separates the chest portion from the upper housing portion. Of course this housing structure is exemplary and in other embodiments other approaches may be used.

An authorized servicer who needs to gain access to an item, component or device of the machine located in the chest area may do so by opening the fascia lock and moving the first fascia portion 20 so that the area 102 becomes accessible. Thereafter the authorized servicer may access and manipulate the chest lock input device to receive one or more inputs, which if appropriate enables unlocking of the chest door 18. The chest door may thereafter be moved relative to the housing and about its hinges 106 to enable the servicer to gain access to items, devices or components within the chest. These activities may include for example adding or removing currency, removing deposited items such as envelopes or checks, or repairing mechanisms or electrical devices that operate to enable the machine to accept deposited items or to dispense currency. When servicing activity within the chest is completed, the chest door may be closed and the locking lever 108 moved so as to secure the boltwork holding the chest door in a closed position. Of course this structure and service method is exemplary and in other embodiments other approaches may be used.

In the exemplary embodiment the second fascia portion 22 is also movable relative to the housing of the machine. In the exemplary embodiment the second fascia portion 22 is movable in supporting connection with a rollout tray 112 schematically shown in FIG. 3. The rollout tray is operative to support components of the user interface thereon as well as the second fascia portion. The rollout tray enables the second fascia portion to move outward relative to the ATM housing thereby exposing components and transaction function devices supported on the tray and providing access to a second portion 114 within the upper housing and positioned behind the second fascia portion. Thus as can be appreciated, when the second fascia portion is moved outward, the components on the tray are disposed outside the housing of the machine so as to facilitate servicing, adjustment and/or replacement of such components. Further components which remain positioned within the housing of the machine as the rollout tray is extended become accessible in the second portion as the second fascia portion 22 is disposed outward and away from the housing.

Figure 2:
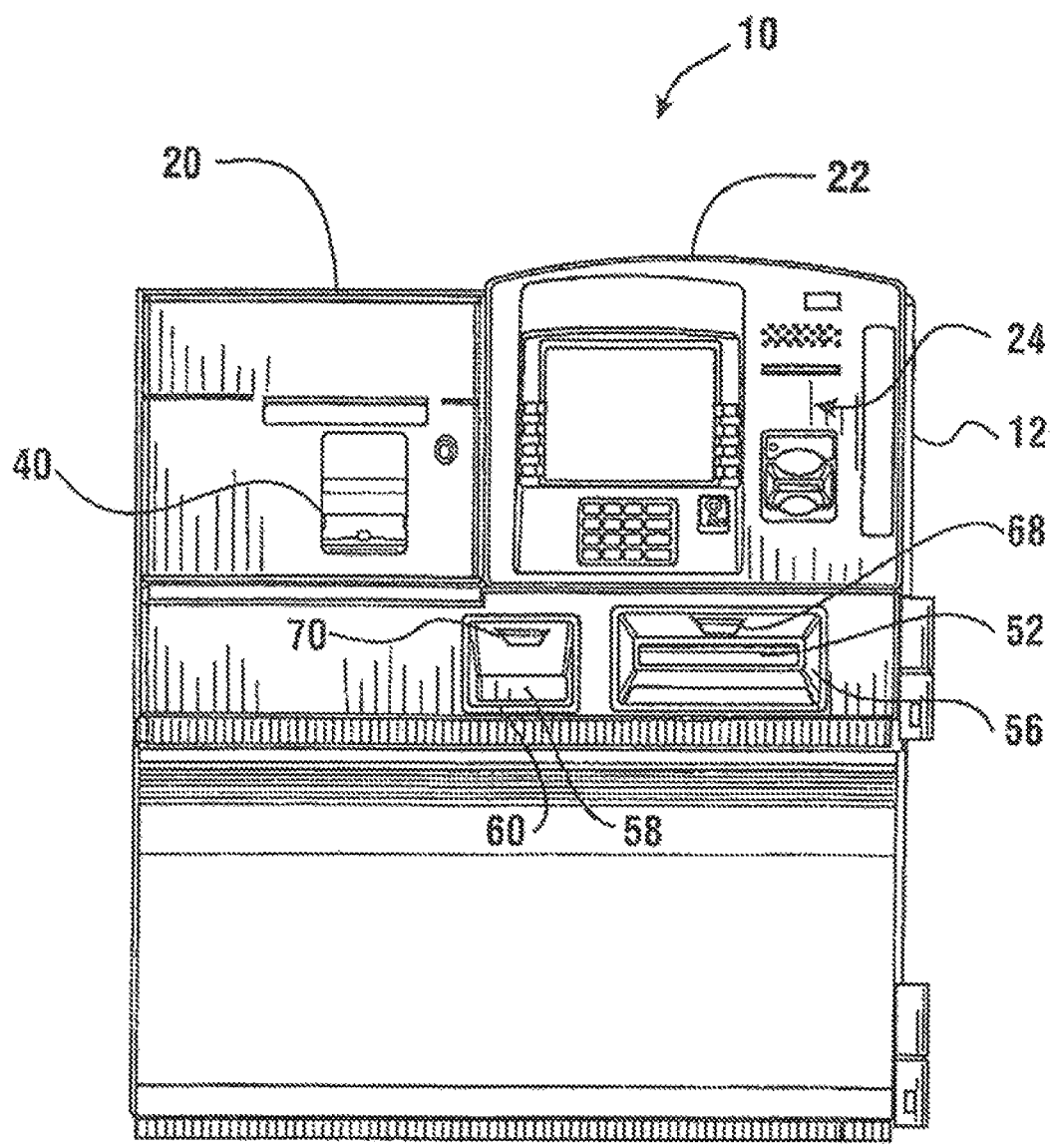
FIG. 2 is a front plan view of the machine shown in FIG. 1.

In the exemplary embodiment the rollout tray 112 is in operative connection with a releasable locking device. The locking device is generally operative to hold the tray in a retracted position such that the second fascia portion remains in an operative position adjacent to the upper housing area as shown in FIGS. 1, 2 and 3. This releasable locking mechanism may comprise 5 one or more forms of locking type devices. In the exemplary embodiment the releasable locking mechanism may be released by manipulation of an actuator 116 which is accessible to an authorized user in the first portion 102 of the upper housing 14. As a result, an authorized servicer of the machine is enabled to move the second fascia portion outward for servicing by first accessing portion 102 in the manner previously discussed. Thereafter, by manipulating the 10 actuator 116 the second fascia portion is enabled to move outward as shown in phantom in FIG. 8 so as to facilitate servicing components on the rollout tray. Such components may include for example a printer or card reader. After such servicing the second fascia portion may be moved toward the housing so as to close the second portion 114. Such movement in the exemplary embodiment causes the rollout tray to be latched and held in the retracted position 15 without further manipulation of the actuator. However, in other embodiments other types of locking mechanisms may be used to secure the rollout tray in the retracted position. It should be understood this approach is exemplary and in other embodiments other approaches may be used.

Figure 6:
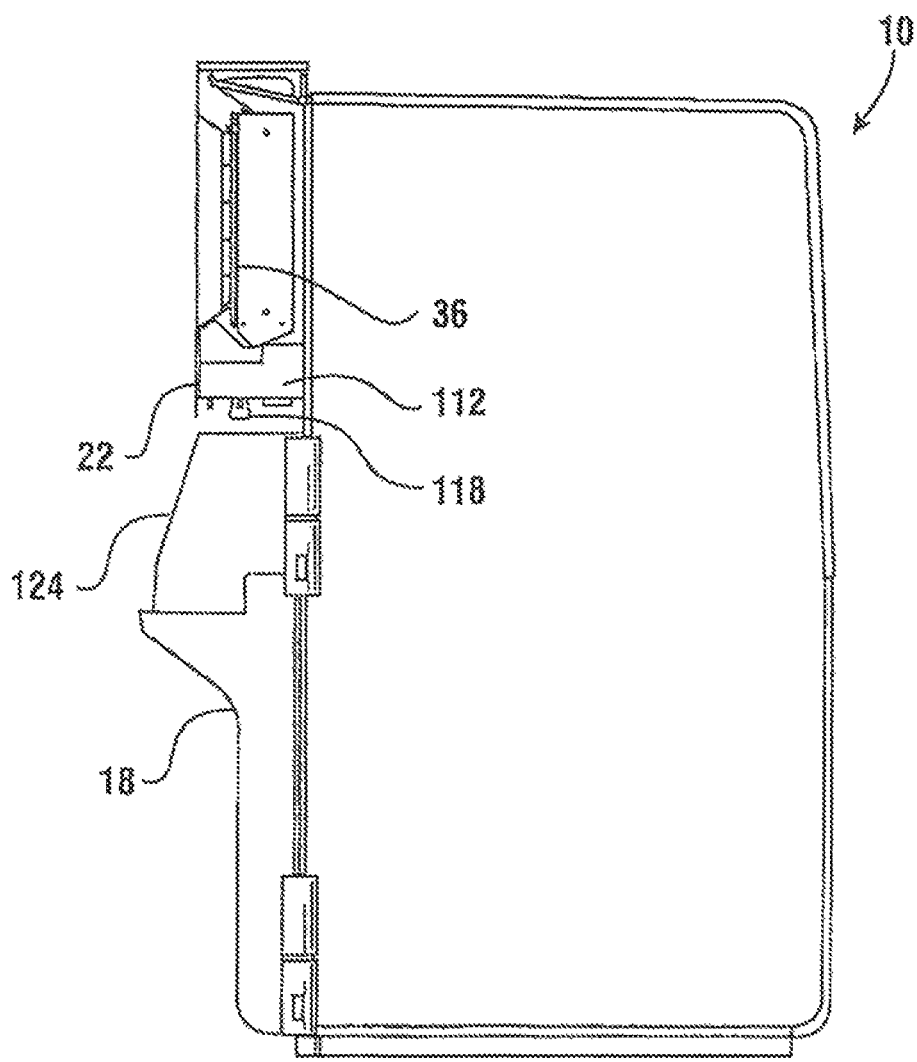
FIG. 6 is a partially transparent side view showing air flow through an air cooling opening of the machine.
Figure 7:
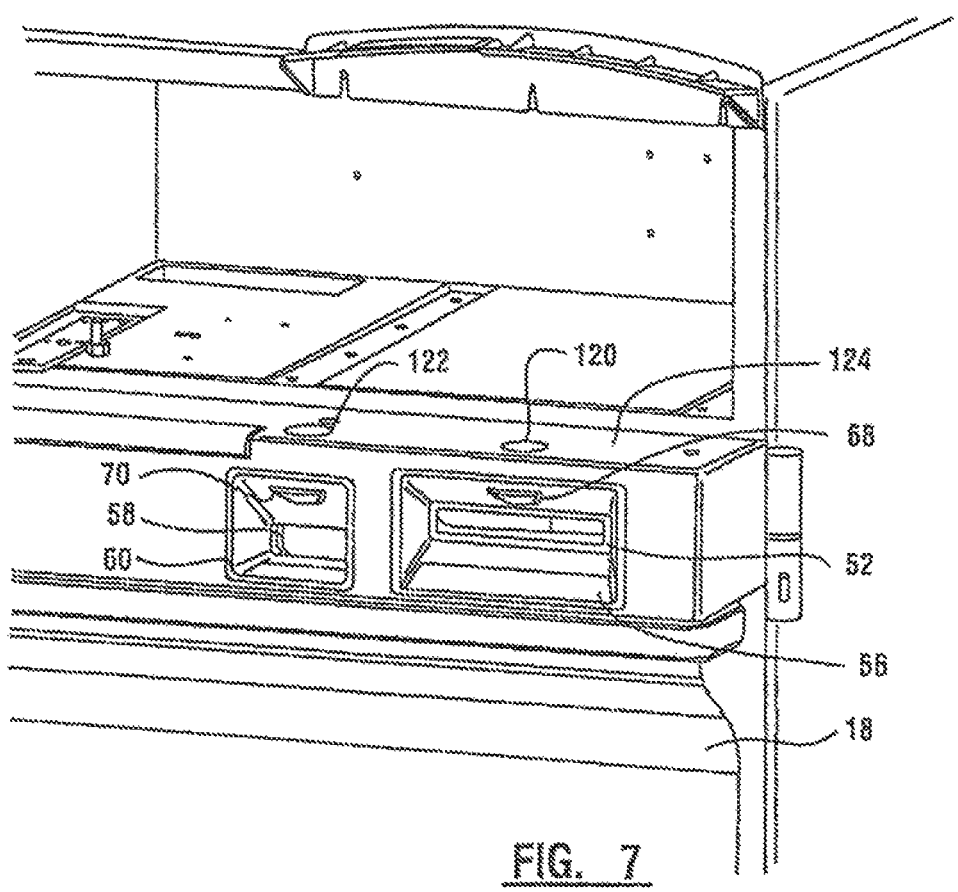
FIG. 7 is an isometric view of the machine shown in FIG. 1 with the components of the upper housing portion removed.
Figure 10:
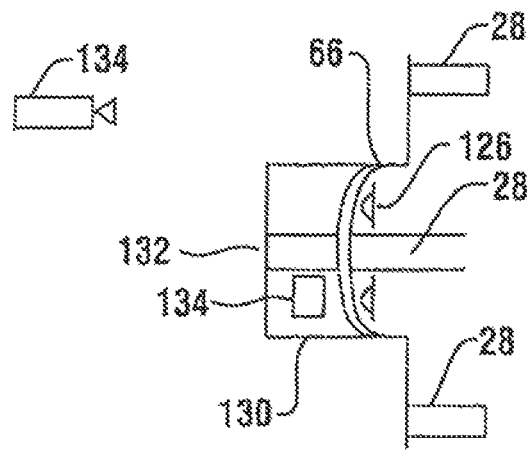
FIG. 10 is a schematic side view of an unauthorized card reading device in operative connection with a housing of the anti-fraud sensor.

As best shown in FIG. 7 in which the components supported in the upper housing are not shown, the delivery area 52 and the deposit acceptance area 58 are in supporting connection with the chest door 18. As such when the chest door 18 is opened, the delivery area 52 and the deposit acceptance area 58 will move relative to the housing of the machine. The exemplary embodiment shown facilitates servicing of the machine by providing for the illumination for the transaction areas by illumination sources positioned in supporting connection with the rollout tray 112. As best shown in FIG. 6, these illumination sources 118 are movable with the rollout tray and illuminate in generally a downward direction. In the operative position of the second fascia portion 22 and the chest door 18, the illumination sources are generally aligned with apertures 120 and 122 which extend through the top of a cover 124 which generally surrounds the recessed pockets 60 and 56. As shown in FIG. 10, aperture 120 is generally vertically aligned with window 68, and aperture 122 is generally aligned with window 70. In an exemplary embodiment, apertures 120 and 122 each have a translucent or transparent lens positioned therein to minimize risk of introduction of dirt or other contaminants into the interior of the cover 124.

Figure 8:
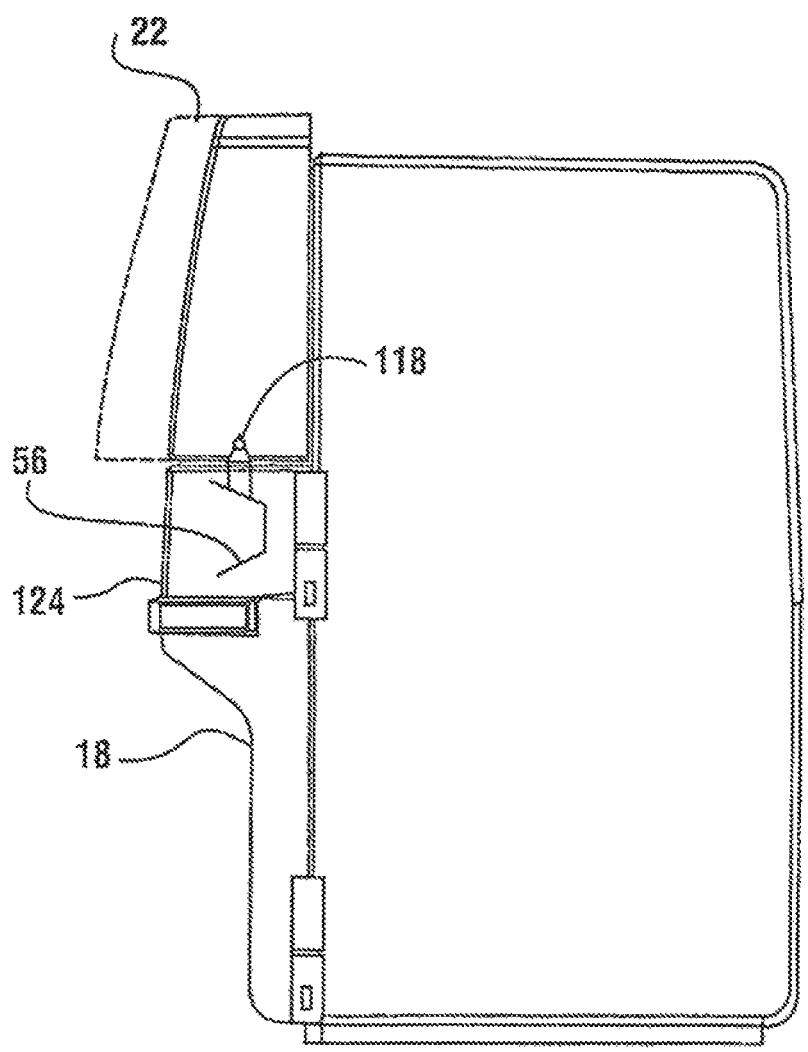
FIG. 8 is a schematic side view of the housing showing schematically the illumination system for the transaction areas and representing in phantom the movement of the upper fascia portion so as to provide access for servicing.

As can be appreciated from FIGS. 6 and 8, when the chest door 18 is closed and the second fascia portion 22 is moved to the operative position, the illumination sources 118 are 5 positioned in generally aligned relation with apertures 120 and 122. As a result the illumination of the illumination devices is operative to cause light to be transmitted through the respective aperture and to illuminate the transaction area within the corresponding recessed pocket.

In operation of an exemplary embodiment, the controller executes programmed instructions so as to initiate illumination of each transaction area at appropriate times during the conduct of transactions. For example in the exemplary embodiment if the user is conducting a cash withdrawal transaction, the controller may initiate illumination of the delivery area 52 when the cash is delivered therein and is available to be taken by a user. Such illumination draws the user's attention to the need to remove the cash and will point out to the user that the cash is ready to be taken. In the exemplary embodiment the controller is programmed so that when the user takes the cash the machine will move to the next transaction step. After the cash is sensed as taken, the controller may operate to cease illumination of the delivery area 56. Of course these approaches are exemplary.

Likewise, in an exemplary embodiment, if a user of the machine indicates that they wish to conduct a deposit transaction, the controller may cause the machine to operate to initiate illumination of the deposit acceptance area 58. The user's attention is drawn to the place where they must insert the deposit envelope in order to have it be accepted in the machine. In the exemplary embodiment the controller may operate to also illuminate the illumination panel 62 to illuminate the deposit envelope providing opening 48 so that the user is also made aware of the location from which a deposit envelope may be provided. In an exemplary embodiment the controller may operate to cease illumination through the window 70 and/or the illumination panel 62 after the deposit envelope is indicated as being sensed within the machine.

In alternative embodiments other approaches may be taken. This may include for example drawing the customer's attention to the particular transaction area by changing the nature of the illumination in the recessed pocket to which the customer's attention is to be drawn. This may be done for example by changing the intensity of the light, flashing the light, changing the color of the light or doing other actions which may draw a user's attention to the appropriate transaction area. Alternatively or in addition, a sound emitter, vibration, projecting pins or other indicator may be provided for visually impaired users so as to indicate to them the appropriate transaction area to which the customer's attention is to be drawn. Of course these approaches are exemplary and in other embodiments other approaches may be used.

Figure 9:
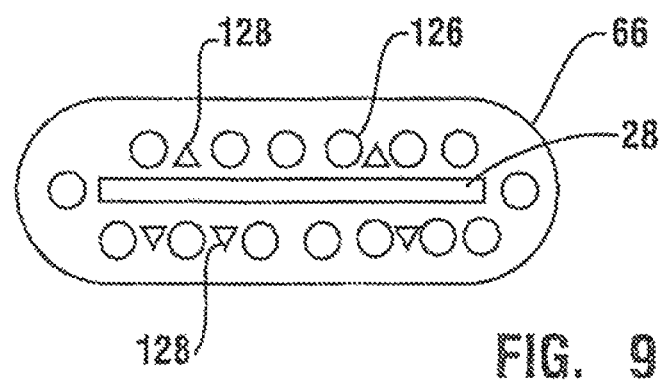
FIG. 9 is a schematic view of an illumination and anti-fraud sensing device which bounds a card reader slot of an exemplary embodiment.

As previously discussed the exemplary embodiment of machine 10 is also operative to draw a user's attention at appropriate times to the card reader slot 28. Machine 10 also includes features to minimize the risk of unauthorized interception of card data by persons who may attempt to install a fraud device such as an unauthorized card reading device on the machine. As shown in FIG. 9, the exemplary card slot 28 extends through a card slot housing 66 which extends in generally surrounding relation of the card slot. It should be understood that although the housing 66 generally bounds the entire card slot, in other embodiments the principles described herein may be applied by bounding only one or more sides of a card slot as may be appropriate for detecting unauthorized card reading devices. Further, it should be understood that while the exemplary embodiment is described in connection with a card reader that accepts a card into the machine, the principles being described may be applied to types of card readers that do not accept a card into the machine, such as readers where a user draws the card through a slot, inserts and removes a card manually from a slot, bringing a card or a card containing device that 20 can communicate wirelessly in proximity to a reading device and other card reading structures.

In the exemplary embodiment the housing 66 includes a plurality of radiation emitting devices 126. The radiation emitting devices emit visible radiation which can be perceived by a user of the machine. However, in other embodiments the radiation emitting devices may include devices which emit nonvisible radiation such as infrared radiation, but which nonetheless can be 25 used for sensing the presence of unauthorized card reading devices adjacent to the card slot. In the exemplary embodiment the controller operates to illuminate the radiation emitting devices 126 at appropriate times during the transaction sequence. This may include for example times during transactions when a user is prompted to input the card into the machine or alternatively when a user is prompted to take the card from the card slot 28. In various embodiments the controller may be programmed to provide solid illumination of the radiation emitting devices or may vary the intensity of the devices as appropriate to draw the user's attention to the card slot.

In the exemplary embodiment the card slot housing 66 includes therein one or more radiation sensing devices 128. The radiation sensing devices are positioned to detect changes in 5 at least one property of the radiation reflected from emitting devices 126. The sensing devices 128 are in operative connection with the controller. The controller is operative responsive to its programming to compare one or more values corresponding to the magnitude and/or other properties or radiation sensed by one or more of the sensors, to one or more stored values and to make a determination whether the comparison is such that there is a probable unauthorized card reading device installed on the fascia of the machine. In some embodiments the controller may be operative to execute fuzzy logic programming for purposes of determining whether the natures of the change in reflected radiation or other detected parameters are such that there has been an unauthorized device installed and whether appropriate personnel should be notified.

FIG. 10 shows a side view of the housing 66. An example of a fraud device which comprises unauthorized card reading device 130 is shown attached externally to the housing 66. The unauthorized card reading device includes a slot 132 generally aligned with slot 128. The device 130 also includes a sensor shown schematically as 134 which is operative to sense the encoded magnetic flux reversals which represent data on the magnetic stripe of a credit or debit card. As can be appreciated, an arrangement of the type shown in FIG. 10 enables the sensor 134 if properly aligned adjacent to the magnetic stripe of a card, to read the card data as the card passes in and out of slot 128. Such an unauthorized reading device may be connected via radio frequency (RF) or through inconspicuous wiring to other devices which enable interception of the card data. In some situations criminals may also endeavor to observe the input of the user's PIN corresponding to the card data so as to gain access to the account of the user.

As can be appreciated from FIG. 10 the installation of the unauthorized card reading device 130 changes the amount of radiation from emitting devices 126 and that is reflected or otherwise transmitted to the sensors 128. Depending on the nature of the device and its structure, the amount or other properties of radiation may increase or decrease. However, a detectable change will often occur in the magnitude or other properties of sensed radiation between a present transaction and a prior transaction which was conducted prior to an unauthorized card reading device being installed. Of course the sensing of the magnitude of radiation is but one example of a property of radiation that may be sensed as having changed so as to indicate the presence of an unauthorized reading device.

Figure 11:
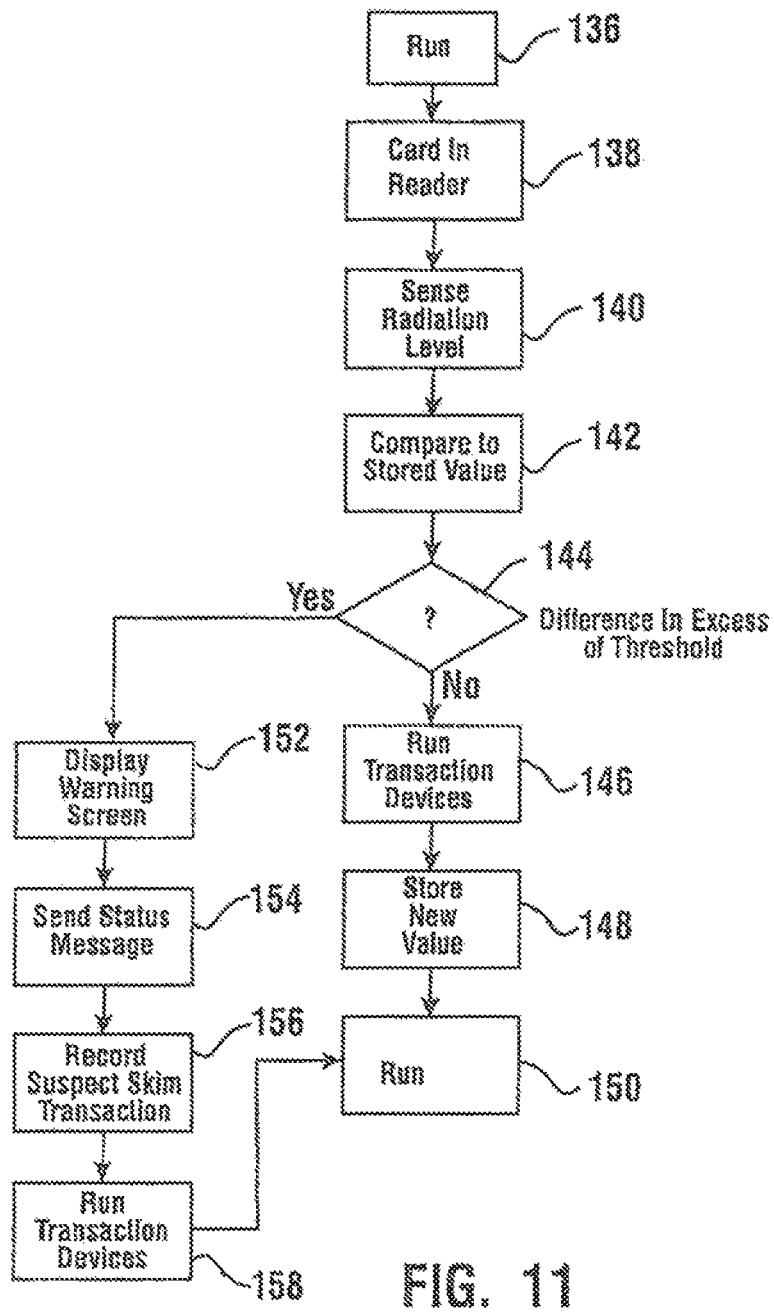
FIG. 11 is a schematic view of exemplary logic for purposes of detecting the presence of an unauthorized card reading device in proximity to the card reader during operation of the machine.

FIG. 11 demonstrates an exemplary simplified logic flow executed by a controller for detecting the installation of an unauthorized card reading device. It should be understood that this transaction logic is part of the overall operation of the machine to carry out transactions. In this exemplary logic flow, the machine operates to carry out card reading transactions in a normal manner and to additionally execute the represented steps as a part of such logic each time a card is read. From an initial step 136 the controller in the machine is operative to sense that a card is in the reader within the machine in a step 138. Generally in these circumstances the controller will be operating the radiation emitting devices 126 as the user has inserted their card and the card has been drawn into the machine. In this exemplary embodiment the controller continues to operate the radiation emitting devices and senses the radiation level or levels sensed by one or more sensors 128. This is done in a step 140.

The controller is next operative to compare the signals corresponding to the sensed radiation levels to one or more values in a step 142. This comparison may be done a number of ways and may in some embodiments execute fuzzy logic so as to avoid giving false indications due to acceptable conditions such as a user having the user's finger adjacent to the card slot 28 during a portion of the transaction. In the case of a user's finger for example, the computer may determine whether an unauthorized reading device is installed based on the nature, magnitude and changes during a transaction in sensed radiation, along with appropriate programmed weighing factors. Of course various approaches may be used within the scope of the concept discussed herein. However, based on the one or more comparisons in step 142 the controller is operative to make a decision at step 144 as to whether the sensed value(s) compared to stored value(s) compared in step 142 have a difference that is in excess of one or more thresholds which suggest that an unauthorized card reading device has been installed.

If the comparison does not indicate a result that exceeds the threshold(s) the transaction devices are run as normal as represented in a step 146. For example, a customer may be prompted to input a PIN, and if the card data and PIN are valid, the customer may be authorized to conduct a cash dispensing transaction through operation of the machine. Further in the exemplary embodiment, the controller may operate to adjust the stored values to some degree based on the more recent readings. This may be appropriate in order to compensate for the effects of dirt on the fascia or loss of intensity of the emitting devices or other factors. This is represented in a step 148. In step 148 the controller operates the machine to conduct transaction steps in the usual manner as represented in a step 150.

If in step 144 the difference between the sensed and stored values exceeds the threshold(s), then this is indicative that an unauthorized card reading device may have been installed since the last transaction. In the exemplary embodiment when this occurs, the controller is operative to present a warning screen to the user as represented in a step 152. This warning screen may be operative to advise the user that an unauthorized object has been sensed adjacent to the card reader slot. This may warn a user for example that a problem is occurring. Alternatively if a user has inadvertently placed innocently some object adjacent to the card reader slot, then the user may withdraw it. In addition or in the alternative, further logic steps may be executed such as prompting a user to indicate whether or not they can see the radiation emitting devices being illuminated adjacent to the card slot and prompting the user to provide an input to indicate if such items are visible. Additionally or in the alternative, the illuminating devices within the housing 66 may be operative to cause the emitting devices to output words or other symbols which a user can indicate that they can see or cannot see based on inputs provided as prompts from output devices of the machine. This may enable the machine to determine whether an unauthorized reading device has been installed or whether the sensed condition is due to other factors. It may also cause a user to note the existence of the reading device and remove it. Of course various approaches could be taken depending on the programming of the machine.

If an unauthorized reading device has been detected, the controller in the exemplary embodiment will also execute a step 154 in which a status message is sent to an appropriate service provider or other entity to indicate the suspected problem. This may be done for example through use of a system like that shown in U.S. Pat. No. 5,984,178 the entire disclosure of which is herein incorporated by reference. Alternatively messages may be sent to system addresses in a manner like that shown in U.S. Pat. No. 6,289,320 the entire disclosure of which is also herein incorporated by reference. In a step 156 the controller will also operate to record data identifying for the particular transaction in which there has been suspected interception of the card holder's card data. In addition or in the alternative, a message may be sent to the bank or other institution alerting them to watch for activity in the user's card account for purposes of detecting whether unauthorized use is occurring. Alternatively or in addition, some embodiments may include card readers that change, add or write data to a user's card in cases of suspected interception. Such changed data may be tracked or otherwise used to assure that only a card \Vit.l). the modified data is useable thereafter. Alternatively or in addition, in some embodiments the modified card may be moved in translated relation, moved irregularly or otherwise handled to reduce the risk that modified data is intercepted as the card is output from the machine. Of course these approaches are exemplary of many that may be employed.

In the exemplary embodiment the machine is operated to conduct a transaction even in cases where it is suspected that an unauthorized card reading device has been installed. This is represented in a step 158. However, in other embodiments other approaches may be taken such as refusing to conduct the transaction. Other steps may also be taken such as capturing the user's card and advising the user that a new one will be issued. This approach may be used to minimize the risk that unauthorized transactions will be conducted with the card data as the card can be promptly invalidated. Of course other approaches may be taken depending on the programming of the machine and the desires of the system operator. In addition while the fraud device shown is an unauthorized card reading device, the principles described may also be used to detect other types of fraud devices such as for example false fascias, user interface covers and other devices.

In some embodiments additional or alternative features and methods may be employed to help detect the presence of unauthorized card reading devices or other attempted fraud devices in connection with the machine. For example in some embodiments an oscillation sensor may be attached to the machine to detect changes in frequency or vibration that result from the installation of unauthorized devices on the machine. FIG. 10 shows schematically an oscillator 127 attached to the interior surface of the machine fascia. Oscillator 127 may be operative responsive to the controller and suitable vibration circuitry to impart vibratory motion to the fascia in the vicinity of the card reader slot. A sensor 129 is in operative connection with the fascia and is operative to sense at least one parameter of the motion imparted to the fascia by the oscillator 127. Although oscillator 127 and sensor 129 are shown as separate components, it should be understood that in some embodiments the functions of the components may be performed by a single device.

The sensor 129 is in operative connection with the controller of the machine through appropriate circuitry. The controller selectively activates the oscillator and the sensor 129 is operative to sense the resulting movement of the fascia caused by the oscillation. The installation of an unauthorized card reading device or other fraud device on the machine will generally result in a change in at least one property being sensed by the sensor 129. This may include changes in amplitude, frequency or both. Alternatively or in addition, some embodiments may provide for the oscillator to impart vibration characteristics of various types or vibratory motion through a range of frequencies and/or amplitudes. Sensed values for various oscillatory driving outputs may then be compared through operation of the controller to one or more previously stored values. Variances from prior values may be detected or analyzed through operation of the controller and notifications given in situations where a change has occurred which suggests the installation of an unauthorized device.

In some embodiments the controller may cause the oscillator and sensor to operate periodically to sense for installation of a possible unauthorized device. Alternatively, the controller may cause such a check to be made during each transaction. Alternatively in some embodiments oscillation testing may be conducted when a possible unauthorized device is detected by sensing radiation properties. The controller can operate to take various actions in response to sensing a possible unauthorized reading device through vibration, radiation, or both. For example, detecting a possible fraud device by both radiation and oscillation may warrant taking different actions than only detecting a possible fraud device through only one test or condition.

In some embodiments the controller may be programmed to adjust the thresholds or other limits used for resolving the presence of a possible fraud device for responses to changes that occur over time at the machine. This may include for example adjusting the thresholds for indicating possible fraud conditions based on the aging of the oscillator or the sensor. Such adjustments may also be based on parameters sensed by other sensors which effect vibration properties. These may include for example, the fascia temperature, air temperature, relative humidity and other properties. Of course readings from these and other sensors may be used to adjust thresholds of the oscillation sensor, radiation sensor or other fraud device sensors. Various approaches may be taken depending on the particular system.

In some embodiments the oscillator may additionally or alternatively be used to prevent the unauthorized reading of card reader signals. This may be done for example when the banking machine has a device which takes a user card into the machine for purposes of reading data on 10 the card. In such embodiments the controller may operate to vibrate the area of the fascia adjacent to the card reader slot when a user's card is moving into and/or out of the slot. In such cases the vibration may be operative to cause the generation of noise or inaccurate reading by an unauthorized card reading sensor so as to make it more difficult to intercept the card stripe data using an unauthorized reading device. In some embodiments such vibration may also serve to 15 disclose or make more apparent the presence of unauthorized card reading devices. Of course these approaches are exemplary and in other embodiments other approaches may be used.

In some exemplary embodiments provision may be made for detecting the presence of unauthorized input sensing devices for sensing a user's inputs through the keypad on the machine. Such unauthorized input sensing devices may be used by criminals to sense the PIN input by the user. Detecting unauthorized devices may be accomplished by providing appropriate sensing devices in or adjacent to the keypad. Such sensing devices may be operative to detect that a structure has been placed over or adjacent to the keypad. Such sensors may be in operative connection with the controller in the machine or other devices which are operative to determine the probable installation of such an unauthorized input sensing device. In response to determining the probable installation of such a device, the controller may be operative in accordance with its programming to provide notification to appropriate entities, modify the operation of the machine such as to disable operation or prevent certain operations, or to take other appropriate actions.

FIG. 12 shows the cross-sectional view of exemplary keypad 32. Keypad 32 is shown schematically, and it should be understood that not all of the components of the keypad are represented. Keypad 32 includes a plurality of keys 250. Keys 250 are moveable responsive to pressure applied by a user's finger to provide an input corresponding to alphabetical or numerical characters. Extending between some of the keys 250 are areas or spaces 252. Extending in spaces 252 are sensors 254. In the exemplary embodiment the sensors 254 are radiation type sensors, but as previously discussed, in other embodiments other approaches may be used. Overlying the sensors 254 is all cuter layer 256. In the exemplary embodiment, layer 256 is translucent or otherwise comprised of material so as to partially enable the transmission of radiation from the sensors therethrough.

As represented in FIG. 13, the exemplary sensors 254 include a radiation emitter 258 and a radiation receiver 260. During operation the radiation emitter is operative to output radiation that is at least partially reflected from the inner surface of layer 256. The reflected radiation is received by the receiver 260. Corresponding electrical signals are produced by the receiver, and such signals are transmitted through appropriate circuitry so as to enable the controller to detect the changes in signals that correspond to probable presence of an unauthorized reading device.

Figure 14:
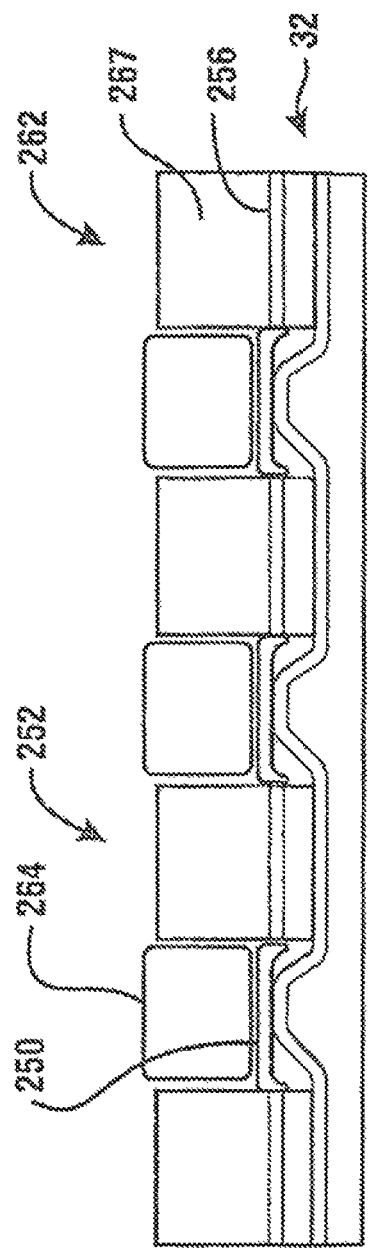
FIG. 14 is a view of a keypad similar to FIG. 12 but with an unauthorized key input sensing device attached.

FIG. 14 is a schematic view of an unauthorized input intercepting device 262 that has been positioned in overlying relation of a keypad 32. The input intercepting device 262 includes false keys 264 which are moveable and which are operatively connected to the corresponding keys 250 of the keypad. In the exemplary embodiment, input intercepting device 262 includes sensors which are operative to detect which of the false keys 264 have been depressed by a user. Because the depression of the false keys is operative to actuate the actual keys 250, the ATM is enabled to operate with the device 262 in place. Input intercepting device 262 in exemplary embodiments may include a wireless transmitter or other suitable device for transmitting the input signals to a criminal who may intercept such inputs.

Figure 15:
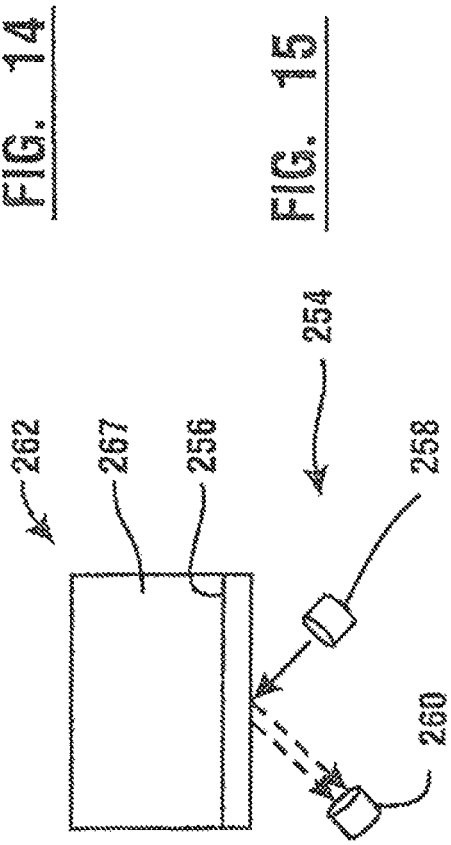
FIG. 15 is a schematic representation similar to FIG. 13, but representing the change in reflected radiation resulting from the attachment of the unauthorized key input sensing device.
Figure 19:
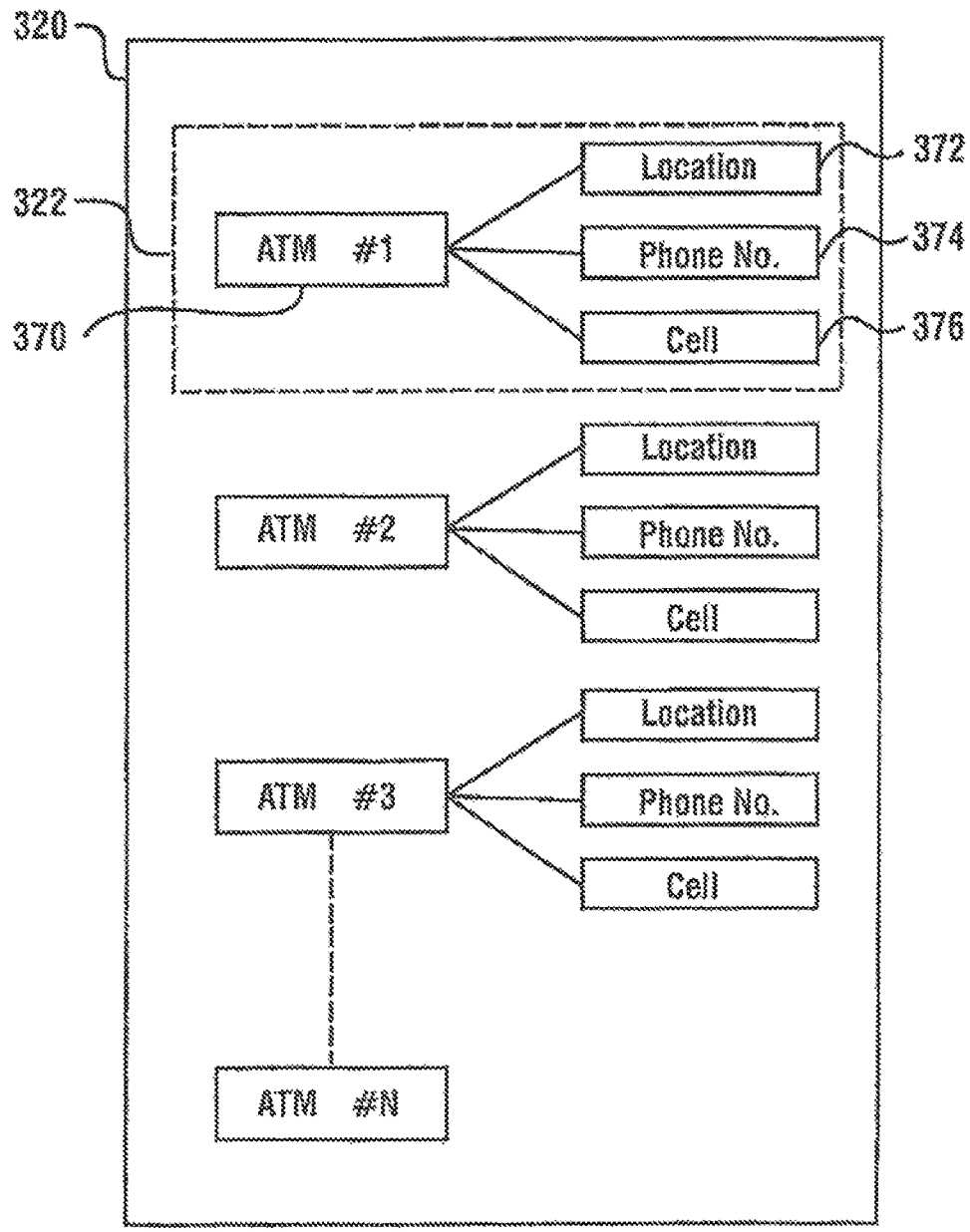
FIG. 19 shows a representation of a database portion.

As represented in FIG. 19, the input intercepting device 262 includes portions 267 which extend in the areas 252 in overlying relation of layer 256. As represented in FIG. 15, the portion of the input intercepting device extending in overlying relation of the layer 256 is operative to cause a change in the amount of radiation from the emitter 258 that is reflected and sensed by the receiver 260 of the sensor. This is because the overlying portion will have different radiation reflecting or absorbing characteristics which will change the radiation reflective properties of the layer 256 compared to when no such input intercepting device is 5 present. Thus the installation of the unauthorized input intercepting device can be detected.

In some exemplary embodiments the controller may be operative to sense the level of reflected radiation at the sensors periodically. This may be done, for example, between transactions when a user is not operating the terminal. This may avoid giving a false indication that an unauthorized input intercepting device has been installed when a user is resting a hand or some other item adjacent to the keypad during a transaction. Of course in other embodiments sensor readings can be taken and compared during transactions to prior values stored in a data store to determine if a change lasting longer than normal has occurred which suggests that an unauthorized input intercepting device has been installed rather than a user has temporarily placed their hand or some other item adjacent to the keypad. For example, in some exemplary embodiments the controller may not resolve that there is a probable unauthorized input intercepting device on the machine until a significant change from a prior condition is detected in the radiation properties adjacent to the keypad on several occasions both during a transaction and thereafter. Alternatively or in addition, a controller may be operative to determine that an improper device has been installed as a result of changes that occur during a time when no transactions have occurred. Alternatively in other embodiments, the controller may operate to sense and analyze signals from the sensors responsive to detecting inputs from other sensors, such as for example an ultrasonic sensor which senses that a person has moved adjacent to the machine but has not operated the machine to conduct a transaction. Of course these approaches are merely exemplary of many approaches that may be used.

It should be understood that although in the exemplary embodiment radiation type sensors are used for purposes of detection, in other embodiments other types of sensors may be used. These include, for example, inductance sensors, capacitance sensors, sonic sensors, RF sensors, or other types of sensing approaches that can be used to detect the presence of material in locations that suggest an unauthorized input intercepting device being positioned adjacent to the keypad. Further, in some embodiments the controller or other circuitry associated with the sensors may be operative to make adjustments for normal changes that may occur at the machine. These may include, for example, changes with time due to aging of emitters, the buildup of dirt in the area adjacent to the keypad, weather conditions, moisture conditions, scratching of the surface of the sensing layer, or other conditions which may normally occur. Appropriate programs may be executed by the controller or other circuitry so as to recalibrate and/or compensate for such conditions as may occur over time while still enabling the detection of a rapid change which is sufficiently significant and of such duration so as to indicate the probable installation of an unauthorized input intercepting device. Of course these approaches are exemplary of many approaches that may be used.

In other embodiments other or additional approaches to detecting fraudulent reading or other improper activities may be used. For example, in some embodiments the fascia of the banking machine may be subject to observation within a field of view of one or more imaging devices such as camera 131 schematically represented in FIG. 10. Camera 15 may be in operative connection with an image capture system of the type shown in U.S. Pat. No. 6,583,813, the entire disclosure of which is herein incorporated by reference.

In some embodiments the controller and/or an image capture system may be operative to execute sequences of activities responsive to triggering events that may be associated with attempts to install or operate fraud devices. For example, the presence of a person in front of the banking machine may be sensed through image analysis, weight sensors, sonic detectors or other detectors. The person remaining in proximity to the machine for a selected period or remaining too long after a transaction may constitute a triggering event which is operative to cause the system to take actions in a programmed sequence. Such actions may include capturing images from one or more additional cameras and/or moving image data from one or more cameras from temporary to more permanent storage. The sequence may also include capturing image data from the fascia to try to detect tampering or improper devices. Radiation or vibration tests may also be conducted as part of a sequence. Notifications and/or images may also be sent to certain entities or system addresses. Of course these actions are exemplary.

In some exemplary embodiments the controller of the machine or other connected computers may be operatively programmed to analyze conditions that are sensed and to determine based on the sensed conditions that a fraud device is installed. Such a programmed computer may be operative to apply certain rules such as to correlate the repeated sensing of abnormal conditions with a possible fraud or tampering condition and to conduct tests for the presence of fraud devices. Such events may constitute soft triggers for sequences or other actions to detect and reduce the risk of fraud devices. Of course these approaches are merely exemplary and in other embodiments other approaches may be used.

In some embodiments the machine may include sensors adapted to intercept signals from unauthorized card readers or customer input intercepting devices. For example, some fraud devices may operate to transmit RF signals to a nearby receiver operated by a criminal. The presence of such RF signals in proximity to the machine may be indicative of the installation of such a device. Such signals may be detected by appropriate circuitry and analyzed through operation of the machine controller or other processor, and if it is determined that it is probable that such a device is installed, programmed actions may be taken.

For example, in some embodiments suitable RF shielding material may be applied to or in the fascia to reduce the level of RF interference from devices within the machine at the exterior of the fascia. Antennas or other appropriate radiation sensing devices may be positioned adjacent to or installed on the fascia. A change in RF radiation in the vicinity of the fascia exterior may result upon the installation of an unauthorized device. The RF signals can be detected by receiver circuitry, and signals or data corresponding thereto input to a processor. In some embodiments the circuitry may also determine the frequency of the radiation sensed to be used in resolving if it is within the range emitted by legitimate devices such as cell phones of users operating the machine. In other embodiments the circuitry may analyze the signals to determine if they are varying, and the circuitry and/or the processor may evaluate whether the changes in a signal correspond to the input of a PIN or a card to the machine.

In response to the sensed signal data, the processor may operate in accordance with its programming to evaluate the nature and character of the intercepted signals. For example, if the signals do not correspond to a legitimate source, such as a cell phone, the processor may operate to take actions such as to wholly or partially cease operation of the machine, capture images with a camera, and/or notify an appropriate remote entity through operation of the machine. Alternatively, the processor may compare the sensed RF signals to transaction activity at the machine. If the sensed signals are determined to be varying in ways that correspond in a pattern or relationship to card or PIN inputs, for example, the processor may operate in accordance with its programming to cause the machine or other devices to take appropriate programmed steps.

In still other exemplary embodiments the processor may be in operative connection with an RF emitter. The processor may operate in accordance with its programming to cause the emitter to generate RF signals that interfere with the detected signals. This can be done on a continuing basis or alternatively only at times during user operation of the machine when user inputs are likely to be intercepted. For example, the processor controlling the emitter may operate the machine or be in communication with a controller thereof. In such situations, the processor may operate to control the emitter to produce outputs at times when a user's card is moving into or out of a card slot, and/or when the machine is accepting a user's PIN or other inputs. Thus, the emitter may be operative to produce interfering signals during relatively brief periods so as to not disrupt RF transmissions for an extended period in the event an incorrect determination is made and the RF signals are from a legitimate source.

In some embodiments an emitter may be a type that transmits on a plurality of frequencies intended to disrupt transmissions within the expected range of frequencies for a fraud device. In other embodiments the emitter may be controlled responsive to the processor to match the frequency or frequencies of suspect signals that have been detected. Of course these approaches are exemplary of approaches that may be used. Some example embodiments may use features like those described in U.S. patent application Ser. No. 13/200,697 filed Sep. 28, 2011, the disclosure of which is incorporated herein by reference in its entirety.

In still some other embodiments the risk of interception of customer inputs to an automated banking machine may be reduced by using types of input devices that reduce or eliminate user contact with the machine. By reducing such user contact the possibilities for interception of user inputs may be reduced. For example in some embodiments the at least one controller of the automated banking machine may operate computer executable instructions which comprise eye tracking software. Eye tracking software may operate to determine from visible features of the user's eyes, where the user is looking. This may be done in exemplary embodiments by having infrared or near infrared emitters directed to an area of the user's eyes and positioning cameras or other image capture devices which can detect the reflected radiation from the user's eyes. By having such emitters and image capture devices adjacent to the display of the machine, the at least one controller in the machine is operative to determine the area on the display to which the user's eye or eyes are directed. This can be accomplished for example using eye tracking software available from Tobii Technology of Stockholm, Sweden that is sold under the trademark My Tobii. Of course this is but one of many commercial products that may be used for this purpose.

In exemplary embodiments the at least one controller in the machine may be operated to receive inputs such as a user's PIN by tracking where an automated banking machine user is looking. This may be done in an exemplary embodiment by the controller operating to provide output indicia on the display that instructs the user to gaze at certain features presented on the display. For example the display may output different colored rectangles in the corners thereof. The user may be prompted to gaze at each of the specific rectangles at different times. By detecting the reflected radiation from the user's eyes as the user looks at each of the rectangles, the at least one controller is able to determine where the user is currently looking.

Thereafter in an exemplary embodiment the user may be prompted to look at characters 20 or other indicia output on the screen and to select in sequence the ones which correspond to the user's PIN by gazing at each specific one and then blinking. In this way the user can gaze at the indicia corresponding to each of the characters of the PIN number and select each character in the proper order by blinking. In some embodiments this may be done by presenting all of the possible characters on a single output screen through the display while in other embodiments a subset of characters may be output in a plurality of different display screens. Further in exemplary embodiments the display may provide an output such as a star symbol each time that the user is sensed by the machine as having selected a character of a PIN number. Of course this is merely an exemplary approach. In some exemplary embodiments the display may also include indicia such as a rectangle which a user can gaze at after they have input all of the characters of their PIN number. This provides an input to the machine so that the machine can then operate to attempt to process a transaction using the characters that the customer has input. In addition in some embodiments the at least one controller may cause the display to output a rectangle or other indicia that a user can select to reset their PIN inputs. Thus for example, if the user happens to involuntarily blink in a manner which causes an erroneous input which does not correspond to a character of their PIN, the user can correct the error by resetting the inputs and start over.

In such exemplary embodiments because the movement of the user's eyes is not perceptible from vantage points that are observable by a third party, it is more difficult to intercept the customer's PIN input. Further in some embodiments even micro cameras which are surreptitiously mounted on the machine would generally not be effective to enable criminals to determine the user's PIN inputs based on observation of the user through the camera.

It should be understood that while this exemplary approach is described in connection with a user providing a PIN or other secret code to an automated banking machine, the principles may be used for receiving other inputs from banking machine users. This may include for example enabling users to provide transaction instructions to the machine. Such transaction instructions may include for example selecting transaction types and amounts. This may be accomplished in some embodiments by the at least one controller operating to present different transaction options as text in rectangles or other indicia on the screen. The user may operate to select one of the transaction options by gazing at it and blinking their eyes. Likewise amounts may be selected by presenting a representation of the numerical keypad through the display in response to operation of the controller. The user can then present inputs corresponding to numerical amounts by gazing at selected numerals and then blinking. Numerous types of inputs may be provided in this manner.

Further it is to be understood that while in this exemplary embodiment the approach of providing inputs has been discussed as the user gazing at a particular rectangular icon or other indicia on the screen and then blinking, in other embodiments other approaches may be used. This may include for example the user providing a machine input by looking at a particular item of indicia on the screen for more than a predetermined time so as to select it. Alternatively selections may be made through other eye movements such as moving the eye in a cross pattern centered on the particular item of indicia output on the display. Numerous approaches may be used employing the principles described.

In some exemplary embodiments the machine 10 is provided with enhanced diagnostic capabilities as well as the ability for servicers to more readily perform remedial and preventive maintenance on the machine. This is accomplished in an exemplary embodiment by programming the controller and/or alternatively distributed controllers and processors associated with the transaction function devices, to sense and capture diagnostic data concerning the operation of the various transaction function devices. In an exemplary embodiment this diagnostic data may include more than an indication of a disabling malfunction. In some embodiments and with regard to some transaction function devices, the data may include for example instances of speed, intensity, deflection, vacuum, force, friction, pressure, sound, vibration, wear or other parameters that may be of significance for purposes of detecting conditions that may be developing with regard to the machine and the transaction function devices contained therein. The nature of the diagnostic data that may be obtained will depend on the particular transaction function devices and the capabilities thereof as well as the programming of the controllers within the machine.

An exemplary embodiment includes an automated banking machine security arrangement. The automated banking machine (e.g., ATM) includes a Global Positioning System (GPS). A machine with GPS can include self-service features enabling a user of the machine to carry out transactions. As previously discussed, a machine can include a cash dispenser permitting a cash withdrawal transaction. As explained in more detail later, GPS (or some other position indicator) also enables more efficient servicing of a machine.

Systems and methods related to the monitoring, status, and servicing of machines may be found in U.S. Pat. No. 5,984,178, the entire disclosure of which is herein incorporated by reference.

An automated banking machine (or each machine in a network of machines) can be embedded with a GPS transceiver. The operation of a GPS is well known and need not be discussed in detail herein. The GPS module or unit can identify the geographical position of the machine by using a coordinate system. For example, the GPS unit can read its latitude and longitude coordinates with the use of one or more satellites. A machine with GPS technology allows the machine to annunciate its location. The machine can emit its coordinates through a variety of known communication mechanisms and methods.

In an exemplary arrangement, a machine is provided with GPS to permit tracking of the machine. The tracking can be beneficial in maintaining accurate location information on a plurality of machines, especially if certain machines are moved during their lifetime. As explained in more detail herein, tracking ca . . . '1 also be used to thwart thieves who are able to pickup and remove an entire unit.

A GPS unit (including an antenna) can be built into a machine so that the GPS cannot be dismantled. The GPS can be connected with a machine in a manner ensuring that the positional information (i.e., coordinates) of the machine can continue to be conveyed. For example, critical components of the GPS (and machine) can be battery backed to enable conveyance of the unit's position. This arrangement permits a GPS disconnected from its main power source to still have the ability to accurately obtain from one or more satellites the machine position. The GPS unit may comprise a satellite phone.

A computer or controller associated with the machine can request a reading of location data from the GPS unit. It should be understood that for purposes of brevity, herein a "computer" may comprise one or more computers or processors, whether in a single device or distributed among several devices. The GPS unit can obtain the machine position coordinates from one or more satellites. The machine computer can receive the location data from the GPS unit. The machine can transmit its GPS-obtained position to a service monitoring (or responsible for) the security of the machine. The security monitoring service center may oversee the monitoring of plural GPS-equipped machines. Communication between a machine and the security center (which may be the host computer associated with the machine) can be carried out in a known manner of communication, including the use of a phone line, a proprietary line, a wireless system, a satellite system, a network, an intranet, and/or the Internet. Critical components in the machine can also be battery backed to ensure communication with the GPS unit and the security center. A computer software program operating at the security center (or in the machine) can be used to determine if the normally stationary (or fixed) terminal has been improperly moved.

Figure 16:
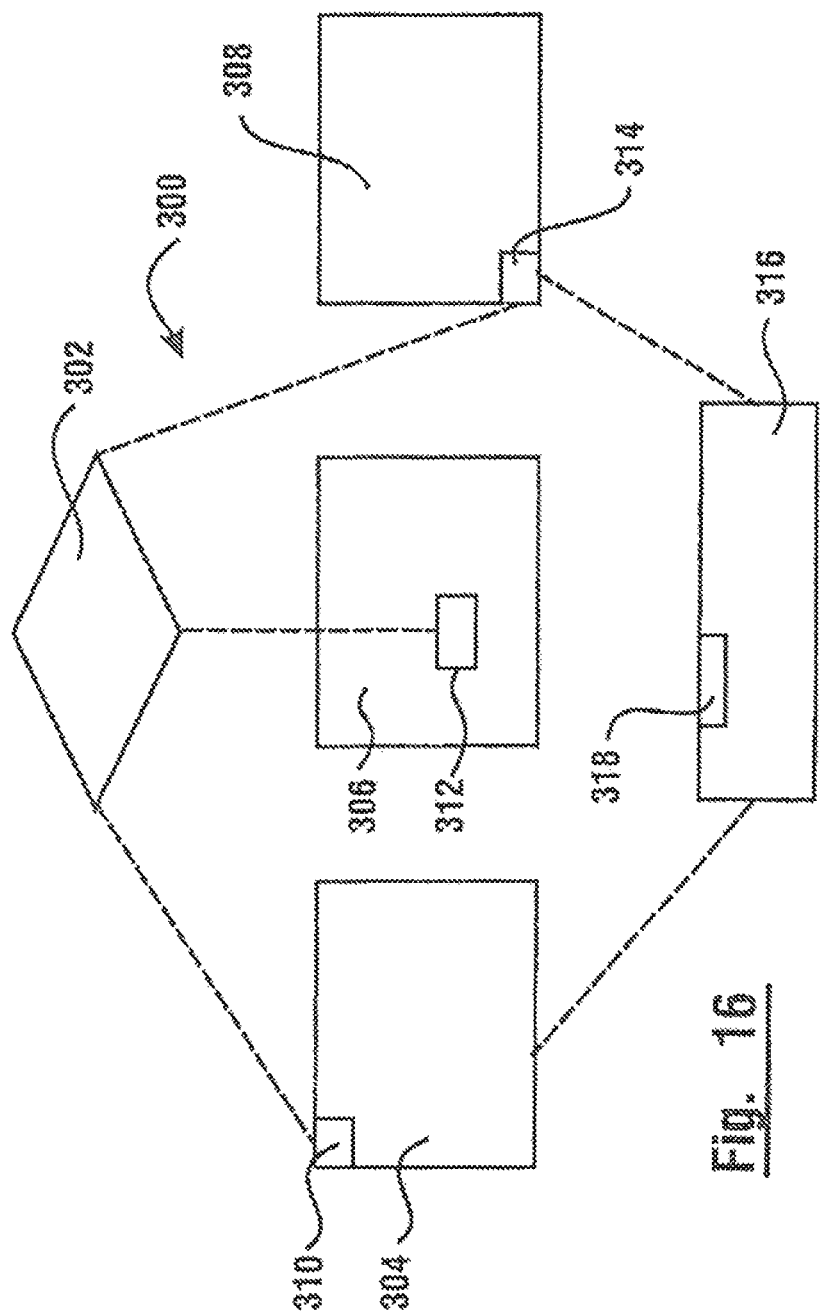
FIG. 16 shows an automated banking machine security arrangement.

FIG. 16 shows a shared security/monitoring arrangement 300 for plural machines. The arrangement 300 includes a satellite 302, machines 304, 306, 308 with respective GPS units 310, 5 312, 314, and a security/monitoring center 316. As previously discussed, the machines 304, 306, 308 can obtain a GPS reading via the satellite 302 and then transmit the read data to the security center 316. For example, a GPS reading may be obtained with a satellite phone which is able to transmit the GPS data to a web site accessible by the security center computer. The security center 316 can include many different types of communication devices, including a cell phone system 318.

A stolen machine having GPS technology enables movement of the stolen machine to be tracked. One or more computers operating in conjunction with a security center enable the current position of a moving machine to be tracked in real time. Software operating in a security center computer can be used to present the individual GPS-reported machine positions as a simultaneous path of travel. The software can overlay the travel path of a stolen machine onto a road map of the surrounding area. Authorities can be kept informed as to the route of the tracked machine. The real time overlay map can also be downloaded (e.g., via the Internet) from the security center to the authorities (e.g., police). The monitoring arrangement permits a stolen machine with GPS to be recovered.

The security center can be in operative connection with a database containing the locations of respective machines stored in memory. The security center can use a computer (e.g., a host computer) to compare a received machine GPS location to the stored location assigned to that particular machine. If the compared locations do not substantially match, then the computer can determine that the machine was stolen and, responsive thereto, cause proper action to be initiated. The comparison may include a predetermined percentage error range to compensate for GPS reading calibrations, fluctuations, deviations, and other factors. Additional GPS location data readings and location comparisons may be performed to ensure accuracy before a final determination on theft is made.

Figure 17:
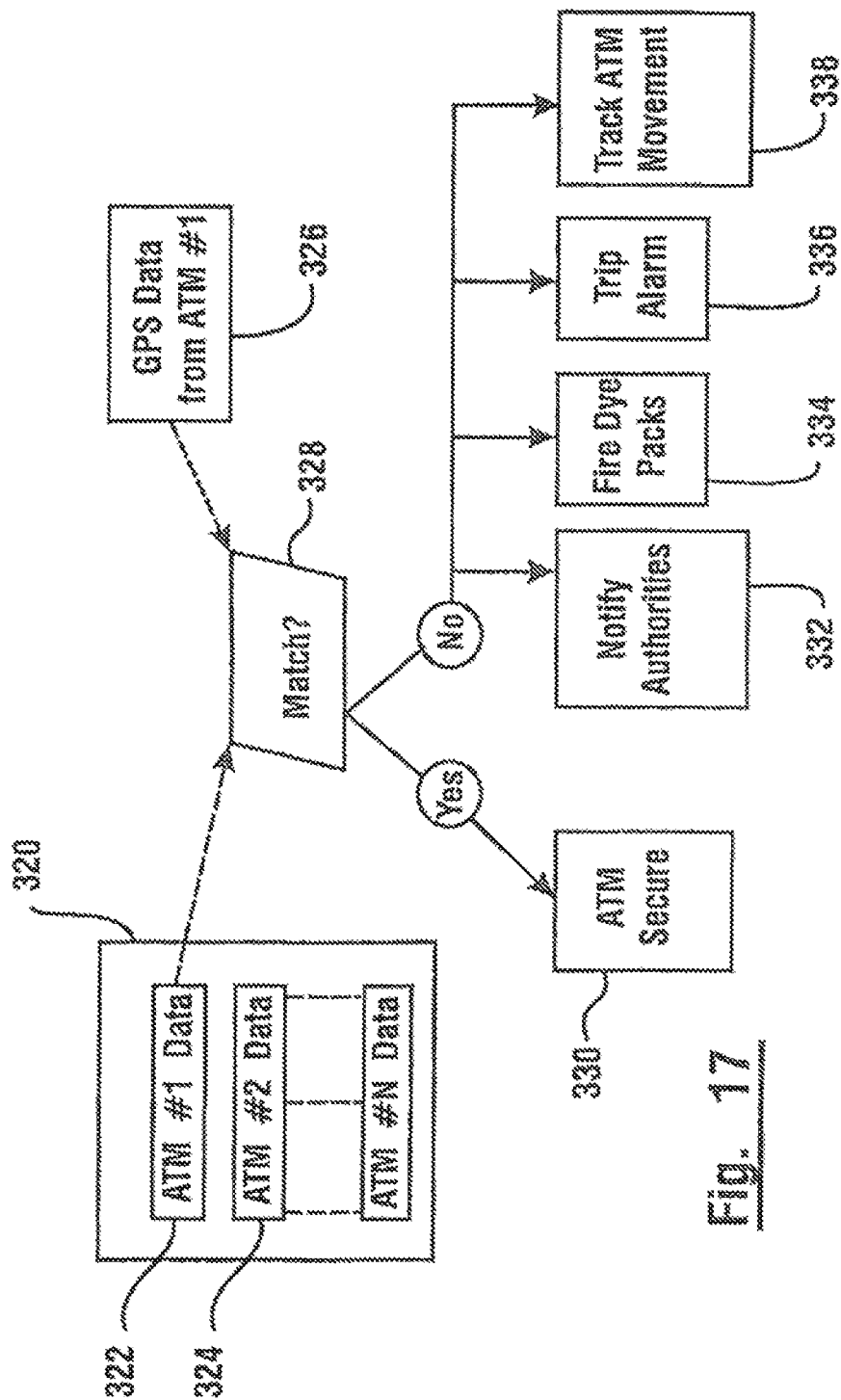
FIG. 17 shows an arrangement for comparing GPS location data to stored location data.

FIG. 17 shows steps in a process of comparing read GPS location data to stored machine location data. Location data for a plurality of machines (i.e., ATM #1 to ATM #N) is stored in a database 320. Stored data 322 includes location data corresponding to the fixed or assigned location of ATM #1 (e.g., machine 304). Stored data 324 includes location data corresponding to the fixed location of ATM #2 (e.g., machine 306). GPS data 326 was obtained using the GPS unit of ATM #1. The location data in the stored data 322 for ATM #1 is compared to the GPS location data 326 for ATM #1 by using a computer 328, which may be in the security center 316. If the comparison results in a corresponding "Yes" match, the ATM #1 is determined as secure.

However, if the comparison does not result in a corresponding match, then the security status of ATM #1 is determined as stolen. Following a "No" match, at least one of the response actions 332, 334, 336, 338 can be executed, as explained in more detail later. That is, response to a determination of theft one or more actions can be initiated, including notifying 332 the authorities about the theft, firing 334 dye packs located in the stolen machine, tripping 336 an alarm in the stolen machine, and/or tracking 338 movement of the stolen machine. It should be understood that a security center 316 can include the database 320 and the computer 328, and cause commencing of the actions 332, 334, 336, 338. Alternatively, the database 320 can be remotely located from the security center 316, yet in operative connection therewith to enable the security center to request and receive location data from the database (and store data in the database).

Figure 18:
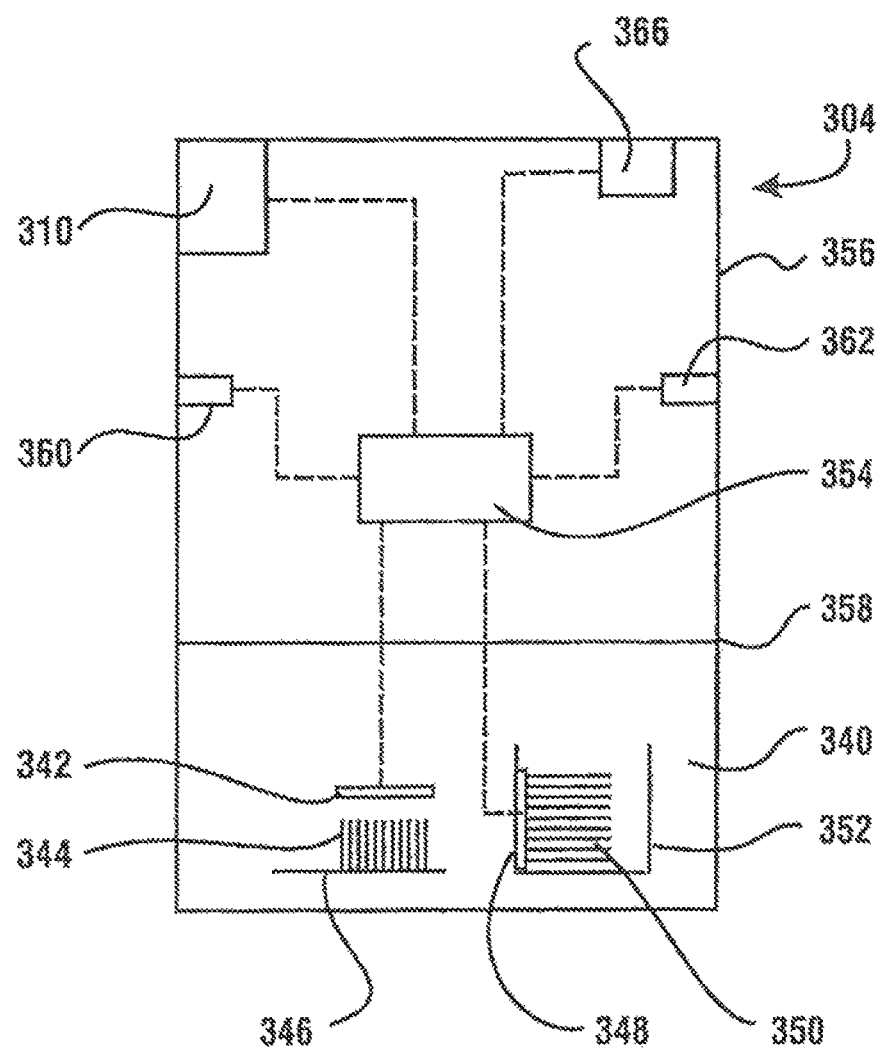
FIG. 18 shows an automated banking machine with GPS.

The GPS location analysis performed by the security center 316 for a particular machine can be used to cause the firing of dye packs in that particular machine. FIG. 18 shows the machine 304 including a secure chest or safe portion 340. The chest 340 includes a dye pack 342 adjacent to cash 344 in a currency dispenser 346. The cash 344 may be in a currency cassette in the currency dispenser 346. The chest 340 also includes a dye pack 348 adjacent to cash 350 in a cash deposit bin 352. The cash deposit bin 352 can hold cash that was deposited by machine users or cash that was not taken following a cash withdrawal transaction. The GPS transceiver 310 and a machine computer 354 are also shown. The computer 354 can cause firing of the dye packs 342, 348. The computer 354 can be instructed by the security center 316 to fire the dye packs 342, 348. The example machine 304 further includes movement sensors 360, 362. Although the GPS unit 310 and the computer 354 are shown in the upper portion 356 of the housing 358, it should be understood that they may be situated inside of the secure chest portion 340 of the housing (e.g., like GPS unit 314).

Different communication methods can be used in carrying out the determination of whether a machine was stolen. In one arrangement the machine computer 354 can periodically obtain a regularly time-based location reading from the GPS unit 310 (i.e., predetermined reading times). In another arrangement the computer 354 can continuously receive updated GPS data from the GPS unit 310. The machine 304 (or the GPS unit 310) can transmit the read GPS location information to the security center 316. The security center 316 analyzes the transmitted GPS location information (e.g., by performing the previously discussed location comparisons) to determine if inappropriate movement (e.g., theft) involving the machine 304 has occurred. As previously discussed, response actions 332, 334, 336, 338 can also be initiated via the security center 316.

In another arrangement the machine 304 can use the sensors 360, 362 (e.g., motion detectors) to detect movement (e.g., tilt, lateral, vertical, and/or horizontal movement) of the machine 304. The computer 354 is in operative connection with the sensors 360, 362 to receive information therefrom. In response to a sensed machine movement, the computer 354 can take action to thwart the suspected theft of the machine 304. For example, the computer 354 can cause the dye packs 342, 348 to be fired. The computer 354 may notify the security center 316 of the sensed machine movement. As previously discussed, the security center 316 can initiate response actions 332, 334, 336, 338 to thwart the suspected theft of the machine.

Alternatively, an analysis of GPS location information can be used to verify whether or not the sensed machine movement was the result of the machine 304 being illegally moved from its expected location or because of some other disturbance (e.g., an earthquake). In response to a sensor 360, 362 detecting movement of the machine 304, the computer 354 can request a location reading from the GPS unit 310. The machine 304 transmits the acquired GPS location data 326 to the computer 328 associated with the security center 316. Again, the security center 316 can compare (as previously discussed) the GPS location data 326 to stored location data 372 to determine whether the particular machine 304 (i.e., ATM #1) was actually moved from its foundation. Thus, both movement sensors 360, 362 and GPS 310 can be used together to accurately determine whether or not a machine was stolen.

In a further arrangement the plurality of machines 304, 306, 308 each include a wireless cell phone. FIG. 18 shows the machine 304 including a cell phone system 366. The computer 354 is in operative connection with the cell phone 366. Each machine can use their cell phone to call the security center 316, which includes the cell phone system 318. Each machine is also operative to receive calls from the security center 316. The security center cell phone system 318 is operative to simultaneously communicate with plural machines via their cell phones.

The security center 316 is in operative connection with a database having memory for storage of cell calling area information corresponding to each respective machine cell phone. The stored cell calling area information can be in previously discussed database 320 or it can be in a separate cell database. FIG. 19 depicts an expanded portion of the database 320 showing additional machine information. The previously discussed stored data 322 corresponding to ATM #1 is also depicted. For ATM #1 the identity data 370 is stored in corresponding relationship with the machine's location data 372, cell phone number data 374, and call cell data 376. The database 320 enables the identity 370 of a machine to be ascertained via its stored location data 372 or by its stored cell phone number data 374. Likewise, a machine location 372 can be identified via its cell phone number 374, and vice versa. That is, in the database 320 each machine cell phone number is also stored in corresponding relationship with a respective cell calling area. For example, phone number data 374 is stored in relation with cell data 376.

The cell assigned to a machine can be the call cell in which that machine is physically located. That is, the assigned cell can be the cell in which the cell phone (of the fixed machine) would use to originate a phone call. The stored location data for a particular machine can be 25 used to determine which cell is to be assigned to the phone number for that particular machine. That is, the assigned cell can be based on the stored (and assigned) location. For example, the cell calling area which covers the location 372 of ATM #1 can be used as the cell 376 assigned to ATM #1. Using the stored location data enables the database to be quickly updated to reflect any changes in cell areas, cell providers, etc.

It should be understood that some machines may be located in the same cell calling area. Thus, these machines could be assigned the same cell data in the database 320. For example, both ATM #1 and ATM #3 could have the same stored cell data. Contrarily, a cell in the database may be assigned to only a single cell phone number because the phone number belongs 5 to an isolated distant machine. For example, the cell data assigned to ATM #2 may be the only instance of that cell in the entire database 320.

An exemplary security checking operation involving the cell phone arrangement will now be discussed. A machine computer 354 causes the machine's cell phone 366 to periodically call the security center cell phone system 318. The security center 316 uses the computer 328 (or another computer) to perform an initial analysis of the received call. In an exemplary embodiment of first level security analysis, the security center 316 can recognize which machine cell phone placed the call, such as by using caller ID, etc. The security center 316 can use this information to learn the cell assigned to the machine from which the call was made. For example, the security center 316 can use caller ID to ascertain the phone number 374 belonging to a call originating from the phone of the not yet identified machine. By knowing the phone number 374 the security center 316 can use the database 320 to identify the machine as ATM #1. The security center 316 can further use the database 320 to determine the cell 376 assigned to ATM #1. Thus, the assigned cell 376 is known. Next, the security center 316 needs to compare the assigned cell 376 to the used cell. The security center 316 can obtain the cell used by the machine phone. Triangulation calculations or secondary sources may be used in obtaining the cell in which the call was made. The security center computer 328 can then compare the obtained cell to the cell 376 assigned to that particular machine 370.

If the compared cells do not match, then it is determined that the cell phone of ATM #1 was moved out of its assigned cell area 376. The security level for ATM #1 can be flagged as suspect. Thus, the theft of ATM #1 can be viewed as suspect. In the first level of security analysis, improper movement of a particular machine can be suspected via the machine's cell phone, without using the machine's GPS unit. Although ATM #1 was used in the example, it should be understood that a first analysis can be applied to any of the machines in the network.

Returning to the exemplary example, following a suspicion of theft of ATM #1, the security center 316 can initiate appropriate response actions 332, 334, 336 338 to thwart the suspected theft, as previously discussed. Alternatively, in response to the suspicion, the security center 316 can begin another (second) level of security analysis on ATM #1. That is, a second analysis can be performed before a response action 332, 334, 336, 338 is initiated by the security center 316. The second analysis can be performed to double check or validate the suspicion of theft of ATM #1. The second analysis can be independent from the first analysis. The second analysis can use the GPS unit of ATM #1.

In an exemplary embodiment of second level security analysis, the security center 316 submits a request to the suspect ATM #1 asking for an updated GPS reading. The request can be communicated in a manner previously discussed, including using cell phone communication. In a manner previously discussed, a machine computer 354 attempts to obtain an updated reading with its GPS unit 310, and then transmit the updated reading to the security center 316. The security center 316 can then compare (as previously discussed) the updated GPS location data 326 to database location data 372 corresponding to the suspect ATM #1. Based on the location comparison, the security center 316 can determine whether the suspected theft activity was founded. If an updated GPS reading is no longer obtainable then this information can also be a factor in the determination. Once a determination is made that the machine was actually illegally moved (i.e., stolen), then responsive actions such as notifying authorities 332, firing dye packs 334, starting an alarm 336, and/or machine tracking 338 can be initiated to thwart the theft. In other security arrangements, the machine does not have to rely on a security center to perform a determination of machine movement. In an exemplary embodiment the machine's own computer can make the determination.

A machine computer can have a backup battery power source. Battery sources for computers are known in the art. A machine computer 354 can have access to location data locally stored in the machine. For example, the machine data 322 can be stored in ATM #1 or in a security software program operating in ATM #1. The location data 372 for ATM #1 may have been previously downloaded to ATM #1 for storage therein. Thus, the ATM #1 computer 354 itself (instead of the security center) can run a security computer program to perform a comparison of the machine's assigned location 372 to the location obtained from the machine's GPS reading 326. If the machine computer 354 determines that the locations 372, 326 do not match, then the machine computer 354 can cause a machine alarm to trip and/or notify the security center (or other authorities) regarding the theft of the machine. Again, the security center can cause appropriate response actions 332, 334, 336, 338 to be carried out. In another security arrangement, motion sensors, GPS, and a cell phone (or cell phone modem) can be used in combination to analyze the status of a machine. For example, a machine GPS unit can periodically or continuously receive position readings. The GPS unit and cell phone are in operative connection so that the cell phone can receive GPS data from the GPS unit (even when the cell phone is in an "off" or sleep condition). Detected motion of the machine (via a motion sensor) causes the cell phone to be placed in an "on" or awakened condition (i.e., turned on). The cell phone when turned on is programmed to transmit GPS data to a satellite. The satellite can receive the transmitted data and recognize the data sender (i.e., the cell phone/machine). The satellite can then send the GPS information and sender data to a web site that allows monitoring of the machine's location. That is, the web site can be accessible by a security center computer.

It should be understood that various alternative combinations may be used in the exemplary embodiments. For example, a cell phone can be programmed to receive and transmit the GPS data. A cell phone can include the GPS system. Also, while motion is detected, a cell phone can be periodically turned on (e.g., every minute) to receive and/or transmit the GPS data. When movement of the machine stops, so do the transmissions. Furthermore, the cell phone can bypass the satellite to send the GPS information (and cell phone/machine ID data) directly to the web site (or a database). A computer may link the GPS unit and the cell phone. Alternatively, a GPS satellite phone may be used.

A machine's alarm can be tripped responsive to reading GPS data. The alarm can also have a backup battery power source. An alarm controller in the machine can activate the alarm in response to the machine's security computer program determining movement of the machine via the GPS reading (and/or via one or more movement sensors). The alarm can be audible or silent. A silent alarm can notify a security center or authorities. An audible alarm can have different decibel levels. A higher decibel level, which is uncomfortable to a thief operating the getaway vehicle, may be used while machine movement is detected. The alarm can be switched to a lower decibel level when machine movement is no longer detected, or vice versa. Hence, a machine can have a plural stage audible alarm. Furthermore, known functions for drawing attention to a stolen machine or cash may additionally be used. For example, the GPS can also be associated with tripping a cash staining device (e.g., dye packs) located in the machine.

In a further exemplary embodiment, even if a machine 304 is stolen, the cash in its chest portion 340 (or safe) can be rendered useless to the thieves. The security system in the machine can also monitor the sequence that was used to open the chest 340. The security system, which 10 can include the computer 354 and a software program operable in the computer, can recognize a normal (or permitted) chest opening sequence. The security system can also detect a non-normal (or non-authorized) chest opening sequence. If the chest is not opened in the proper sequence, then the security system can act to have cash 344, 350 inside the chest 340 marked in a manner indicative of stolen cash (e.g., stained/dyed cash). The software can be programmed to monitor chest opening sequences. Alternatively, the software can be programmed to initiate monitoring of a chest opening sequence following a detection of suspicious (or confirmed) machine movement.

An example of a normal sequence for accessing the cash in the chest will now be discussed. The predetermined chest door opening sequence can include a plurality of sequence events. In the example, the machine is first put into a maintenance mode. Next an unlocking of the chest door occurs. This may include entering one or more correct combinations. Next the chest door handle is turned to cause an interior lock bolt to move to unlock the chest door. Then the chest door is pivoted or swung to an open position to provide access to the chest interior. It should be understood that the opening of the chest door may be one of the sequence events. The performing of certain steps in the sequence can be a prerequisite for later steps.

Sensors can detect whether a predetermined (normal) sequence portion was carried out. The sensors can be in operative connection with the security system computer to provide feedback to the computer. Again, the security system, including the computer and sensors, can operate with a backup power source, such as one or more batteries.

The computer can be informed or recognize when the machine status condition is in maintenance mode. Sensors can be used to detect when unlocking of the chest door occurs. The entering of mechanical or electronic combinations can be sensed. Sensors can detect when the chest door handle is turned. Sensors can be positioned adjacent to the handle to detect movement of the handle. Motion sensors can be positioned adjacent to the lock bolt work components which (in the predetermined sequence) would need to move to permit opening of the chest door. Other sensors can be used to detect when the chest door was moved from a closed position to an open position. An example of a lock bolt work arrangement for an automated banking machine may be found in U.S. Pat. No. 5,784,973, the entire disclosure of which is herein incorporated by reference.

The software operated by the security system computer can analyze the sensor input to determine if any events or steps in the normal chest door opening sequence have been bypassed. The software can compare the sensed (performed) sequence events to the stored (expected) predetermined sequence steps. For example, the machine computer can monitor and track sequence event occurrence. Responsive to the monitoring, the computer can determine whether all expected sequence events have occurred. The computer can assign a condition (e.g., positive or negative) to the chest door opening status. Therefore, when opening of the chest door is detected, the computer can conclude whether to fire the dye packs.

In a non-normal chest opening sequence the chest door was opened, but not in the expected sequence. For example, the chest door (or other chest components) may have been drilled or burnt to enable the chest door to be opened for accessing the cash. The exemplary machine security system can detect if a chest bolt was unlocked without the chest door lock first being unlocked (or other optional prerequisite steps, e.g., maintenance mode, combination, code access, etc.). For example, the security system can detect whether the door combination was not correctly (or ever) entered, yet the chest's interior bolt was moved to an unlocked position. The security system can also detect whether the chest door was opened without turning of the door handle. The security system can make a determination that unauthorized access was granted to the chest interior responsive to the door being opened (or in an unlocked position enabling opening thereof) out of sequence. The detection of a non normal chest door opening sequence (or order) can be interpreted as an attack against the chest (and any cash therein).

In response to a determination of an attack against the chest, the cash 344, 350 inside the chest 340 can be devalued by the security system. The chest 340 includes a chest door, such as previously discussed chest door 18. The chest door in an open position enables a service person to access devices and components in the security chest interior. The security system includes a currency staining system, and a method of actuating the staining system. For example, the security system can include dye packs 342, 348. The dye packs 342, 348 call be located in the chest 340 adjacent to the cash 344, 350. The security system can cause the dye packs 342, 348 to be activated (e.g., fired or exploded) to release the dye therefrom.

The security software operating in the machine computer 354 can be programmed to cause the computer 354 to initiate firing of the dye packs 342, 348 in response to a determination that the door of the chest 340 was opened (or moved) without following (or completion of) a required sequence (or pattern) for opening the chest door. That is, dye packs can be triggered to fire upon unauthorized movement of the chest door. The computer programming software in the security system can be read by the computer 354 to determine unauthorized chest access and initiate an electronic firing of the dye packs.

The machine security system computer may determine that the door opening sequence is improper prior to the chest door being opened. Thus, the computer may be programmed to automatically fire the dye packs when the chest door is still closed but is detected as being placed in an unlocked condition. In other programming embodiments firing of the dye packs may not occur until the chest door is actually opened. For example, the computer may not determine an improper sequence until the chest door was actually opened.

In alternative embodiments the computer can issue a warning of a detected improper chest opening sequence. Such a warning can be audible or visible (e.g., a display message, etc.). The warning may be presented in a manner that is undetectable (silent) to the public, but detectable to an authorized service person. The warning may be presented as a flashing light at the rear of the machine. The warning may be presented via a cell phone call to a specific number at a security center. The warning may be beneficial to an authorized service person who inadvertently generated an out-of-sequence step. A code can be inputted to the machine to override or reset the out-of-sequence programming, or disable firing of the dye packs. Entry of the code may be time based. For example, if the code is not entered within a predetermined time period, then override is no longer a valid option.

Dye released from a dye pack 342, 348 is operative to deface cash (i.e., currency or money or notes or bills) in a known manner. The size and amount of dye packs and their placement relative to cash in a chest can be strategically predetermined to ensure optimum devaluing of all the cash in the chest upon activation of the dye packs.

New machines can be provided with the sequence monitoring security system. Existing machines can be retrofit with the security system. Because the sequence monitoring security system can be provided in some machines without needing any additional sensors or alarm grids, it can be easy to provide a low-cost retrofit. The sequence monitoring security system may be provided as a backup to normal anti-theft detection arrangements for machines.

As previously discussed, a machine computer can cause dye packs to be fired, such as in response to a security software program detecting an improper chest opening sequence. That is, a computer can control operation of the dye packs. As previously discussed, a computer can also communicate with the security center computer. Thus, the security center can directly communicate instructions to the machine computer, including instructions for the computer to fire the dye packs. That is, regardless of the monitored security status of a chest opening sequence, a machine computer can be instructed by a security center to activate the dye packs at any time. Thus, dye pack activation can be independent of chest opening sequence monitoring.

As previously discussed, dye pack activation can be a response action 334 to machine theft. A security center 316 can use machine GPS information 326 to confirm that a machine was stolen. Responsive to the confirmation of theft, the security center 316 can instruct the machine computer 354 to actuate its dye packs 344, 348. Upon the computer 354 receiving the instruction to fire the dye packs 344, 348, the machine computer can cause the dye packs to be exploded to stain the cash 344, 350 located within the interior of its chest 340. Thus, the staining of money inside of a machine can be the result of a positional reading taken with a GPS unit of that machine.

In another exemplary arrangement, the security center itself can directly signal machine dye packs to fire. That is, the security center can fire the dye packs without using the machine computer. The security center may cause the dye packs to be activated following a theft confirmation. The signal from the security center to a dye pack may be encrypted. A dye pack can have a trigger device (or a detonator) set to fire upon receiving a predetermined frequency or wave. A radio frequency may be used. The frequency can be unique to a particular dye pack or a series of dye packs in a particular machine. The security center can generate and transmit the frequency. Alternatively, if the security center is too far from the machine, then the security center can cause the machine (or another nearby source) to initiate or generate the triggering frequency.

It should be understood that the scope of the described concepts for determining whether an automated banking machine was moved is not limited to the embodiments disclosed herein. For example, image recognition, land-based radar, and sound waves can also be used in determining whether a machine was stolen. A camera unit can be fixedly mounted to periodically capture an image of a machine. The camera unit can transmit the image to a security center. The security center can have an original image of the machine stored in a database. The security center can use image recognition software to compare the image received from the camera unit to the image in storage. Likewise, data relating to land based radar and/or sound waves can be used in determination comparisons. If compared data does not match, then an appropriate response action can be initiated by the machine, as previously discussed. Alternatively, one or more additional analyses may be performed to confirm that the machine was actually stolen. The confirmation analyses may include security comparisons already discussed, including comparisons involving data related to movement sensors, phone cells, and/or machine GPS.

A machine may need servicing (e.g., transaction function device malfunction, cash replenishment, low paper supply, predetermined maintenance, etc.) A machine with GPS provides a service center (which may comprise the security center) the ability to identify the closest service personnel to the machine. A dispatching program can operate in a service center computer (or a machine host computer). The service center can receive both GPS information and a service request from a machine. The GPS information and service request may be received in the same transmission packet. The service center can also receive (e.g., via GPS, address input, phone, voice, etc.) the current (or latest) locations of service personnel in the field. The dispatching program can determine which available service person can reach the machine needing service the quickest. The program can match service personnel to service-needing machines for optimum efficiency.

The dispatching program can also use received machine GPS information to generate optimal directions for the chosen service person to use to reach the machine. The directions can include the most efficient route. The directions can be transmitted to the service person in a known manner. The dispatching program can also operate in real time with regard to current traffic conditions that may influence the route decisions, and hence the servicer-to-machine matching. Thus, the chosen servicer may not necessarily be the closest servicer in distance. In an exemplary embodiment, the servicer is chosen based on smallest estimated travel time. The use of automated banking machine GPS allows a servicer to reach a machine in the quickest manner. The ability to quickly associate the position of a machine needing servicing with the current positions of available service personnel results in a more efficient service dispatch. Machine operating efficiency can be improved.

In other exemplary embodiments, a machine can signal what type of servicing is needed. Thus, a servicer may be chosen based on smallest estimated travel time in conjunction with the needed skill level of the service person.

It should be understood that the use of GPS for servicing applies to both fixed and portable (or movable) machines. For example, a portable machine may be built into a vehicle that is able to drive to different sporting events, entertainment venues, etc. The portable machine can be used (e.g., cash withdrawal transactions, etc.) by users at the events. Again, the ability to use GPS to quickly analyze or compare the current position of a portable machine with the current positions of available service personnel results in a more efficient service dispatch.

The previously discussed use of GPS enables a machine to be installed at any location just by plugging it in. Thus, in alternative embodiments there is no need to keep a database on where machines are located, because GPS tracking keeps the security/service center aware of their location, especially for purposes of servicing. A dynamic database of machine locations can be established and automatically updated.

The ability to locate a machine's geographical position can also be used to enhance the usage security of other automated transaction machines (e.g., ATMs). An exemplary embodiment combines the signals of a GPS system with a cellular device (e.g., cell phone) to provide information related to the geographical location of the cellular device user. That is, the exemplary embodiment includes the ability to track cellular devices using a combination of cellular or GPS/cellular technology. A cellular device can be equipped with a GPS receiver and/or transmitter.

For purposes of this disclosure a cell phone shall be deemed to include a cell phone, PDA, pager or other device that has audio and/or text communication capabilities. It should be understood that although a cell phone is used as the cellular device (or cellular object) in some exemplary embodiments herein, other cellular devices can likewise be used. That is, a cellular device need not be limited to a phone. For example, an object such as a card, key, time piece, wallet, vehicle, human body, etc. may have cellular technology (and/or GPS technology) embedded therein or thereon which allows the location of the object to be ascertained. Cell triangulation is one method to remotely determine the current location of a cellular object. Likewise, GPS communication is one method to remotely determine the current location of an object having GPS technology (e.g., GPS transmitter and/or receiver).

An exemplary cellular embodiment includes the ability to obtain the geographical location of an automated banking machine (e.g., ATM). As previously discussed, a machine location can be obtained via an embedded GPS device in the machine or a database of machine installation locations. Thus, a machine user's cell phone location can be compared with the machine location to determine if the user is an authorized user.

The arrangement can be operated independently or as part of a fraud prevention (or security) service to which a machine cardholder can join. A member in the fraud prevention program grants permission for his cell phone's location to be known to the provider of the security service whenever his account (or one of his accounts) is accessed at a machine. The member provides to the service provider the information (e.g., cell phone number, cell phone provider, contacts options, etc.) necessary to set up the service. The service provider program can be provided by a partnership between a financial institution (e.g., bank), a transaction processor host, and one or more cell service providers. Alternatively, the program can be controlled by a sole proprietor.

Different types of member-selectable contact options are available. For example, the program can be set up to alert a member about a transaction that is being requested on his/her account from a machine which is not within reasonable proximity to his/her cell phone. The service provider notifies the member via the member's cell phone that a transaction is being requested at a particular machine. Another selectable option can include having the service 10 provider prevent a transaction request from being carried out when the machine location and the member's cell phone location do not substantially correspond.

Figure 22:
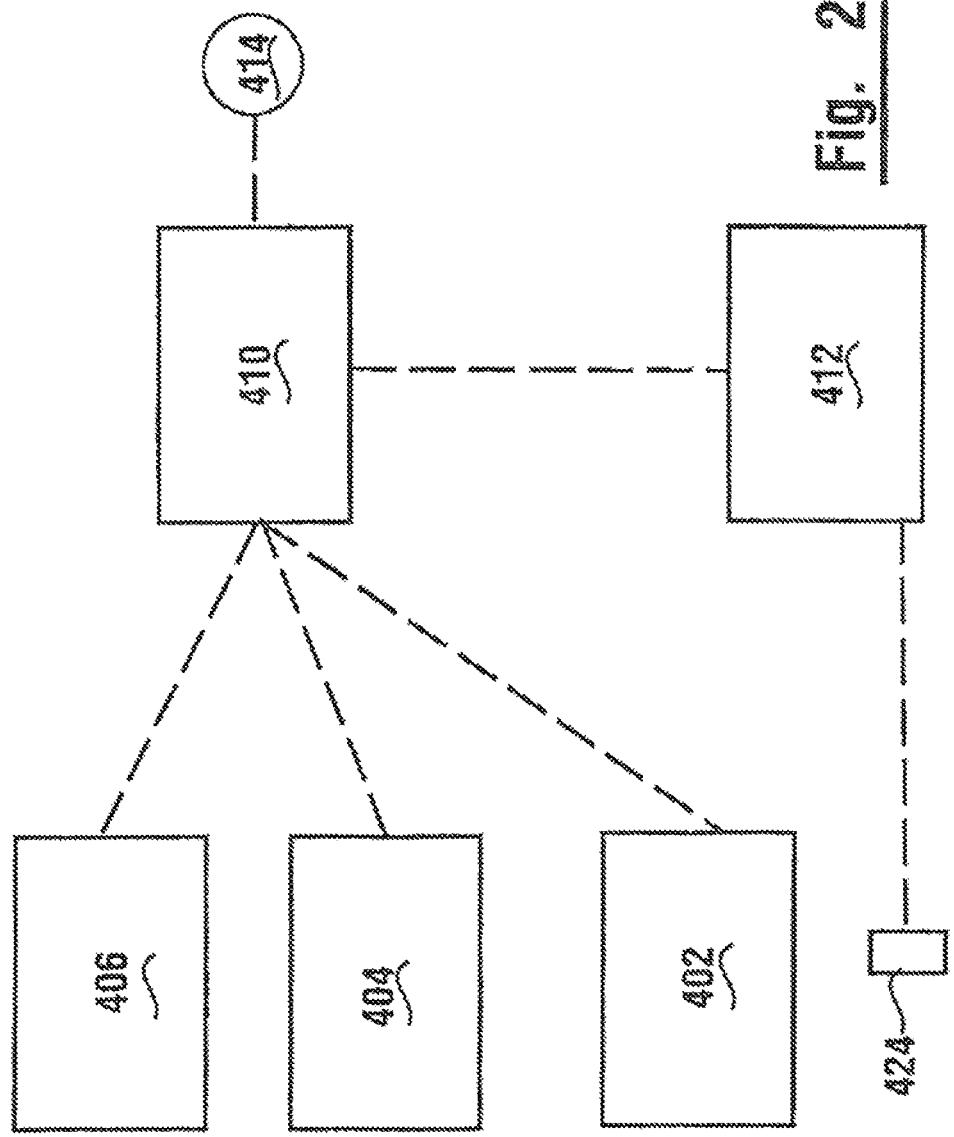
FIG. 22 shows an exemplary fraud prevention service arrangement.

An exemplary method of operation of a fraud prevention service will now be explained with reference to FIG. 22. As shown, the exemplary system arrangement 400 includes machines 402, 404, 406, a machine host 410 in communication with the machines, a cell phone locator system 412 in communication with the host, and a member's cell phone 424.

A machine 402 receives user identification data from a customer. The identification data may be received during a transaction request. The identification can be in the form of a name, account number, PIN, code, password, data sequence, biometric data, or some other information linking a person to an account. The identification can be input or provided by the customer to the machine 402, such as from a card or a biometric type of input (iris scan, fingerprint, etc.). For purposes of this disclosure card data includes data read from a card or other object through operation of the machine that can be used to determine a corresponding financial account. Alternatively, the identification may be determined from some other customer input or a customer item read by the machine 402.

The machine 402 sends the user identification data to a computer of the host 410. The host computer can be part of a host system for a machine network. Each of the machines is in communication with the host. In some embodiments the host 410 can communicate with other computers outside of the machine network in carrying out a transaction.

The host 410 can operate to determine the machine location from a GPS device in the machine 402. Alternatively the host 410 can determine the machine location from one or more databases 414 that includes the locations of the machines in the network. The host has access to the database 414. The machine can provide its machine ID to the host during communication with the host. For example, the machine ID can be sent to the host when the user identification data is sent to the host 410. The host can compare a machine ID to machine IDs in the database to ascertain the location of a machine. In other arrangements, data obtained by the host via a GPS device in a machine may first need to be compared with a database to ascertain the location of the machine.

The host 410 can also determine the cell phone 424 assigned to the received user identification data. The database 414 links authorized machine users to their cell phones (and their accounts). For example, the host can compare received (or determined) account data to account data in the database 414 to ascertain the cell phone assigned to that account. The host 410 is in operative communication with a cell phone locator system 412. In some embodiments the cell phone locator system may comprise a separate computer or computers and other hardware that is operative to determine cell phone location, while in other embodiments the cell phone locator system may comprise software instructions operative in one or more computers that operate in conjunction with other functions and determine cell phone location through communication with other devices or systems. The host can request the cell phone locator system 412 to provide the location of the cell phone 424 corresponding to the user. The host can provide the cell phone locator with a cell phone number, a cell phone account number, or other information corresponding to the ascertained cell phone.

The cell phone locator system 412 receives the host request and determines the current location of the cell phone 424. The cell phone locator can use cell triangulation to determine the current location of the cell phone. Alternatively, the cell phone locator can use a GPS device in the cell phone to determine the location of the cell phone. For example, the cell phone may receive a request from the cell phone locator to report its location. In response to the request, the cell phone can find its location (or GPS coordinates) using its GPS receiver. The cell phone then communicates the location data to the cell phone locator using cellular technology. Alternatively, the cell phone may transmit its location to the cell phone locator system using (via satellite) GPS technology. Thus, the cell phone locator system 412 knows the location (or GPS coordinates) of the cell phone.

The host 410 receives the location of the cell phone from cell phone locator system 412. Alternatively, the host can receive (via GPS, RFID, bar code reader, etc.) the location of the cell phone directly from the cell phone. The host can then compare the cell phone's location to the machine's location. If the locations correspond, then the received user identification data is authenticated. The current machine customer (adjacent to the machine) is determined as an authorized user of the account. The transaction request is approved.

If the locations do not correspond, then the host may operate in accordance with its programming so that the current machine customer is denied the ability to perform transactions with that account (corresponding to the received identification data). That is, a transaction request (and/or use of the machine) would be denied. The security arrangement prevents an unauthorized machine user (i.e., a thief) from using a machine card that was stolen from a service member, to perform a transaction at the machine involving the member's financial account. Thus, even if a member's card and PIN are stolen by a thief, the fraud prevention service can still prevent unauthorized machine access to funds in the member's bank account. Because of the additional cell phone security feature, the thief's use of the machine would be limited (e.g., card entry, PIN entry, etc.), and would not include theft of the member's money.

It should be understood that cell phone and machine locations are deemed to correspond through operation of the system based on predetermined variables. Particular variables can be assigned to particular users of the fraud prevention service. For example, one correspondence may require that the compared locations be within a predetermined degree or distance from each other. In another acceptable correspondence arrangement, the machine location may have to be physically located within the same cell as the cell phone. Correspondence may also be time sensitive. For example, a member of the fraud prevention service can have their account set up such that machine usage is only permitted during specific times of specific days. Thus, time can be another factor (or variable) that may have to be met (along with correspondence between cell phone location and machine location) before a transaction is authorized. In still other arrangements, time can be chosen by a member as the only variable. For example, a member who only needs limited access to a machine may select their machine access time period as limited to 9-10 a.m. on Saturday mornings. Any (fraudulent) attempt to access this person's account at a machine outside of this designated time period would be denied. The fraud prevention system is flexible and enables users to select and/or change their assigned variables to meet their particular needs and safety concerns. This may be done for example by the user establishing the parameters through correspondence with their financial institution when they establish the service. Alternatively or in addition the user may establish and/or change their desired usage parameters through communication with the bank in connection with an online banking system. Thus, for example, users who have the online banking service and the associated secure communications associated therewith may be given the option to modify their machine usage parameters through an online interface which thereafter operates to cause the parameters for authorized transactions to be changed. In another example, users who subscribe to mobile banking features may set or change usage times and perhaps other usage parameters via their mobile device such as a cell phone. Alternatively or in addition machines may include programming which enables a user once they have established their authority to operate the machine to thereafter change or modify certain user parameters through inputs through the machine interface. In addition to time, other user changeable usage parameters may include placing dollar limits on transactions, allowing some transaction types while blocking others, and/or setting cumulative hourly, daily, weekly or monthly transaction limits. Of course these approaches are exemplary and in other embodiments other approaches may be used.

An exemplary system for fraud prevention will now be explained. A person uses a machine to request a financial transaction, such as a cash withdrawal transaction request for $100 from a checking account. The request (along with other information) is transmitted from the machine to the transaction processor host (which may be the host computer for the machine network). As previously discussed, the host knows or can determine the location of the machine from which the transaction request is being made. The host also knows that the transaction request is from a particular individual due to the identification (e.g., an account number on a card) provided to the machine during the request.

The host analyzes database records corresponding to that particular individual. The host can determine through execution of its programmed instructions whether the individual is a member of the fraud prevention program. If so, then the host also determines the member's cell phone provider. This is done by accessing stored data in at least one data store. The host requests the current location of the member's cell phone from the cell phone provider (or a phone location server associated therewith). The cell phone provider computer or computers determines the current location of the member's cell phone and then transmits messages including data corresponding to that location back to the host. The host compares the received cell phone location to the machine location. If the two locations are within a predetermined range or proximity of one another, then the transaction requested is determined safe and can be authorized according to normal transaction authorization rules in place. However, if the two locations do not correspond or are not within the predetermined acceptable proximity, then appropriate fraud notification rules and procedures can be implemented.

Alternatively or in addition, the location of the user's cell phone in proximity to the 15 machine can be determined through the use of localized communication and positive identification of the user's cell phone. This can be accomplished using near field communication (NFC), Bluetooth, RFID, RF, IR or other local communication of data that can identify the user's cell phone.

Thus, grant/denial of a machine transaction request involving a member's account can be based on that member's (current or real time) location. If it is concluded that the member is adjacent the machine, then the transaction request is granted. Otherwise, the transaction request is denied. The member's determined location (via the member's cell phone location) can be used as another (or secondary) source of user identification.

A variety of additional fraud notification rules can be defined (selected) by the member, such as at the time of service protection enrollment. In a first example, if a member (e.g., a female) has sole access to her account and she normally has the cell phone with her, then she may have selected an option in which the service provider (e.g., bank or host operating on behalf) denies any transaction request where there is a mismatch between the machine location and her cell phone location. With this selected option the member's cell phone may receive from the service provider a text message like "A transaction was just attempted against your account, but was denied due to location discrepancies between the machine in question and your cell phone. Please contact us at . . . for more information."

In the first example, a machine may be instructed by a host to capture the inserted card responsive to a determined mismatch of locations. Further, the host itself may be programmed to notify the police of a potential theft in progress at the particular machine. This may be done for example through an automated voice response interface that operates to cause a synthesized Alternatively or in addition text messages, e-mail, radio, or other types of transmission messages to communicate with appropriate authorities may be used.

In a second example, a member (e.g., a male) may share access to an account (such as with a spouse) and it can sometimes happen that the location of the designated cell phone and a machine location may not coincide. Therefore, the member may select a notification option which causes the at least one computer of the service provider to operate to notify the cell phone holder via a text message on the cell phone that "A transaction was just requested against your account at the machine located at Wisconsin and M streets." Many methods of informing the holder that they have a text message can be used. For example, an audible (ring) or vibratory notification can be used. Additionally, messages other than in text format (e.g., a voice message, e-mail message, page or other messaging) can be used.

If the location and/or timing of the requested machine transaction for which notice is given is suspicious to the member then he call further investigate. For example, he may call his spouse for verification. If necessary, he can notify the machine's bank and/or the police. Alternatively, the host (or the security service) may be programmed to notify proper authorities of a potential fraud in progress at the particular machine. Thus, the scenario is cardholder/fraud prevention-centric.

In an exemplary embodiment of the security system, a selectable option permits the cell phone holder to grant permission for the requested machine transaction (e.g., by the spouse) to be remotely authorized. Permission can be granted by the security system to allow the machine transaction to proceed upon receiving one or more messages corresponding to consent from the designated cell phone. Consent can be automatically granted upon the system receiving a call from the designated cell phone to a certain phone number (or code) within a certain amount of time. For example, a person may initiate a consent call text message or other communication after verifying that their spouse is trying to use the machine. The consent call phone number (or consent code or password) may also be selectable by a member in some embodiments of the fraud prevention system. The machine may be instructed by its host to capture an inserted card responsive to the system determining a mismatch of locations in combination with no received consent call or other appropriate response to authorize the machine usage.

It should be understood that in some embodiments there may be many other detection, notification, and consent options available. For example, a machine with a camera can capture an image of the current machine user at the time of the detected discrepancy in locations between the machine and the cell phone. The captured user image (with or without a text message) can be sent to the designated cell phone. The person having the cell phone in their possession can be notified (via the phone) of the discrepancy and that they have access to an image of the machine user in question. The cell phone holder can then view the user image on a display screen of the cell phone. The image can help the cell phone holder (e.g., owner) quickly determine whether to grant consent to the current machine user. This may be done, for example, in the manner described in U.S. Pat. No. 7,533,805 the disclosure of which is herein incorporated by reference in its entirety. Thus, consent can be image based. Communication and data transfer between the security system and a designated cell phone can occur in real time or near real time.

Also, in some embodiments more than one cell phone can be assigned to an account. This may be done, for example, by associating multiple cell phone numbers, text message numbers, e-mail addresses or other predetermined notification network addresses with an account in at least one database that is accessible by one or more computers that are operative to cause notifications to be given. Thus, the host can obtain the current location of plural cell phones. For example, GPS or triangulation of cell areas may be used to determine the cell phones' location. If the host (or another computer of the service provider) determines that one of the cell phones is currently located adjacent to the machine then the transaction request is permitted. This option enables family members such as both spouses (who have respective cell phones) to separately carry out a machine transaction without requiring service provider notification.

Other methods of communicating between the service provider and the member may be used in some embodiments. For example, a personal (human voice) phone call may be made on behalf of the service provider notifying the service member of the situation involving their account. This may be done through operation of an automated voice response (AVR) system in operative connection with one or more computers so as to dial and/or send a simulated voice message to one or more phones. This may be done in the manner of the incorporated disclosure or through other types of devices. Alternatively or in addition one or more computers of the service provider may operate to give notice to a live service person to make a call to the cell phone of the customer involved. The service provider can call the cell phone number assigned to the member causing the cell phone to ring. After the member answers their cell phone, the service provider can inform the member of the discrepancy situation. Instead of a live person, a recorded message can be used for the informing. Other communication formats can be used. This may include, for example, IM (instant messaging), text messaging and the like may be the communications formats used to contact the member's cell phone.

Alternatively, a member's device other than their cell phone may be contacted by the service provider. For example, a notifying e-mail may be sent (by the service provider such as through automated computer dispatch) to the member's work and/or home PC. A voice message may be left on the member's home answering machine. Alternatively or in addition the user may be contacted via pager message, message to a service to which the user subscribes, for example Twitter$^{SM}$ or other methodology that is operative to provide a user that reasonably prompt notification.

As discussed, in some embodiments different security levels of fraud detection and member notification can be selected by the member. For example, a different level of detection may use cell triangulation in placing the location of a cell phone instead of having GPS embedded in the cell phone. The cell in which the cell phone is deemed present can be compared to the cell in which the machine resides. If the cells correspond, then the transaction requester is authenticated as an authorized user of the account. It should be understood that even further detection and notification procedures may be available in some embodiments to members of the security system.

As previously discussed, an exemplary embodiment of the security system enables authorization (or authentication) of machine transactions based on the (cellular) location of the security system member. The authorization can be further based on GPS location of the machine. The authorization can additionally or alternatively be based on local communication from the user's cell phone. The exemplary security system provides additional transaction security to help prevent unauthorized machine access to a financial account if it is determined that the location of the machine from which the account transaction is being requested substantially differs from the location of the authorized user of the account. The location of the machine can be determined via GPS technology. The location of the authorized user can be determined via the location of the user's cell phone. Also, some other (communicator, detectable, or traceable) device (e.g., a computer chip) normally with (or on or embedded in) the user can alternatively be used. The location of the cell phone can be determined via cellular or GPS/cellular technology.

It should be understood that the description of the security system with regard to automated banking machines is exemplary, but is not to be limited thereto. Such a machine is one of many automated transaction machines in which the security system can be implemented. Others include point-of-sale (POS) locations/systems and self-service machines. Likewise, the security system can be used with facilities, such as gas stations. A positive comparison of the gas station (or fuel pump) GPS location with the purchaser's cell phone location grants access to the fuel. Alternatively, a cellular device may be located in or on a vehicle. When a person requests fuel for the vehicle, a comparison is made of the vehicle location (e.g., cellular location) and gas station location (e.g., GPS location).

Additionally, the security system can be used in conjunction with other transaction facilities, including stores, restaurants, etc. The security system can be used where location based verification or identification of a person is needed. The security system helps to reduce or prevent unauthorized use of a financial account by determining whether the location at which the account is trying to be used substantially differs from the current location of the authorized user of the account. Again, the security system can be used in conjunction with POS transactions involving a check, a credit card, a debit card, a smart card, or some other type of transaction item. The security arrangement provides an additional layer of fraud protection with regard to financial transactions. Because of the reduced risk of fraudulent transactions, merchants and/or credit card companies may give discounts to paying customers who take part in the security system.

The exemplary security arrangement permits a method to be carried out including the steps of (a) receiving input with a machine, where the input corresponds to an account; (b) determining a current distance of an authorized user of the account relative to the machine; and (c) determining whether the received input corresponds to the authorized user responsive to the determination in (b). Step (c) can include determining whether a current machine customer is authorized access to the account responsive to a computer comparison of the current location of the authorized user relative to the machine. The determination in (c) can include comparing machine location to current authorized user location. The current authorized user location can correspond to location of a personal item of the authorized user, where (b) includes determining location of a personal item of the authorized user. The current authorized user location can correspond to location of a cell phone of the authorized user, where (b) includes determining location of a cell phone of the authorized user. The cell phone can include a Global Positioning System (GPS) receiver, where (b) includes determining location of the cell phone via GPS. The input can correspond to an account of the authorized user, where (c) includes determining whether the current machine customer is the authorized user. Step (a) can include receiving account data on/from a card. Step (a) can include receiving biometric input corresponding to an authorized user of the account.

The exemplary security arrangement permits another method to be carried out including the steps of (a) receiving a transaction request at an automated transaction machine, where the transaction request is associated with an account; (b) determining location of the automated transaction machine; (c) determining at least one location of at least one authorized user of the account; (d) comparing the location determined in (b) to the at least one location determined in (c); and (e) responsive to a positive comparison in (d), granting the transaction request received in (a).

The exemplary security arrangement permits a further method to be carried out including the steps of (a) receiving customer identification input with an automated transaction machine; (b) determining a first customer location as location of the machine, responsive to the input; (c) independent of (b), determining a second customer location as current location of an item on the customer, responsive to the input; (d) comparing the first and second customer locations; and (e) responsive to a positive comparison in (d) authorizing a first customer transaction with the machine. Step (a) can include receiving customer identification input with a machine including a currency dispenser, and where (c) includes determining location of a cell phone.

The exemplary security arrangement permits another method to be carried out including the steps of (a) determining location of a portable communication device affiliated with an authorized customer responsive to input to an automated transaction machine; and (b) determining whether the input corresponds to the authorized customer responsive to relative location between the device and the machine. The portable communication device can comprise a cell phone. A customer of the machine can be authorized a transaction responsive to location of the cell phone corresponding to location of the machine. The machine can comprise an ATM. The exemplary security arrangement permits another method to be carried out including the steps of (a) determining location of a cell phone affiliated with an authorized customer; and (b) authorizing to the customer a transaction with an automated transaction machine responsive to location of the cell phone corresponding to location of the machine.

The exemplary security arrangement permits another method to be carried out including the steps of (a) receiving input with an automated transaction machine, where the input is associated with a customer affiliated with an object locatable independent of operation of the machine; and (b) authorizing a customer transaction with the machine responsive to correspondence between location of the object and location of the machine. The object can comprise a cellular item, a GPS item, or an RFID item, for example.

The exemplary security arrangement permits another method to be performed including the steps of (a) receiving input with an automated transaction machine, wherein the input is associated with a customer affiliated with a remotely locatable device; (b) operating at least one computer to determine location of the device; (c) operating the at least one computer to determine whether the location of the device determined in step (b) corresponds to location of the machine; and (d) responsive to correspondence in step (c), authorizing to the customer a transaction with the machine.

The exemplary security arrangement permits another method to be performed including the steps of (a) receiving input with an automated transaction machine, wherein the input is affiliated with a cell phone; (b) operating at least one computer to determine whether location of the cell phone corresponds to location of the machine; and (c) responsive to correspondence in step (b), authorizing a transaction with the machine. The exemplary security arrangement permits another method to be performed including the steps of (a) receiving input with an automated transaction machine from a person associated with a cell phone; and (b) determining whether the person is an authorized user of the machine using location of the cell phone relative to location of the machine.

The exemplary security arrangement can include an apparatus comprising: a system, where the system includes a plurality of cell phones, at least one computer, a plurality of cash dispensing machines each having a GPS device, a machine host in operative communication with and remote from the machines, and a cell phone locator system in operative communication with and remote from the host; where the machine is operative to receive user identification data from a customer, the host can determine a cell phone ID assigned to the received user identification data, the host can also determine location data corresponding to a machine from either a database or from a GPS device in the machine, the cell phone locator can determine the current location of a cell phone corresponding to the cell phone ID responsive to a request from the host, the cell phone locator can then send the cell phone's location data to the host, the host can then compare the cell phone's location data to the machine's location data, responsive to the comparison the host can either authorize the customer to perform a transaction at the machine if the locations correspond or deny the customer from performing a transaction at the machine if the locations do not correspond.

The exemplary security arrangement can include another apparatus comprising: at least one automated transaction machine, where each machine is operative to receive account information from a customer during a transaction request, and a host, where the host includes at least one computer, where the host is in operative communication with the at least one machine, where the host is operative to determine geographical location of a transaction request at a machine responsive to account information received at the machine, where the host is operative to determine geographical location of at least one authorized user corresponding to account information received at a machine independent from a determination of geographical location of a transaction request at the machine, where the host is operative to compare transaction request geographical location to authorized user geographical location, and where the host is operative to determine whether a machine customer corresponds to the at least one authorized user. The apparatus can further comprise a cell phone, where the host is operative to determine geographical location of at least one authorized user via the cell phone. The cell phone can include a Global Positioning System (GPS) receiver. The apparatus can further comprise a cell phone locator system, where the cell phone locator system is operative to determine the current location of the cell phone. The host can be in operative communication with the cell phone locator system, where the host is in operative to request the cell phone location from the cell phone locator system. The cell phone locator system is operative to provide the current location of the cell phone to the host. At least one automated transaction machine comprises at least one automated teller machine ("ATM"), where each machine includes a currency dispenser, and where each currency dispenser is operative to dispense currency from a respective machine. Each machine is operative to receive account information from a customer during a transaction request. At least one machine includes a GPS receiver. The host is operative to determine geographical location of at least one machine via GPS data. The host is operative to compare cell phone location to machine location to determine whether a current machine customer corresponds to an authorized machine user.

In alternative arrangements, a RFID object can be used instead of or in combination with cellular and GPS objects. An RFID object can be used to verify that the current machine user is an authorized user. The RFID object can be separate from a user card. The RFID object can be used as another security level for verifying user authorization. The machine has a RFID reader. The user data read from the RFID object (tag) is compared to another form of user identification (user card, user fingerprint, iris scan, palm vein scan, other biometrics, etc.). The comparing can take place at the machine, machine host, or security center. The comparison can be used to determine if the RFID object ID and user ID correspond. A positive correspondence permits the user to use the machine for transactions. If the machine is unable to obtain the necessary data from the RFID object (which is an indication that the RFID object is not adjacent the machine) then usage of the machine is denied.

The ability to locate a machine's geographical position can also be used to provide location-oriented services to the public. A service provider ("SP") can provide the services. The service provider can comprise or be associated with a previously discussed security center or service center including one or more computers. A computer in the machine (or the GPS system) can convey coordinate location data to the service provider. The service provider computer or computers can operate to store this machine location data in a database along with other location data corresponding to other machines. Thus, the database can include the locations of plural machines, including machines belonging to different banking networks. The database may also contain location information for many other locations that may be of public or private interest. The database may contain data corresponding to waypoint location information, e.g., stores, food establishments, bank branches, or even dynamic machine-service vehicle locations.

Machines with GPS capability provide the capability to reference coordinates for machine-based map generation. The database can also store map data. A service provider can use a geographical starting point reference from which to generate a variety of "how to get there from here" directions, which may be in the form of a map.

A machine direction-providing service can receive a request for directions from one or more entities (e.g., a person, computer, machine, etc.). For example, a person at a first location (e.g., a merchant store, fuel station, restaurant, etc.) may wish to have directions to the nearest machine. The direction requester may be a person desiring to use a machine to perform a financial transaction (e.g., cash withdrawal, reload a smart card, etc.). Of course the individual may also be a machine service person needing to locate a malfunctioning machine.

The system allows a person to provide their current (or best known) location to the service provider. The current location may be provided to the service provider in numerous known ways. From this "current location" information, the location service can instruct or provide directions to the person on how to get to the nearest (or desired) machine. The service provider can also provide directions to the nearest machine belonging to a requested particular bank or financial institution (e.g., a bank belonging to the requester's home banking network).

The service provider providing the directions can be a company, person, computer, and/or machine. The service provider can communicate with a direction requestor via diverse communication devices and processes. The direction-providing service can be made available to a direction requester via a variety of communication devices, such as PDA, cell phone, Internet, address input, input device equipped with a GPS receiver, on-line devices, and off-line devices. Other known transmission processes suitable for communication may be used, including analog, digital, wireless, radio wave, microwave, satellite, and Internet communication. For example, the service provider may operate one or more computers to communicate with a person using voice recognition software and speech software. In another example, a person can wirelessly transmit their request along with their current GPS location to the direction-providing service over the Internet via a hand-held computer or cell phone. In response, the service can download (e.g., as e-mail, PDF file, voice mail, instant message, etc.) the requested directions (e.g., a detailed map) to the hand-held computer. In a further example, a cell phone can include a GPS system. The person can wirelessly transmit their request along with their current GPS location to the service via the cell phone. For example, when the cell phone calls a particular phone number of the service provider for a directions request, the cell phone also transmits its current GPS location. Alternatively, the service provider computer can operate to recognize the cell phone number via caller ID, match the cell phone's number to the cell phone's GPS system, obtain the cell phone's current location from the cell phone's GPS system, and then transmit directions to the nearest machine based on the cell phone's location.

Figure 20:
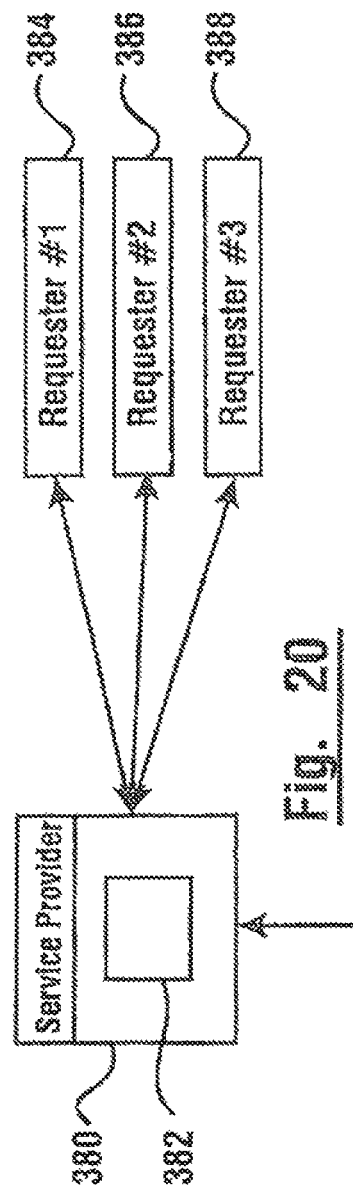
FIG. 20 shows a service provider, database, and requester arrangement.

FIG. 20 shows one or more computers of a service provider 380 in operative connection with a database 390. The service provider 380 includes at least one computer 382. The service provider 380 can simultaneously communicate with and provide information to plural requesters 384, 386, 388.

The database 390 can store machine location data 392, map data 394, and additional data 396. Such additional data 396 may be key words or phrases, such as landmark names, points of interest, street intersections, city sections such as Chinatown and Little Italy, etc. For example, a requester may not know their exact address location but can inform the service provider (via their phone) that they are near the intersection of 19th and M streets. The computer 382 can operate to recognize (such as via voice recognition software) the received intersection as location information. From the intersection information the computer 382 can provide the requested directions. It should be understood that directions can also contain landmarks, points of interest, street intersections, etc. For example, by knowing which intersection the requester is near and the (real time) visual lay out of the city, the service provider 380 can instruct the requester that the nearest machine is next to a landmark that is easily visible from the intersection. Such a landmark may be a well lit (neon) sign, a bell tower, a pedestrian bridge, etc. Thus, additional stored data 396 can be used by the service provider computer 382 to more accurately understand requests and provide locations/directions to requesters.

Figure 21:
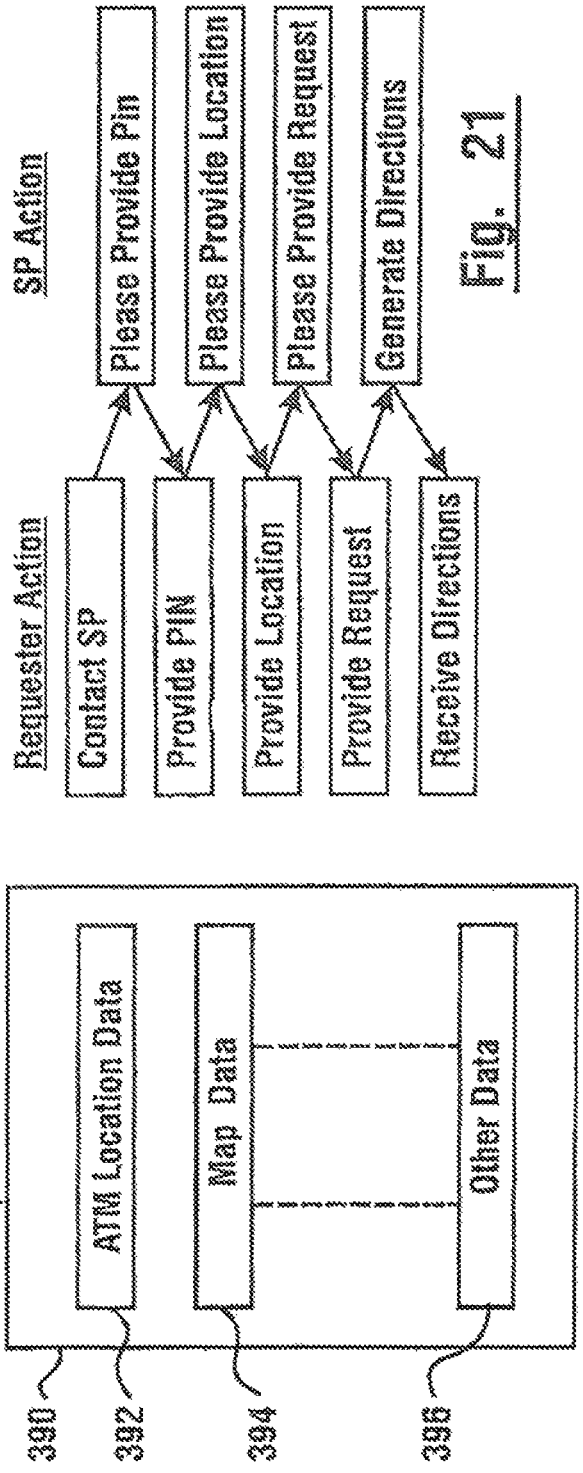
FIG. 21 shows a flowchart of a service process.

An exemplary flowchart of requesting/receiving service is shown in FIG. 21. The actions performed by the requester and by the service provider are also shown. In the exemplary method a requester (e.g., a person) contacts one or more computers of the service provider (SP).

The SP operates to acknowledge the contact and provides at least one message that asks for the person's PIN or service access code. The person provides their PIN. The SP compares the PIN with a list of valid PINs and determines the PIN acceptable. The level of service associated with the PIN is obtained. The SP provides at least one message that provides at least one message that asks for the person's current location. The person notifies the SP of their current location (e.g., an address, notable landmark, etc.).

The SP analyzes (e.g., voice recognition, speech to data interpretation, etc.) the provided location for best fit location comprehension. That is, the SP computer operates in accordance with its programming and stored data to recognize the provided location. The comprehended location may be compared to locations in the database to determine if it is a usable (valid) location. If the provided location is not usable, then the SP may ask the person to again provide the location, or more information may be requested to ensure location accuracy. For example, the SP may provide synthesized speech which includes the comprehended location to the person and ask the person to validate whether the location is correct. Once a provided location is deemed valid, then the SP can ask for the person's request. In response, the person may request directions to the nearest available machine.

The SP uses the database information to determine the shortest available route from the person's current location to the nearest machine. The SP generates directions in a format capable of being received by the person. The format can match the format in which the request was received. For example, if the request was made via the person's cell phone, then the directions can be provided in a form capable of being received by the person's cell phone. The SP provides the directions to the person. The person receives the directions. It should be understood that in other arrangements greater or fewer steps may be carried out, and the order of the steps can vary.

The person's request for directions may be selected from a list of options. For example, options may include press number 1 for information regarding the nearest machine, press number 2 for information regarding the nearest fee-free machine, etc. Once the first option is input then another set of options may be provided to the person. The second set of options may relate to the context in which the information content is to be provided. For example, assuming that the nearest machine was selected in the first option set, the second options may include press number 1 for the machine address, press number 2 for a map to the machine, press number 3 for an operator to guide you to the machine, etc. Further sets of options may follow to ensure the desired service. The service provider can know the level of service available to the requester based on the provided PIN. Likewise, other information (e.g., requester's home banking network) can correspond to the provided PIN.

The person's communication device may partake in obtaining the person's current location and in notifying the service of the current location. For example, the person's communication device may include GPS. GPS, triangulation of cell areas, or other approaches may be used to determine the requester's (cell phone) location. Also, a person's request for directions may be a default request based on the manner of communication. For example, a service provider may treat any person calling their phone number as a direction requester by default. Thus, a person may not have to actually (e.g., verbally) request directions, it already being inferred.

The direction-providing service may be a free service, a pay-as-you-use service, and/or limited to paid subscribers. A person may have access to the service as a result of being a valued customer of a particular bank. For example, a machine customer that regularly incurs machine transaction fees to the bank may receive free access to the machine-directing service. The bank can provide (or pay for) the service on behalf of the valued customer. The level of service may vary with the type of service to which the person has subscribed. For example, one type of service may include having a personal assistant stay on a phone with the person until they correctly and safely reach their desired machine, while another level of service may simply provide the street address of the nearest machine.

Figure 23:
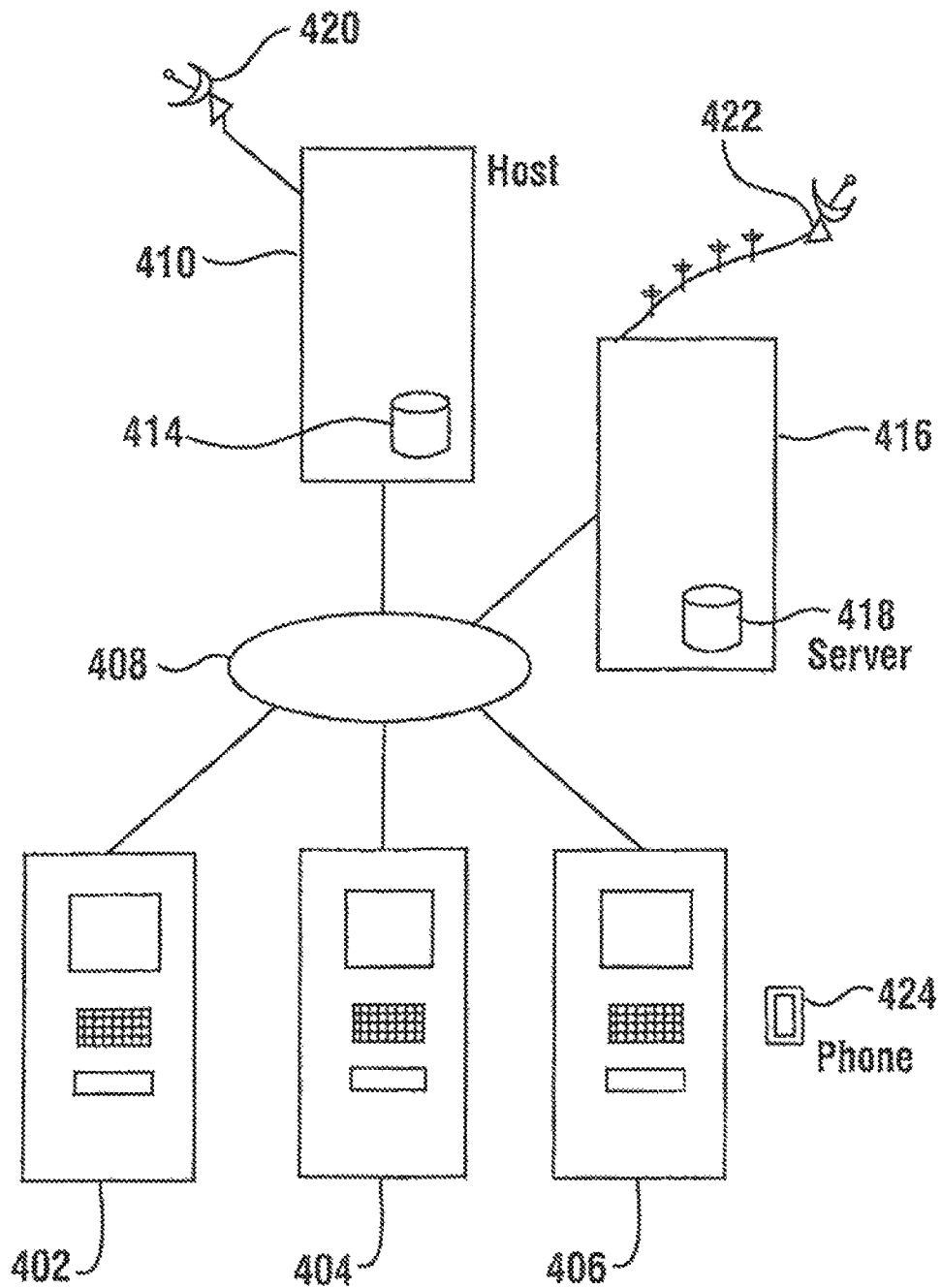
FIG. 23 is a schematic view of an alternative automated banking machine system.

FIG. 23 shows schematically the system of an exemplary embodiment that may be operated to minimize the risk of a user's financial account being accessed by an unauthorized person at an automated banking machine. It should be understood that the system is shown schematically and is shown schematically for purposes of facilitating explanation.

The system shown in FIG. 23 includes automated banking machines 402, 404 and 406. The automated banking machines in some embodiments may be ATMs and in other embodiments other types of banking machines may be used. The automated banking machines are connected through one or more networks 408 with one or more remotely located computers.

In the exemplary embodiment, the remote computers include a host computer 410. The host computer can include one or multiple computers that are in operative communication with one or more data stores schematically indicated 414. The exemplary embodiment further includes one or more other remote computers. This is schematically represented by a server 416. Server 416 is also in operative connection with one or more data stores 418.

In the exemplary embodiment, the host computer 410 is in operative connection with a wireless communication system schematically indicated 420. Similarly, in this exemplary embodiment the server 416 is also in operative connection with a wireless communication system schematically indicated 422. In exemplary embodiments, the wireless communication system may be operative to provide connections to achieve communications with cell phones, such as phone 424 schematically shown in FIG. 23. The wireless communication systems may be in operative connection with one or more wireless networks. Alternatively or in addition, the wireless communication networks may be operative to communicate wirelessly with other devices. This may include in some embodiments, the capability for communication of GPS data for tracking cell phones or other wireless devices, as previously discussed. Alternatively or in addition, the wireless communication capability may be usable for wireless tracking of the automated banking machines or other items.

In the exemplary embodiment, the automated banking machines may include input devices of the types previously discussed. This may include, for example, a card reader which is operative to read data from user cards which correspond to financial accounts. The automated banking machines may also include other input devices which have a capability to provide user identifying data. The exemplary automated banking machines may also include input devices such as keypads which are usable to receive manual inputs from users. This may include, for example, data such as personal identification numbers (PINs). Keypads may also be used for receiving transaction amounts or other user-provided inputs. It should be understood for purposes of this disclosure that keypads can include touch screens or other devices that can receive user selectable inputs.

Exemplary automated banking machines may also include other input devices such as for example a bar code reader. Bar code readers may be usable to read for example one-dimensional or multi-dimensional bar codes for purposes of determining the data represented thereby. Of course this is accomplished thorough operation of one or more banking machine computers that are included in each of the automated banking machines. Further, in some exemplary embodiments image capture devices, such as cameras, may be associated with or mounted near or within each of the automated banking machines. The image capture devices may operate in connection with one or more computers and systems having the capabilities described in U.S. Pat. No. 7,533,805, the entire disclosure of which is herein incorporated by reference. Of course these capabilities are exemplary and in other embodiments other approaches may be used.

In the exemplary embodiment, the one or more servers 416 can have capabilities like those described in U.S. Pat. No. 7,516,087, the disclosure of which has been herein incorporated in its entirety. This includes for example, including in the one or more data stores 418 data which corresponds to user data and messages or other actions to be presented and/or taken when a particular user is determined to be requesting a transaction at a particular machine. This can include for example, presenting certain specific determined messages to the particular user based on stored information and/or criteria associated with that particular user.

In this particular exemplary embodiment, the one or more server data stores 418 include data corresponding to one or more predetermined notification network addresses. The network addresses are associated with user data that is received by the server 416 responsive to a user conducting a transaction at a particular automated banking machine. This network address data may correspond to one or more ways of communicating with the particular user. In exemplary embodiments, these ways of communicating may correspond to communication with a user's cell phone. This data may include, for example, address data for calling the particular user's cell phone. Alternatively or in addition, the address data may include data for communicating a text message to the user's particular cell phone. Alternatively or in addition, the data may include an e-mail address at which messages are receivable with the user's cell phone or other manner for communicating with the particular user's cell phone or other mobile device so as to enable the communication to be provided to the user during or proximate to the conduct of a particular transaction at an automated banking machine. Furthermore, the exemplary embodiment of the one or more servers 416 includes computer executable instructions that are operative to cause the server to generate message content appropriate for messages to be communicated to a user's cell phone or other mobile device related to particular transaction conditions. Alternatively or in addition, such message generation capabilities may be associated with other connected computers and/or the wireless communication system with which the server 416 is connected.

In the exemplary embodiment, the host system may operate in a manner like that discussed in the incorporated disclosures to receive messages from an automated banking machine and to cause a financial transfer related to an account corresponding to card data on a card that is read for purposes of carrying out the transaction at the particular machine. Thus for example, in exemplary embodiments the host 410 may receive one or more messages from an automated banking machine at which a user is requesting a transaction. These host messages may include data corresponding to card data which identifies the user and/or their financial account. The host messages may include data corresponding to a PIN number or other identifier presented by the user at the banking machine. The one or more messages sent to the host from the banking machine may generally also include information regarding the type of transaction the user wishes to conduct. This may include, for example, a cash withdrawal from the automated banking machine. The one or more messages sent to the host may also include data corresponding to an amount associated with the transaction that the user wishes to conduct. This may include for example, in a cash withdrawal transaction, a request for $200 to be dispensed from the banking machine and assessed to a user's checking account.

In exemplary embodiments the host may operate in accordance with its programming based on data stored in the one or more data stores, to determine that the card data corresponds to an authorized user whose account is authorized to carry out the requested transaction. The host computer may also operate in accordance with its programming to determine that PIN number data or other data included with a message corresponds to that which is appropriate for the particular user or account. This is done based on the host computer operating to determine that the data included in the message corresponds to data in the one or more data stores 414. Of course these approaches are exemplary and other approaches can be used.

The host computer may also determine that the requested automated banking machine transaction is authorized for the particular account and/or user, and operates to cause one or more messages to be sent from the host to the particular automated banking machine. This may include, for example, including data in the messages which indicates that the transaction is authorized. In response to receiving the messages from the host, the automated banking machine operates to carry out the authorized transaction. In this example, this would include operating a cash dispenser to cause cash stored in the machine in the requested amount of $200 to be dispensed to a user.

Of course in a situation where the host computer determines that the transaction is not authorized, then the messages sent to the automated banking machine will indicate that the transaction is not to be conducted. In this case, the automated banking machine may operate to display an appropriate message to the user, and will also operate to cancel the transaction. In some embodiments, and based on the messages from the host to the automated banking machine, the user card may be returned to the user. In cases where the card is reported stolen or otherwise the programming of the host indicates the card is being improperly used, the messages to the automated banking machine may operate to cause the banking machine to capture the card. Of course these approaches are exemplary.

Furthermore, in exemplary embodiments the automated banking machine may operate once it has successfully carried out the authorized transaction, to generate one or more messages to the host to indicate the successful completion of the transaction. This may be done through operation of the one or more banking machine computers included in the machine, which operate in accordance with their programming to cause such messages to be sent to the host. The host may operate in accordance with its programming in response to the data included in such sent messages to cause a financial transfer from the user's account in an amount corresponding to the cash dispensed. Alternatively, if the automated banking machine was not able to carry out the transaction (for example the cash could not be dispensed), the at least one computer in the automated banking machine operates to cause one or more messages to be sent to the host with data indicating that the authorized transaction could not be carried out. The host operates in response to such messages from the automated banking machine to record that the transaction could not be completed. The host also operates in such circumstances in accordance with its programming not to charge the user's account for the value of the requested transaction. The host may further operate in accordance with its programming to cause a notification to be given in appropriate circumstances of a problem or other situation at the banking machine that will need to be remedied because the transaction could not be completed. This might include for example, information that the transaction was unable to be completed because the automated banking machine does not contain sufficient cash. The host may operate in accordance with its programming to give notice to appropriate service persons to replenish the machine with cash. Of course these operations and steps are exemplary, and in other embodiments other approaches maybe used.

In the system schematically represented in FIG. 23 the system may operate to provide additional assurance or security that a requested transaction at an automated banking machine has been authorized by the actual owner of the account. This is accomplished in an exemplary embodiment by the user being contacted via a cell phone (or other mobile/portable device) message during the transaction through a particular network address associated with the cell phone that they have registered for receiving notifications. In a manner previously discussed, the cell phone's contact data can be associated (linked) in a data store with user identification data (e.g., account data). The user identification data (or data corresponding thereto) can be read by the automated banking machine. Thus, user data read by the automated banking machine can be used to access stored contact data for the correct cell phone.

In one exemplary embodiment, the cell phone operates to receive a particular message or security data that the user is required to input to the automated banking machine in order to have a transaction proceed. The security data can comprise a code. The received message can include the security data, which may also be referred to herein as permission, authorization, confirming, consent, approval, identifier, or security data. User input of the transaction security data (e.g., code) at the machine is sensed through operation of the at least one banking machine computer. The code is compared and verified (determined) as the appropriate (e.g., same) code that was sent during the transaction to the cell phone that is associated in a data store with the particular user.

Of course if the user's card has been stolen, the message that is sent to the user's cell phone will alert the actual authorized user that a (fraudulent) transaction is being attempted. Of course the person (e.g., a thief) attempting unauthorized use of the automated banking machine will not receive the provided code. Thus, a fraudulent transaction request will not be authorized to be carried out even in circumstances where a thief (i.e., as an operator of the machine) has an authorized card/ID and PIN number for a particular account.

Figure 24:
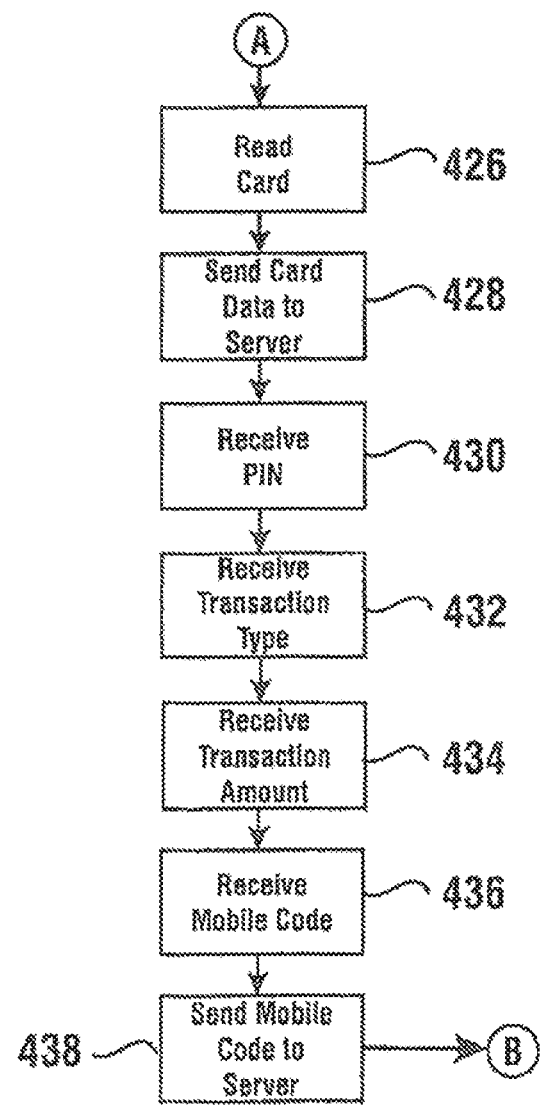
FIGS. 24 and 25 are a schematic representation of software logic carried out by an exemplary automated banking machine used in the system shown in FIG. 23.
Figure 25:
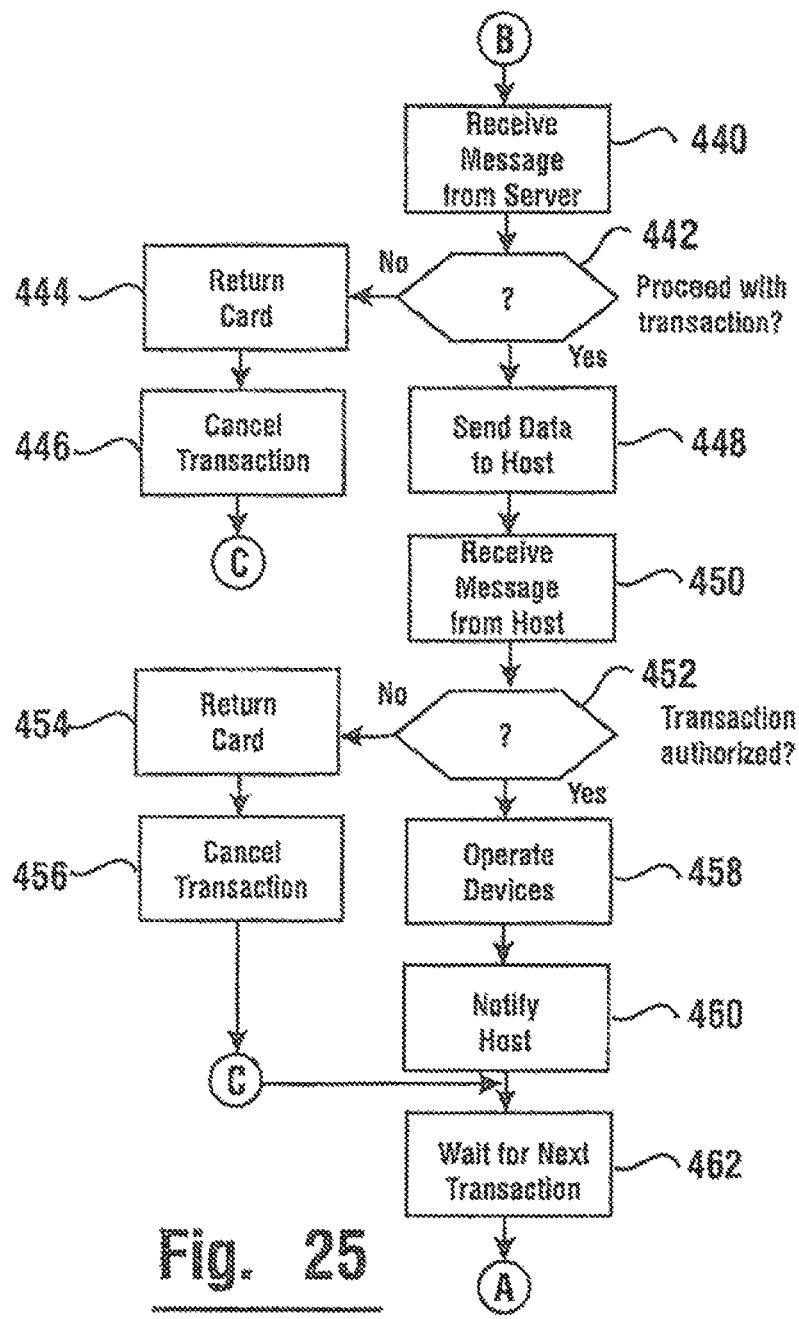

The exemplary software logic flow carried out through operation of banking machine computers in the automated banking machine in a system which has these capabilities is schematically represented in FIGS. 24 and 25. As can be appreciated, before a user approaches the automated banking machine it may be operating in a wait mode. This may include, for example, outputting particular promotional messages or other information to attract a user to the machine and/or providing instructions to a user on how to commence a transaction with the machine. In the exemplary embodiment, the machine user may commence a transaction by inserting or swiping a card which includes data corresponding to the user's financial account. This is represented schematically in FIG. 24 by a step 426 in which the machine operates to cause a user's card to be read. This can be done for example through operation of a card reader in the machine.

In accordance with the incorporated disclosure, the exemplary embodiment of the banking machine computer is operative to cause to be sent to the server 416 one or more messages including data corresponding to at least a portion of the read card data. This is represented in a step 428. Of course as can be appreciated, the one or more messages to the server 416 may be encrypted or otherwise configured so as to reduce the risk of unauthorized interception of the data that is exchanged in the messages between the automated banking machine and the at least one server 416.

In operation of the automated banking machine in this exemplary embodiment, the machine then operates in accordance with the software instructions to receive PIN data from a user. This is represented by a step 430. The user inputs their PIN number through a keypad or other input device on the machine. Of course it should be understood that other input devices for receiving identifying information may be used. This may include for example biometric inputs, facial recognition inputs, or other inputs that are suitable for identifying the particular user or their account.

In the exemplary embodiment, the automated banking machine operates in accordance with its programming to provide a user with transaction options that the user may select. These transaction options correspond to transaction types that the user could conduct at a machine. The embodiment operates to receive from the user one or more inputs which are indicative of the particular transaction type that the user wishes to conduct at the machine. This is represented by step 432. For purposes of this example, it will be presumed that the user wishes to request a cash withdrawal from their account, such as their checking account.

Step 434 represented in FIG. 24 corresponds to receipt by the automated banking machine from the user of the particular amount associated with the transaction that they wish to conduct. In this case the amount of the cash withdrawal would be $200. The automated banking machine operates to receive through inputs from the user, an indication that this is the amount of the particular cash withdrawal that the user wishes to receive. This can be done through a keypad, touch screen, or other suitable input devices.

In the exemplary embodiment of the system represented in FIG. 23, the automated banking machine operates responsive to one or more server messages from the server 416 to provide a particular output for users that have elected to receive a service in which additional authorization is required in order to conduct transactions. This includes in this exemplary embodiment, responsive to operation of the server 416, receipt of a message through their designated mobile phone or other portable device, which indicates the occurrence of a transaction at an automated banking machine. Further in this exemplary embodiment, the server operates in the manner later described in detail to cause to be sent to the mobile phone, a particular code (or other transaction related identifier) which the user must input/provide to the banking machine to allow the machine to carry out the requested transaction.

In some systems, a requirement for additional transaction authorization may be triggered by the type of transaction being requested. For example, if a cash withdrawal transaction is requested and the user card data corresponds in a data store to a cell phone contact, then a security code may be sent to the cell phone. Thus, based on the transaction type, the banking machine can be programmed to additionally expect or request the machine user (during the transaction) to input data corresponding to a security code. However, even though an account may be associated with a cell phone, other types of account transactions (e.g., an account balance request transaction) may not necessarily trigger the additional security steps that include the sending of a security code to a customer's cell phone followed by user input of the code to the machine. In such a scenario, the banking machine may be programmed to not expect any user input of data corresponding to a security code.

In an exemplary embodiment, at least one computer of the machine is programmed to carry out a transaction, such as a cash withdrawal/dispensing transaction. The programming may cause the computer to carry out the transaction in stages. For example, in a first stage of the transaction the machine computer causes a reader device (e.g., card reader) to obtain user identifying data from a user of the machine. In a second stage of the transaction the computer sends a message to a remote computer (e.g., server). The message causes cell phone contact data to be obtained (by the remote computer) from a data store which associates the cell phone contact data with the user identifying data. The message also causes a security code to be sent (through operation of the remote computer) to the user cell phone which corresponds to the cell phone contact data. In a third stage of the transaction the computer receives user inputted data through an input device of the machine. In a fourth stage of the transaction the machine computer causes cash to be dispensed, based on the received user input corresponding to the sent security code. Of course it should be understood that other transaction stages/steps can occur between these mentioned stages. For example, before the fourth stage the machine computer can cause data corresponding to the inputted data to be sent to the remote computer for comparison with the security code, and receive from the remote computer data corresponding to the comparison result, which the machine computer operates to use in determining to either allow the transaction to proceed or to deny the transaction.

In some exemplary embodiments, the code may be a random one-time use code that is generated through operation of the server (or other computer in operative connection with the server) executing a random character generation program. The random characters may include in some embodiments, numbers, letters, or other characters which are included in a code that otherwise cannot be predicted in advance, and which the user is required to input to allow the transaction to proceed. Thus, in the exemplary embodiment, in step 436 the machine receives from the user in response to a (message) output through a banking machine display device, the (same) code that the server caused to be sent to the user's mobile device. Of course it should be understood that if the transaction is not being conducted by the authorized user, then the person conducting the transaction will not know the required code. Thus, the person will not be able to input the correct code, and therefore will input an improper code or no code. Alternatively, in some embodiments the mobile device may include software which resolves a different code that has a corresponding relationship to the server generated code, which can be identified when input to the machine as corresponding to the server generated code.

Furthermore, code entry can be time sensitive. Thus, if the person operating the automated banking machine does not input the correct code within a given time period, the machine may operate to cancel the transaction and return to its initial waiting state. The machine may also operate in accordance with its programming to return the user card to the user.

In the exemplary embodiment, after receiving the code from the user, the automated banking machine computer operates in accordance with its programming to send one or more messages to the server 416. These one or more messages include data corresponding to at least a portion of the code that was received from the user. This is represented in step 438. Of course as can be appreciated as in the case with the other server messages and host messages, such messages may be appropriately encrypted or otherwise configured to reduce the risk of interception.

In the exemplary embodiment, the server operates in the manner hereafter explained to determine if the user-inputted data (corresponding to the code) that was sent by the automated banking machine to the server in step 438, corresponds to the (same) code that the server generated and caused to be sent to the user's mobile device. The server operates in response to this determination to send to the automated banking machine, one or more messages with data which indicates whether the user-inputted data corresponds to the data (code) that was included in the one or more messages sent to the cell phone. Machine receipt of these messages is represented by a step 440 in FIG. 25.

In a step represented 442, the automated banking machine computer operates in accordance with its programming to determine from the one or more messages received in step 440 whether the data included therein indicates that the transaction should proceed. If the server determined that the transaction should not proceed, the banking machine computer operates in accordance with its programming to return the user's card. This is represented in a step 444. The machine also operates to cancel the transaction as represented in step 446. However, as can be appreciated, a record of the transaction may be recorded and stored in the machine, at the server or in other connected computers so as to provide data usable to determine whether there is a pattern of possible fraudulent activity related to a particular card. After canceling the transaction, the machine then returns to its waiting state to begin another transaction.

In the exemplary embodiment, if the one or more messages received by the machine from the server indicates that the transaction should proceed, then the automated banking machine operates in accordance with its programming to send one or more messages to the host 410. These one or more messages may be of the type previously discussed which include data corresponding to the card data, identifying information such as the PIN, transaction type, and amount. The sending of such one or more messages to the host is represented by step 448. Therefore, after performing the additional security process, the machine can communicate with the host to carry out the transaction process. As later described, part of the transaction process may occur while the additional security process is being carried out.

The host operates in response to the receipt of the messages from the automated banking machine to determine if the card data corresponds to an authorized financial account and whether the account is authorized to perform the transaction in the amount requested. The host also operates to cause to be determined whether the PIN number or other identifying data corresponds to a particular authorized user that is permitted to conduct a transaction on the account. Based on this determination, the host operates to send one or more messages to the machine which includes data corresponding to whether the transaction should be allowed to proceed. These host messages are received by the automated banking machine as represented in a step 450.

The banking machine computer then operates in accordance with its programming to determine if the messages received from the host indicate that the transaction is authorized by the host. This is represented in step 452. If the data included in the one or more messages from the host indicate the transaction is not authorized, the banking machine will operate in accordance with its programming to return the user's card. This is represented in step 454. The machine will also cancel the transaction as represented in step 456. In the exemplary embodiment, the machine will then return to the waiting state for another transaction. Of course it should be understood that in some embodiments the one or more messages returned by the host may indicate that the user's card is to be captured, additional images are to be taken of the user, or other activities are to be conducted through operation of the one or more banking machine computers. The steps taken depend on the particular programming of the system and the content of the particular messages received from the host computer. It should be understood that the steps described are exemplary and in other embodiments other steps or approaches may be used.

If the one or more messages received by the automated banking machine from the host indicate that the transaction is authorized to be carried out, the automated banking machine operates in accordance with its programming to cause the particular devices of the machine to operate so as to complete the transaction. This is represented by a step 458. This includes for example, dispensing cash through operation of the cash dispenser to the user in the amount of the $200 requested. This may also include the operation of other devices such as a printer to provide the user with a receipt, operating the display to provide the user with instructions to take their cash, or other steps/operations. Further, it should be understood that the automated banking machine computer may operate in accordance with its programming to provide the user with promotional or other messages such as those described in the incorporated disclosure as the transaction requested is being fulfilled through operation of the devices of the banking machine.

The automated banking machine of the exemplary embodiment operates in accordance with its programming to send one or more messages to the host. These messages indicate whether the transaction that was authorized was enabled to be successfully carried out. This is represented by a step 460. If the transaction was enabled to be successfully carried out, the host computer operates responsive to the data included in the one or more host messages to cause the user's account to be assessed for the value of the cash dispensed. Of course if the transaction could not be carried out, the host may operate in the manner previously discussed to avoid assessing the user's account for any amount. The host may also operate in accordance with its programming to cause notifications to be given or to take other steps to remedy any service problem that may be determined to exist at the machine which may be preventing the machine from fully carrying out transactions.

In the exemplary embodiment, after sending the messages to the host regarding the fulfillment of the transaction or taking the other steps, the machine can return to its waiting state pending the initiation of another transaction by a user. This is represented in FIG. 25 by a step 462. Of course it should be understood that this schematic logic flow which is represented in FIGS. 24 and 25 is a schematic functional representation of program logic and additional actions and steps may be carried out through operation of the one or more banking machine computers.

Furthermore, it should be understood that the steps carried out by the banking machine computer are carried out by computer executing instructions that are recorded on one or more articles in the machine which hold such instructions. Such articles may include for example a hard drive which includes the data and software used in operation of the machine. The hard drive may be in operative connection with the one or more banking machine computers. Alternatively or in addition, other articles which include computer executable instructions may include flash memory devices, DVDs, COs, read-only memories, programmable read-only memories or any other form of electrical, magnetic or optical storage media from which computer executable instructions and data may be recovered for execution. Thus, programming software can cause banking machine computers to perform transaction operations. Similarly, other computers operated in the system may have computer executable instructions stored on similar articles for purposes of carrying out their program steps. This includes for example, articles of computer readable media associated with the servers and the host computers used in the system.

Figure 26:
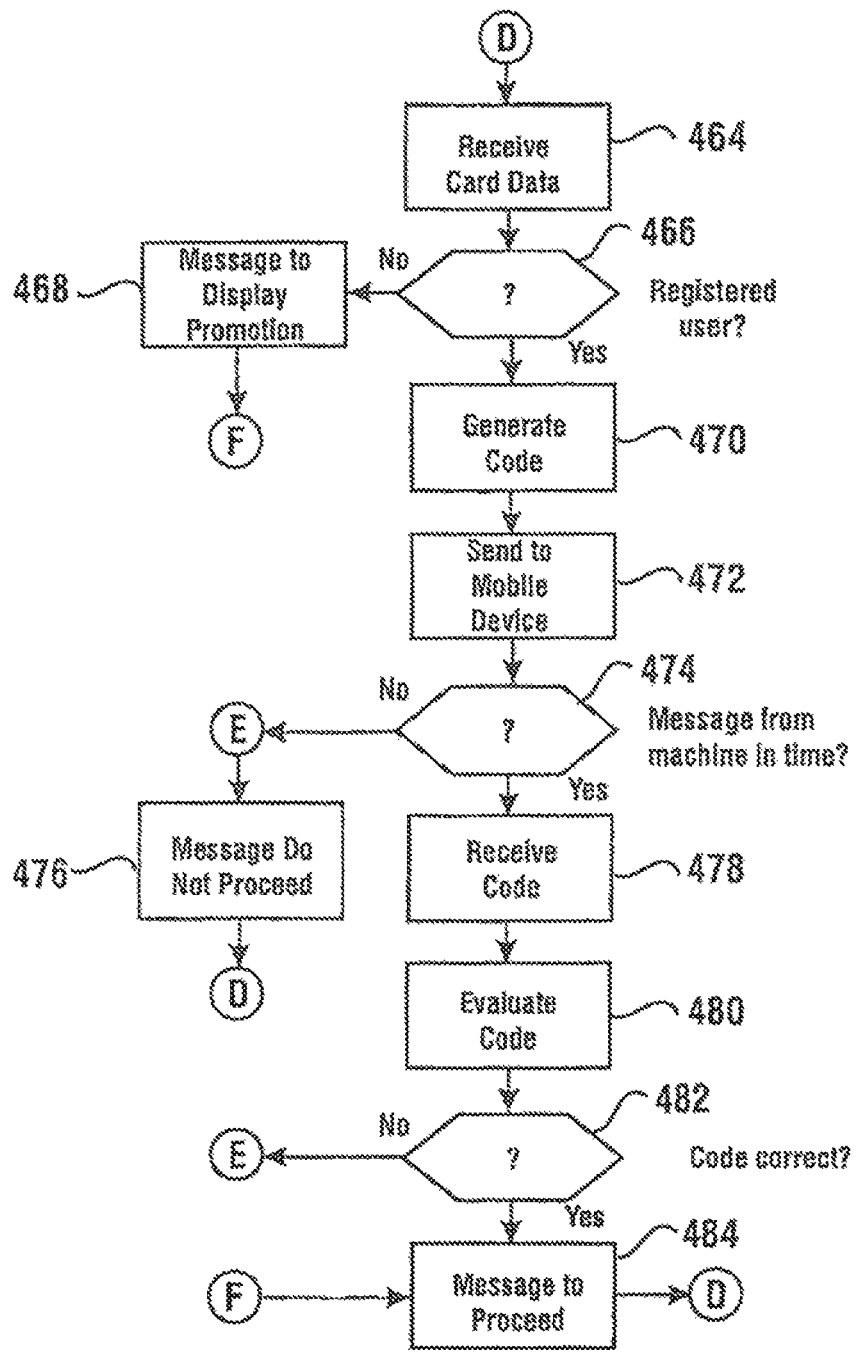
FIG. 26 is a simplified schematic representation of software logic carried out through operation of a server used in the system represented in FIG. 23.

The logic executed by the server 416 in the course of the transaction just described is represented in FIG. 26. As shown therein, the server 416 receives the one or more messages from the automated banking machine which includes data corresponding to at least a portion of the card data and/or other user data which is sufficient for the server to identify data that is associated with the card and/or a user. This is represented schematically by the step 464.

In an exemplary embodiment, users are enabled to sign up for the service either by mail, through an online interface, by phone, or other suitable methodology that eventually results in data being stored in one or more data stores 418 associated with one or more servers. This data is usable to indicate whether a user card/account or other user data is associated with someone who has signed up for the additional authentication/security requirements.

It should further be understood that in some embodiments the card data which was sent to the system which identifies the user, may include not only account data which identifies the particular account, but may also include the user name on the user's particular card. It may also include other features such as biometric data, data corresponding to facial recognition data, or other data which may identify a particular user beyond the particular account data. This may include name data encoded on the magnetic card stripe. This is useful where spouses share a common (same) account but have different user cards (and phones), each of which includes the user's name. Thus for example, some embodiments may operate to send the user name data to the server so as to distinguish the predetermined notification network address associated with a cell phone for each particular spouse. This enables for example, the particular banking machine user (first spouse) to be notified of the transaction through their cell phone (or other portable device) based on the data received at the banking machine, even though their account data is identical to that of another user (second spouse). Of course it should be understood that this approach is exemplary and in other embodiments other approaches may be used.

In the exemplary operation of the server, the server operates in response to the data received in the messages from the automated banking machine to determine if the data received corresponds to a user who has signed up for the service. This is represented in a step 466. This is done by the server recovering and analyzing the data regarding registered users included in the one or more data stores 418. If the data received from the automated banking machine does not correspond to an individual who has signed up for this service, the server may operate in accordance with its programming to return one or more messages to the automated banking machine. These messages may include for example, a message that causes the machine not to require the input of a code as associated with a step 436. This will allow the automated banking machine to proceed to verify the transaction based solely on the data associated with the card and PIN data sent to the host. Alternatively or in addition, the server may operate in accordance with its programming to cause one or more messages to be sent to the banking machine which cause the machine to present to a particular user, information about the fact that the secondary/additional authentication provided through a mobile device is available and to consider signing up for this service. Further as previously discussed, users in some embodiments may be prompted as to whether they wish to sign up for this service through the banking machine in the manner of special user messages and responses like those of the incorporated disclosure. This may be done after the user has been authorized by the host as an individual who is authorized to conduct transactions at the banking machine by having their card, PIN and/or other data verified. Of course these approaches are exemplary. The sending by the server of the one or more messages to the automated banking machine so as to indicate that a mobile provided code will not be required to conduct the transaction is represented in FIG. 26 by step 468.

If in step 466 the data received from the automated banking machine indicates that the particular card data associated with the transaction is registered to require the additional authentication required by the system, the server 416 operates to generate a code. This is represented in a step 470. As previously discussed, in some exemplary embodiments this code may correspond to a random code or a code that has at least one random portion. For example, in some embodiments the random code may be generated through operation of random number generation software operating in the server. This random code in some embodiments may be a code that is not predictable in advance of the time of the particular transaction. Alternatively the server may operate to generate other data which can be used to obtain an input from the user at the machine which verifies the identity of the user. For example, the server might operate to generate data which corresponds to a message which includes a query to which only the authorized user could readily know the answer (and the answer to which corresponds to data stored in at least one data store accessible by the server). Examples would be messages that prompt a user to enter their year of birth or the last four digits of their social security number. The message the server resolves could be a random one of several such possible messages, each of which includes a query to the user that has a response that would likely only be readily known by the user. For purposes of this disclosure data corresponding to such a message with a query which has an associated proper response input from the user that the server can identify as corresponding to the message that includes the query, will also be considered to be a code for purposes hereof. Of course these approaches are exemplary and in other embodiments other approaches may be used.

The server of the exemplary embodiment then operates as represented by a step 472 to cause the random code to be sent to the particular cell phone which corresponds in the one or more data stores with the user data received. This is done in the exemplary embodiment by the server operating to determine from the user data it receives from the banking machine, the predetermined notification network address (e.g., phone number) which corresponds to the particular cell phone associated with the user of the card that has been presented at the automated banking machine. The data store may also operate to include the particular type of notification to be given to the address. This may include for example a text message, e-mail message, voice notification message, or other suitable message sufficient to notify the user of the code that is required to be input to the banking machine in order to allow the transaction to proceed. One or more data stores associated with the server may include data corresponding to the particular method of notification to be given to a particular user. It may also include instructions which are operative to cause notification to be given through different alternative methodologies. For example, the user may be given a minute to acknowledge a text message which is sent to their specified cell phone. If acknowledgment of the message is not received within the programmed time period, a phone call to the cell phone and communicating the data through an AVR system may be utilized. Further, in some embodiments if the user fails to acknowledge receipt of the code to the system within a particular time period, the server may operate to prevent the transaction from being accomplished. Of course some embodiments may not require an acknowledgment of receipt of the code beyond input to the banking machine. It should be understood that these described approaches are exemplary and other approaches and steps may be used.

As represented in the step 472 the at least one server 416 operates to cause the code that is generated through operation of the server and an appropriate message to be sent to the user's cell phone through the wireless communication system 422. Of course as can be appreciated, the various steps and additional notifications may be given in some alternative embodiments in accordance with the programming of the particular system. The message that is dispatched from the server is received by the phone 424 that has the network address data that is associated in the at least one data store with the particular user data for the card that is being used in the transaction. The user in response to receiving the particular code on their phone, will then provide the code (or a response or other data corresponding to the code depending on the particular system) through one or more input devices to the automated banking machine in a step 436. In some exemplary embodiments the message to the user's phone may include a statement that a transaction is currently conducted at a machine and they are required to input the particular code in order to allow the transaction to proceed. Such a message will also operate to alert a user who may not be at an automated banking machine that a fraud is being attempted. The message to the user's phone may also indicate to the user a need to provide a particular responsive message if, in fact, they are not conducting such a transaction and they believe that such a transaction to be fraudulent. This may include for example the user providing one or more text message inputs, inputting a specified character (e.g., #2), calling, or otherwise contacting one or more network addresses to provide an input or message that will cause the server and/or the host to block the transaction.

Alternatively or in addition, in some embodiments the message sent to the user's cell phone may give the user the option to allow the transaction to proceed even though the code is not presented. This may be done for example in circumstances where the user has given their card to a child or other person for use on a temporary basis and the user is not with the child or other person at the time. This may be done in some embodiments by the user being instructed to provide an input through the phone of one or more types of confidential information that would only be known to the particular user. This might include for example a secret code other than the PIN, the user's mother's maiden name, or other secret data or data that would generally readily be known by the user to that has been established and recorded in a data store previously. Providing such an option may enable a transaction to proceed in emergency circumstances. It will also prevent a transaction from proceeding in circumstances where the user does not wish for the transaction to proceed. Of course these approaches are exemplary.

Further, while the exemplary embodiment discusses the presentation of a code that a user is allowed to manually input to the banking machine such as through a keypad, other embodiments may cause the code to be input in other ways to the machine. This may include for example, having the mobile device output a two or three-dimensional bar code on the phone display. The bar code may include the data to authorize the transaction. The bar code may be input in some exemplary embodiments by the bar code reader of the particular automated banking machine reading the bar code from the display of the cell phone. Alternatively or in addition, the automated banking machine may include features like those discussed in U.S. Pat. No. 7,516,087 the disclosure of which has been herein incorporated by reference in its entirety. In such cases the automated banking machine may be associated with an image capture device such as a camera. The phone may be caused responsive to operation of the server to output visual images on the display of the phone or several visual images which are captured through operation of the image capture device. For purposes hereof such phone output and machine captured images correspond to and are considered the particular code that is usable to allow the transaction. Of course these approaches are exemplary of approaches that may be used.

Assuming in an example embodiment that the user properly receives a multi-character code through their mobile device, the user inputs the code through at least one input device of the represented in step 474. In this exemplary embodiment, the server determines if the machine sends one or more messages with data having a predetermined relationship to the particular code within the permitted time period (e.g., a time out period). If such messages are not timely received, then the server operates in accordance with its programming to send one or more messages to the automated banking machine which are operative to cause the machine not to allow the transaction to proceed. This is represented in a step 476.

If the server receives one or more messages from the automated banking machine within the time period permitted, the server operates to receive the user-inputted data (e.g., expected data corresponding to the code) as represented in step 478. The server then operates in accordance with its programming to evaluate this received data (corresponding to the code) as represented in step 480. In step 480 the server operates to compare and evaluate the data in the one or more received server messages to determine if the data received has a predetermined relationship to the authorization data (i.e. the security code) that was sent in the one or more messages to the mobile phone. The predetermined relationship may require that the user inputted data received identically corresponds to the data that was sent to the mobile phone. Alternatively or in addition, the sent/received data may have a mathematical or other relationship, or be within a predetermined range of acceptability. This may include for example that the data corresponds to a hash or other corresponding data generated through operation of software operating in the phone that can be evaluated for purposes of determining that the proper code data has been input. Other predetermined relationship arrangements may be based on user provided data containing a predetermined percentage of sent characters or their order. Numerous approaches including alternatives of the types previously described may be taken depending on the nature of the authorization data that is sent to the cell phone and the particular programming of the system.

In a step 482 the server operates to make a determination whether the data it has received has the required predetermined relationship to the authorization data (e.g., code) which the server caused to be sent to the cell phone. If the determination is negative, then the transaction is not authorized. In this case the server operates to send one or more messages to the automated banking machine with data included therein which indicates that the transaction is not to proceed. This is represented by step 476.

Alternatively, if the determination analysis indicates that the data input by the user to the banking machine corresponds to the data (e.g., code) sent in one or more messages to the cell phone, then the server operates to send one or more messages to the banking machine with data included therein that indicates that the transaction is allowed to proceed. This is represented by step 484. As can be appreciated, these messages which are sent from the server to the automated banking machine correspond to the messages received through operation of the banking machine computer in step 440 shown in FIG. 25. Alternatively in some embodiments if a transaction is not allowed to proceed, the server may not send a message to the banking machine and the pending transaction is blocked through a time out or other feature. Of course these approaches are exemplary.

Other embodiments may include other or additional approaches. This may include for example a variation of the approaches already described. In this alternative approach, the transaction proceeds in the manner previously discussed. However, rather than the automated banking machine sending messages which include the user inputted data (corresponding to the code) to the server, and then have the server perform the data comparison, the server operates in accordance with its programming to send one or more messages including the code to the automated banking machine. This may include for example, the server sending data corresponding to the generated code in one or more messages to the automated banking machine. This enables the automated banking machine to compare/determine if the user inputted data corresponds to the particular code that the server generated. The automated banking machine may operate in accordance with its programming to determine if the code data input by the user corresponds to the code data that it has received from the server. The automated banking machine may also be in operative connection with comparison computers that can perform the data comparison/determination on behalf of the machine.

Alternatively or in addition, the server may send a hash or other value based on a mathematical manipulation of the particular code data in a way which enables the automated banking machine to operate to compare a mathematical manipulation of what is input at the machine to the particular data that the automated banking machine has received from the server. In this manner the automated banking machine then makes the determination as to whether the user inputted data corresponds to the authorization code sent to the mobile device so as to allow the requested transaction to proceed.

In still other embodiments, the system may operate to make the decision at other points in the banking machine transaction flow. For example, an exemplary embodiment has been described as making a determination concerning whether the user inputted data corresponds to the authorization data sent to the user's cell phone, prior to the machine sending messages to the host requesting the transaction. In alternative embodiments, such host authorization allowing the transaction to occur may be given and a decision not to allow the transaction to proceed may be made at any point up through the time that the cash is dispensed (or other transaction steps which give monetary value the banking machine user have been carried out). For example, the automated banking machine, at any point in its logic flow before completing the transaction, may operate in a modified form of its programming to make the determination that the user inputted data corresponds to the security data sent to the cell phone through operation of the server. This may have a transaction time advantage in the event that there is a delay in banking machine communication with the server, whereas the banking machine communication with the host (to otherwise authorize the transaction) is not delayed. Thus, the additional security authorization can occur simultaneously (and independently) with the transaction authorization. However, completion (e.g., dispensing the cash) of the host-authorized transaction will not be carried out until the additional security authorization is completed.

Further, it should be understood that the server 416 may be operated like the server of the incorporated disclosure so as to perform marketing or other messaging functions for the banking machine users in addition to the authorization function. This may include for example giving a user the option to sign up for the service through the banking machine as previously discussed. This would include providing through the interface of the machine, output screens and/or audible outputs that question a user not already enrolled for the service concerning whether they would like to sign up for the security service. If the user provides a positive response, the user would be prompted through a further output to provide the number or other system address data of their cell phone or other mobile device. The machine at which the user provides such inputs may operate in accordance with its programming to further send one or more messages to the server that acquires such sign up data, to cause the server not to finalize or to delete the enrollment of the user for the service if the user transaction that is conducted at the machine in connection with the enrollment is denied. Thus for example, if the transaction is denied because the user does not have the correct PIN for the card, or the card is otherwise blocked from performing transactions by the host or a related transaction authorizing computer because the card has been reported stolen, the account is blocked, or the account is overdrawn, the user will not be enrolled for the service. The machine utilizing the principles of the incorporated disclosure may also include the ability for the user to change the cell phone notification information or other data as may be appropriate. Alternatively, the authorization system and the marketing system may be operated as independent systems. The approach taken depends on the particular systems used and the programming of the computers involved.

Alternatively, in other embodiments the host system may operate through a connection with a wireless communication system to perform the (server) functions described. These may include for example, the host system being in communication with one or more databases or other computers which determine whether a particular user has required additional authentication in order to conduct a transaction. Thus, the host may operate in accordance with its programming to generate the code, cause it to be sent to the user's cell phone, evaluate the data input by the user to the banking machine, and carry out the other steps that are indicated in the previously described embodiment as carried out through operation of the server. Modifications may be made to the host messages to provide for the additional messages or for additional message content so as to enable the host to have this added functionality. Of course these approaches are exemplary and in other embodiments other approaches may be used.

In still other embodiments, the banking machine can wirelessly send the security code to the phone. For example, the machine may call the phone. Alternatively, the machine may use a RFID device or NFC device to transmit the code to the phone, requiring both the phone to be near the machine. Alternatively, the server or host could send the security code to the user's mobile device, which could then wirelessly communicate data corresponding to the code to the machine, either automatically or in response to user input to either the phone, the machine or to both, depending on the programming of the various computers. Alternatively or in addition, some embodiments may require input of the code sent by the server to an input device of the machine, and may also require direct local wireless communication between the machine and the mobile device of data to establish the mobile device is in proximity to the machine to allow the transaction to proceed. Further alternatively or in addition, GPS data from the mobile device and/or the machine may be required to also correspond to the mobile device being in proximity to the machine to allow the transaction to proceed. Of course other techniques for sending a security code from the machine to a phone may be used. The automated banking machine may also be operated to generate the security code. That is a transaction device, machine, system, or arrangement (e.g., ATM, POS) may receive the account number, generate a security code, transmit the code to a device (e.g., mobile device) affiliated with the account, receive a returned code from the account holder's device (or some other device/platform associated with the account holder), and compare the transmitted code to the received code.

As previously discussed, the exemplary security arrangements allow for a user's account (or card) to be temporarily blocked for a given transaction or for all transactions. The user can control this temporary blockage. Thus, the security system provides for consumer card control capability.

An exemplary security arrangement enables a user (the holder/owner of an account) to independently reconfigure their account's security protection at any time they desire. A user of the security service can turn their card (or account) "on" or "off". If a card is "on" then the previously discussed security methods for protecting against fraudulent use of the card can apply (e.g., need for user to input a received code to authorize a transaction, need for a user's cell phone to be located adjacent the machine, etc.).

If the user's card is set as "off" then the service will prevent all transactions from occurring against the user's card. In some embodiments the transaction prevention process can be carried out without making the user aware of the attempted transactions. User action (or inaction) is not required to prevent an unauthorized transaction. For example, specific transactions can be denied without contacting the user to input a phone-received code, and not waiting for inaction by the user with regard to correct code inputting (e.g., into a machine or into a cell phone). Similarly, a transaction at a transaction machine is denied regardless of the user's cell phone location (e.g., GPS location) relative to the transaction machine's location. In such a situation, all transactions are denied as if the user does not have a cell phone. Thus, all transactions can be denied regardless of whether or not the user has a cell phone.

The status of a user's card can be temporarily set at "off" until the user enables (or activates) the card again to the status of "on". One or more data stores can store of the current status of each of a plurality of accounts/cards. Such a data store (e.g., 412, 418) can be accessed by a security server (e.g., 416). In other arrangements a transaction host (e.g., 410) and/or a transaction device (e.g., 402, 404, 406) can also access the data store.

In some embodiments a user can independently directly change the security status of their card/account between "off" and "on". A user may have several contact points to use in order to cause the data store to change the security status. A user can contact a system computer 416, 410, 402 (or another computer that is associated with the security service) in order to change their account's "off" and "on" status. For example, a customer can change their account's on/off status via messages that provide customer input to any of the security server 416, a transaction host 410, or a transaction device such as a machine 402. Each of the security server 416, transaction host 410, and machine 402 comprise at least one computer operating software instruction that enables them to receive one or more messages corresponding to a customer request to change account status.

The manner of changing their security status/level can be carried out through various methods, including using a fixed device (e.g., land line phone) or a mobile device (e.g., cell phone). For example, a particular phone number can be used by users to change data corresponding to their account status stored in the data store. Their account status can also be changed through use of a computer (e.g., a PC), such as by messages exchanged using a web application at an online home banking site.

Upon calling the particular phone number or other access address the system computer {e.g., the security server 416) can recognize the user as a person authorized to change the account status. The security server 416 can recognize an authorized user through use of caller ID, a PC computer ID, an inputted unique authorization code, a private security PIN designated for changing account status, verification of digital signature or digital certificates associated with a device, or some other verifiable security feature or combinations thereof. The security server 416 can operate to provide messages that direct or guide the user on how to provide input to change their account status. Such input provided by the user may include number/character key input, text message input, and/or voice input.

In response to receiving one or more messages corresponding to a user's authorized request for a change in their account status, the system computer automatically operates to cause the data store (where data corresponding to the status is stored) to automatically change the stored status. Thus, in some exemplary embodiments the ability of a user to automatically change their own account status (via automated computer communication) does not require use of human service provider. The system computer has software (including computer executable instructions) that automatically causes a user's "off" and "on" status to be changed in a data store immediately responsive at least in part to receiving one or more communications corresponding to the user's request. The automation in some embodiments may enable the change to be made in real time or near real time.

As previously discussed, the exemplary account on/off functionality enables a user to directly change the availability (status) of their account for transactions regardless of whether they own a mobile device (e.g., a cell phone) or a computer. That is, the card security functionality is independent of any user device ownership. For example in some embodiments a public or borrowed device can also be used to achieve a desired change in account protection status.

An account may be temporarily turned "on" so that transactions can be authorized just before a transaction on the account is to be performed. For example, a bank account may be activated just before a machine cash withdrawal is requested. Likewise, a credit/debit card account may be activated just prior to paying for a purchase. Soon (or immediately) after an account is used for a transaction the account can then be deactivated by being turned "off" to block further transactions. Thus, in some embodiments a person in a merchant store (e.g., a restaurant) can both activate and then deactivate (i.e., unblock and then block transaction capability) their debit card while being located in the store.

As can be seen, the exemplary card security service can protect a registered account from any (and all) transaction activity, including on-line purchases, POS transactions, ATM transactions, etc. The ability of an account holder whose account remains an open account with their bank, credit card company or other account holder, to temporarily activate and deactivate their account on demand adds another level of security protection to the account. In example embodiments a customer can independently (and in real time or near real time) put a temporary hold on their account for protection against unauthorized usage of their account, and only remove (lift) the hold when necessary to allow a transaction that they initiate.

Figure 27:
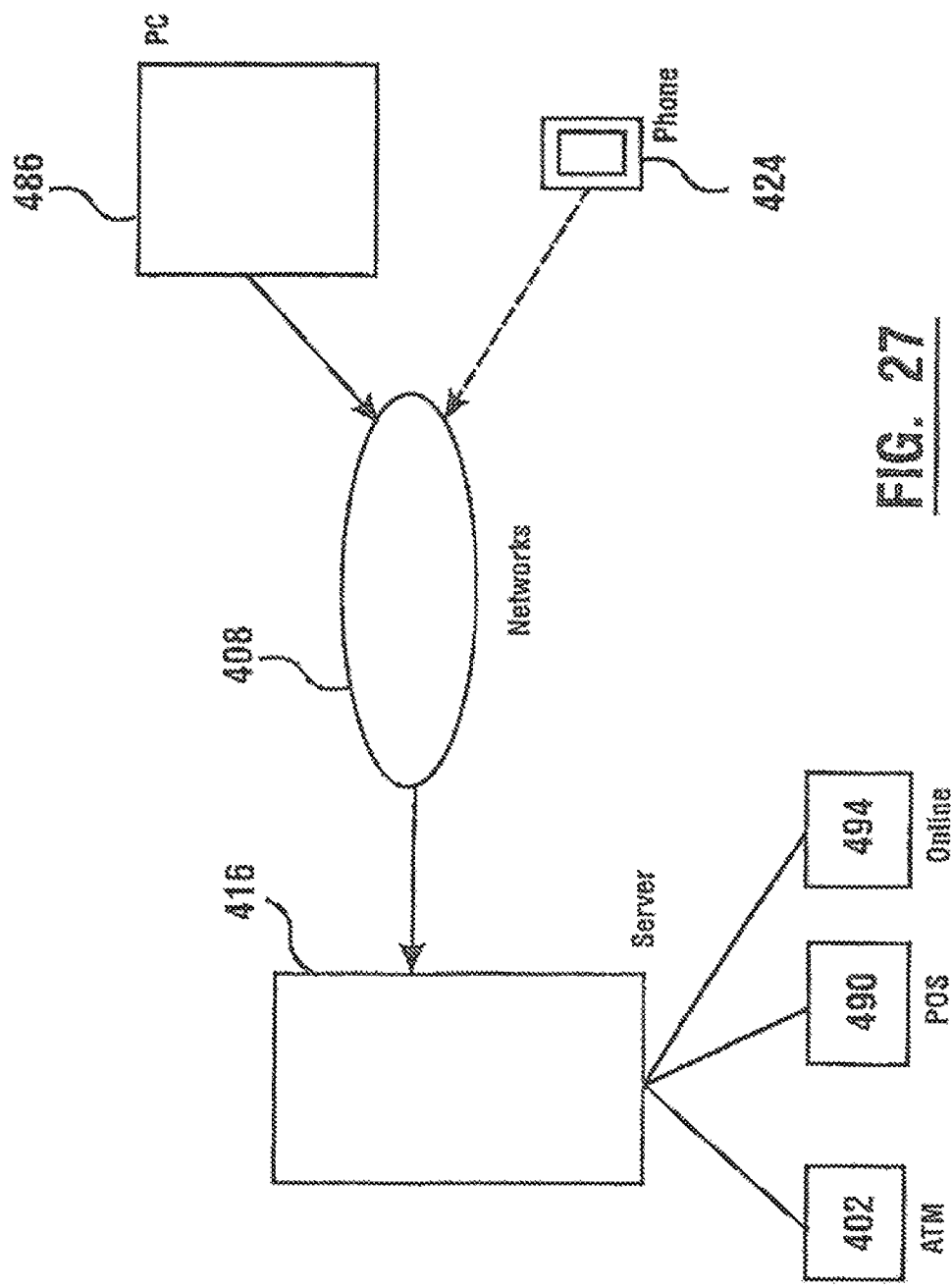
FIG. 27 shows an account security system arrangement.

FIG. 27 shows schematically an exemplary security system server 416 in operative connection with each of a phone 424, personal computer 486, ATM 402, POS device 490, and an online entity 494 (e.g., an online merchant computer). FIG. 27 shows that a customer can request a change in their on/off account status by notifying the account status server 416. The request includes one or more communications with the server 416 through the phone 424 or the PC 486 via one or more networks 408. As previously discussed, the server 416 is in operative connection with at least one account status data store 418 which can store data corresponding to the current on/off (unblocked/blocked) status of the customer's account.

The server 416 can receive one or more account status check communications from the plurality of different transaction devices/machines 402, 490, 494. The server 416 can respond to such communications by checking the account status data store 418, and then providing one or more communications indicating either an account closed/invalid status or an account open/valid status. For example, stored data may indicate an account is open and valid, even through the account may be currently set responsive to stored data based on a message received from the account holder, as "off" or blocked. Accounts that are closed or invalid may correspond to those that cannot have transactions conducted thereon, regardless of user settable blocked or unblocked status. These may include, for example, accounts that the user has closed and discontinued. Such accounts may also include accounts where the corresponding card has been reported as stolen and the entity holding the account has closed the account, or situations where the institution, credit card company, merchant store or other account holding entity has identified possible fraud activity and has temporarily or permanently closed the account. Thus in an exemplary embodiment the server operates to determine if the account on which a transaction is requested is open and/or valid or closed and/or invalid, as well as if the account is open, whether the account is currently blocked by the user from being used to conduct transactions or currently unblocked by the user and available to conduct transactions.

As a result, a transaction may be either approved or disapproved based on the response provided by the server 416.

The server 416 can constitute one or more computers and/or servers. The server 416 includes software (including computer executable instructions) that enables it to operate to receive messages corresponding to user requests, access the account status data store 418, modify or transform data in the data store, and provide one or more confirmation messages indicative that the user request was completed.

Figure 28:
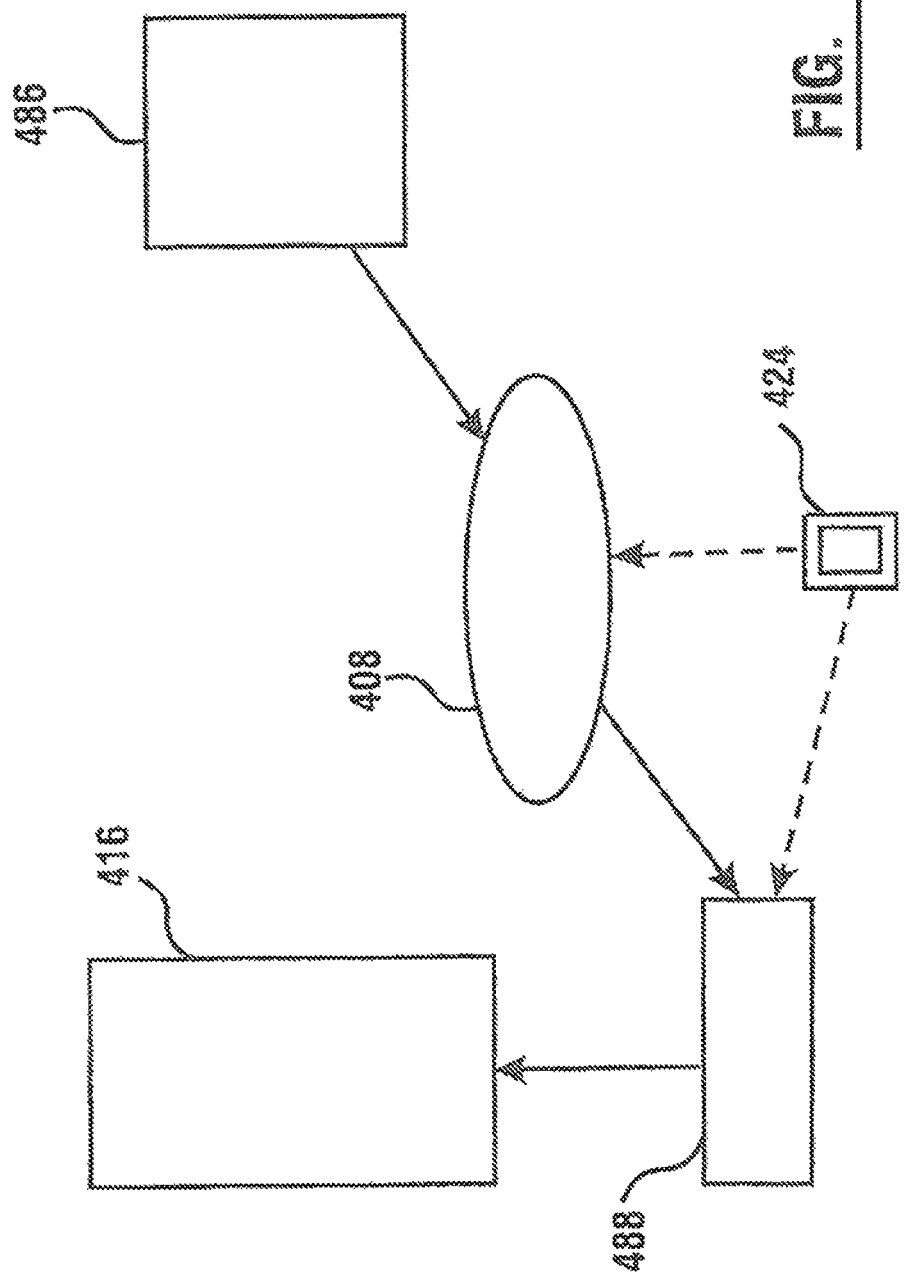
FIG. 28 shows another account security system arrangement.

The exemplary security system arrangement of FIG. 28 is similar to the arrangement shown in FIG. 27, except a financial entity 488 is operatively intermediate the network 408 and the server 416. The financial entity 488 holds and maintains the customer's account. The financial entity 488 operates one or more computers and can be a bank, credit card company, merchant store chain, brokerage company, or any other entity that has accounts.

The FIG. 28 arrangement allows a customer to request a change in their account's on/off status by notifying the financial entity 488. In an example arrangement request can be one or more messages, communicated to a computer of the bank 488 through a phone 424 or a personal computer 486 (or some other personal device) via the network 408. For example, a request can be submitted to the bank through communication with computers that operate the bank's web site. Additionally, the phone 424 may be able to directly connect with a computer interface of the bank. The one or more computers of bank 488 is in operative connect ion with (and can communicate with) the account status server 416. Upon receiving the sent request, a bank computer communicates automatically messages that inform the server 416 of the customer's request. The exemplary FIG. 28 arrangement allows a customer to change their account's status by notifying their bank instead of an entity controlling the server 416.

The exemplary server 416 can receive messages corresponding to account status requests from a plurality of account maintaining entities, including the financial entities. The server 416 can operate responsive to each request by changing the data corresponding to an account's status in the data store 418. The server 416 can also communicate messages corresponding to a status change confirmation back to the one or more computers of the financial entity, which in turn can notify the customer that the account's status has been changed. Alternatively, the server can directly notify the customer without involving the financial entity.

Figure 29:
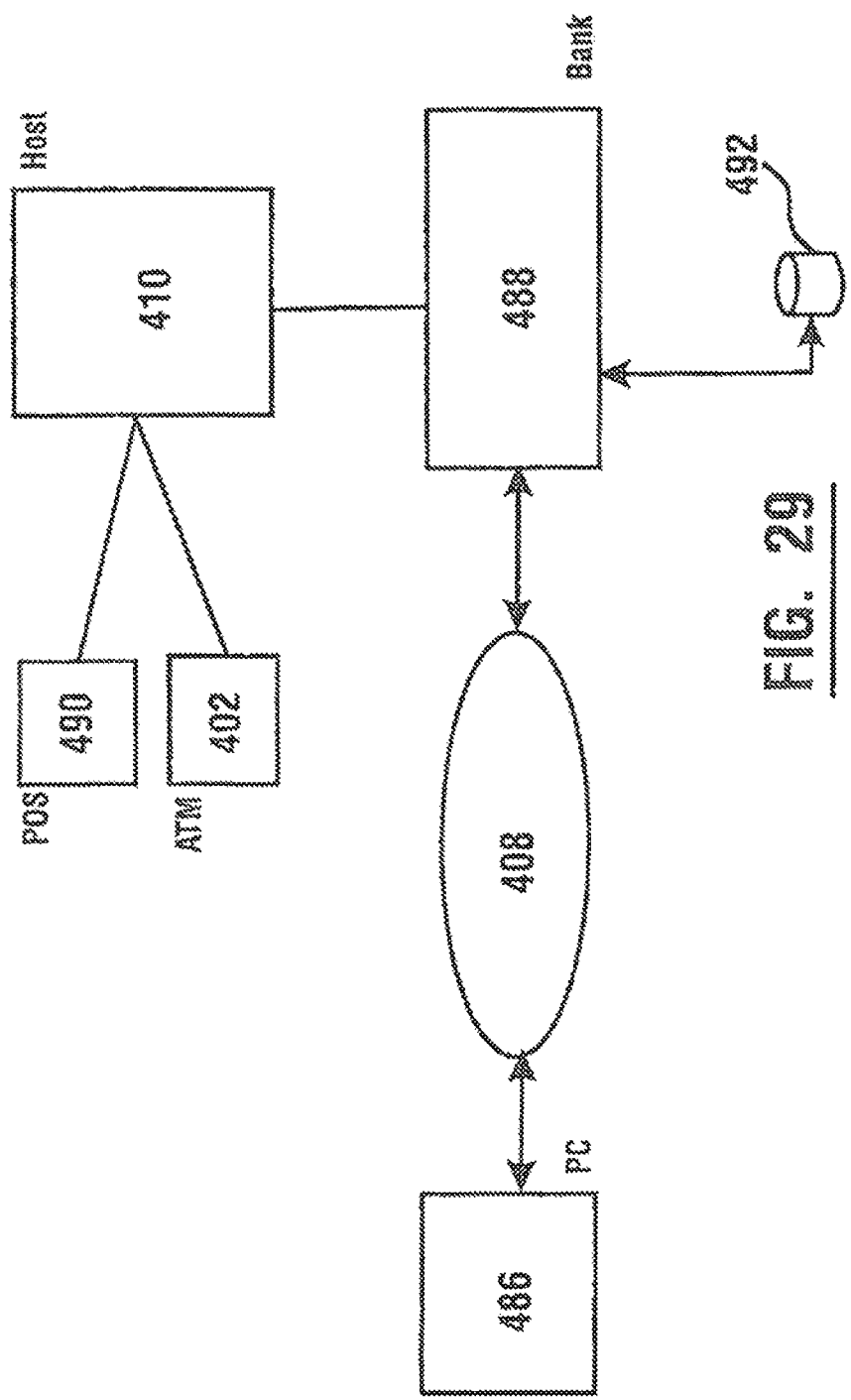
FIG. 29 shows a further account security system arrangement.

The FIG. 29 example security system arrangement shows a financial entity 488 which will be referred to herein for simplicity as a bank, keeping its own account status records instead of a server 416 which in some examples may be operated by a different entity. The financial entity 488 which includes one or more computers can be a bank where the account is held. The bank 488 is operatively connected with one or more data stores 492, which stores the data corresponding to on/off status for a plurality of accounts.

In FIG. 29 the host 410 can be the computer that communicates with a plurality of transaction devices, including for example a POS transaction terminal 490 and an ATM 402. In an account verification operation, the POS terminal or an associated device (collectively and individually referred to herein as a POS terminal) sends one or more messages corresponding to a request that the host check whether a transaction should be approved. The POS terminal sends transaction details, including the account number, to the host. From the account number the host can operate in accordance with its programming to determine that the bank

488 is affiliated with the account. The host then operates to communicate to ask the bank computers whether the transaction should be approved. The bank computer operates to check the current availability of the account based on the data corresponding to the account's on/off status stored in the bank's data store 492. If the account is currently set to "off", then the bank computer operates to communicate to notify the host that the transaction is not approved. In this embodiment no other transaction checks (e.g., account balance, etc.) by the bank are necessary. If the account is determined by the bank to be currently set to "on", the bank computer can operate to conduct the analysis of whether the account is open and valid and the specific transaction approval/disapproval process, and then notify the host of the results. The host will then operate in response to the messages from the bank computer to communicate appropriate messages with the POS terminal.

It should be understood that the security system arrangements shown in FIGS. 27, 28 and 29 are exemplary, and that other variants of the disclosed security system arrangements employing similar principles may be used. This can involve the use of other or additional processes and steps to allow or deny transactions.

In some exemplary embodiments transactions on an account are only permitted while the account hold is lifted and unblocked. Any transaction attempted on the account while the account hold is in place and transactions are blocked is denied. However, some exemplary embodiments may allow for programmed switching of account status for customer-specified transactions. For example, an online banking system of a bank 488 which enables customers to pay bills such as utility bills or mortgage payments via direct withdrawals may allow a customer to use their PC 486 to pay pending bills on a specified date. The one or more computers which comprise the online banking system can be programmed to cause the customer's account to be automatically temporarily unblocked (if not already unblocked) to pay a specific bill on a specific date. The bill pay software causes the one or more computers to allow transactions on the customer's account on the specified date or at the specified time, pays the bill as a transaction on the account, then immediately blocks further transactions in the account (if it was previously blocked). The bill pay software can cause the one or more computers to pay every authorized bill in this manner of turning on then turning off the account.

Alternatively, the one or more computers responsive to the instructions included in the bill pay software of the online banking system or other system can determine if more than one bill is to be paid on a particular date. That is, the bill pay software can determine whether plural bills are assigned to be paid on the same date. As a result, the one or more computers may operate so all assigned bills can be paid while the account's "open" window is available. That is, the account is turned "on", then all of the bills designated to be paid on that day are paid, then the account is returned to "off" status. Thus, even though plural bills were paid, the account was only unblocked once, and only to allow transactions for a brief length of time.

As can be seen, the described ability of a customer to independently and automatically (without a human service provider) temporarily block and unblock their own account provides enhanced protection against fraudulent use of their account. The security system may also provide a tool for law enforcement, which can use the data and server operation to detect, investigate and track unlawful attempts to use blocked customer accounts.

As previously discussed, in exemplary embodiments an account owner can turn their debit card account "on" and "off" in real time (or near real time). Thus, even if the debit card is lost/stolen and the card's PIN is compromised, the card would still be prevented from being used by a thief to conduct a transaction if the debit card account (e.g., bank checking account) is set to "off".

As previously discussed, the exemplary security system arrangement can allow or deny a transaction from being processed and charged against an account based on the stored on/off status of the account. It should also be understood that the exemplary security system arrangement also allows for a transaction on an account to be approved or denied based on the stored on/off status of the account. That is, the security system can be used to approve a transaction on an account, regardless of when the transaction is later processed for charging against the account and the involved accounts are settled. This allows security system approved transactions to be processed on the account regardless of the account's on/off status at the time the transaction settlement processing occurs.

In an example, a credit card charge for a purchase from a merchant may have been approved by the security system server 416 at 6:00 p.m. at the time of the purchase, but not submitted for settlement processing until 12:00 a.m. During the approval process, the exemplary server 416 operates in accordance with programmed instructions to cause the data corresponding to the transaction to be tagged or associated with an identifier (e.g., digital signature/code) as being approved by the security system. In some exemplary embodiments the tag can be attached to, included in or otherwise resolved in association with the transaction data at the time of approval. Alternatively, the server 416 can link the tag data with the transaction data (e.g., date, time, and/or transaction number, etc.) and then store the tag data in one or more data stores for later retrieval and comparison, or send the tag/data to a transaction processing computer associated with the transaction. Alternatively, one or more computers may resolve an identifying value or signature based on selected portions of the transaction data, store such a value in one or more data stores, and use such a value to identify authorized transactions. Later, when the transaction is submitted for settlement processing at 12:00 a.m., the server 416 can determine (from the submitted transaction data received from the merchant, or the tag data or other value previously stored by the server 416) whether the transaction was previously approved. If so, then the server 416 can allow the transaction to be carried out on (charged against) the account regardless of the account's current on/off status.

In an alternative exemplary arrangement, since the security system can be configured to allow a transaction to be processed for settlement regardless of the account's on/off status at the time of settlement processing, the security system server 416 can be used only to approve a transaction. That is, the security system server 416 can be used without its involvement in settlement processing of the transaction. The account's on/off status will only apply to whether a transaction should be approved/denied at the time the transaction is requested. There is no need to check the account's on/off status at transaction settlement processing time. Rather, a transaction that was approved by the server 416 can be processed by an (account settling) remote computer. Denied transactions will be denied at the time they are attempted and will not be later presented for settlement. As a result only transactions that were authorized will be included in transactions that are later presented for charging against the account. In alternative embodiments transactions that have been authorized by the security system can be tagged in a manner to indicate they were authorized. As previously discussed such tagging may include associating certain data in or with the transaction data that is indicative it was authorized. Such data may be included in the transaction record or stored separately and/or remotely of transaction data.

In some arrangements the account settling computer can recognize transactions that have been approved by the security system. For example, the account settling computer can recognize a tag or approval value added to (or used to modify, or resolved from, or associated with) the transaction data. Thus, when the transaction is submitted for processing at 12:00 a.m., the account settling computer can determine (from the submitted transaction data received from the merchant, or from stored data previously received from the server 416) whether the transaction was previously approved. If so, then the server 416 can allow the transaction to be carried out on (charged against) the account regardless of the account's current op/off status. Thus, the account's on/off status is not considered (not a factor) at the time of charging the purchase against the account. However, before allowing the purchase to be charged against the account there can be in some embodiments a double check, including the server 416 approving the transaction at the time of the transaction request and the account settling computer verifying (e.g., via the approval tag) that the transaction was indeed approved by the server 416.

An exemplary process includes operating a computer associated with a financial entity (e.g., financial banking institution) to receive a message from a personal device (e.g., cell phone, home computer) of a customer having an account with the financial entity. The message includes a request (e.g., change in account on/off status) that all future transaction approvals (e.g, transaction approvals attempted after the blocking) based on the account be temporarily blocked (e.g., refused, denied, or prevented from being carried out).

An exemplary process further includes automatically operating the computer in response to the customer request to modify associated data in a data store to change the status of the account to block transaction approvals. The data store includes data corresponding to status information on each of a plurality of accounts, where for each respective account, the status information indicates whether the respective account is blocked to transaction approvals. The computer is operative to determine from the data store whether a respective account is blocked to transaction approvals. The computer is also operative to prevent future transaction approvals from occurring on a respective account while the respective account is blocked to transaction approvals.

Subsequent to changing the status of the account, the computer is operative to receive data corresponding to a further message including data sent from the personal device of the customer. The further message includes data corresponding to a request that future transaction approvals involving the account be permitted to be considered.

The example process further includes automatically operating the computer in response to receiving the request, to permit future transaction approvals on the account, to modify the data store to change the account status to allow transactions to be conducted. The computer is operative to determine from the data in the data store whether a respective account permit<; transactions to be conducted thereon, and is also operative to allow future transactions on a respective account while that respective account permits transactions to be conducted thereon.

An account status that allows transactions to be conducted does not necessarily mean that a transaction will be automatically approved on the account, but rather that the account is simply available for consideration to approve the transaction. Thus, even for an account that permits transactions to be conducted thereon, the transaction can still be denied approval (e.g., insufficient funds, account closed due to reported stolen card, etc.).

In another exemplary method of conducting a transaction, a customer communicates using a phone with one or more computers in an automated service center associated with the bank at which the customer's account is held. The customer uses their cell phone to provide data corresponding to the necessary ID or PIN that enables the bank computer to authorize the customer to make a status change request on their bank account. The customer can use the phone keys to send one or more messages including data to request that their account be turned on. The one or more computers in the bank service center operates to send one or more messages that inform the customer that their requested change in account status has been made.

In some embodiments the verification may be an automated voice message that the computer causes to be returned to the customer during their call with the service center. Alternatively, for further protection against fraud, the verification may be an automated text message sent to the phone that is listed in a data store as having the phone number assigned to the account. Of course these approaches are exemplary.

Next the customer uses their account in making payment for a transaction, such as a purchase from a merchant. The merchant uses a POS terminal or other device to process the transaction. The customer conventionally receives confirmation from the merchant or terminal that payment on their account was accepted, e.g., their VISA card was accepted for payment. Next the customer again phones the one or more computers in the bank service center to request that their account be turned off.

In an alternative arrangement, the one or more computers of the bank service center are programmed to provide the option of allowing the customer to hold on the phone while the transaction is being made. That is, the at least one computer of the service center turns the account on and then waits for a signal from the customer to turn the account back off. This prevents the customer from having to call the service center twice with regard to the same transaction.

In alternative embodiments the at least one computer of the service center is programmed responsive to the customer's input messages to turn the account off within a predetermined waiting time period, such as 5, 10, 15, or 30 minutes after the account is turned on. This can be done via programming in the initial set up, or via messages and data from the customer's mobile device, PC, or ATM input sign up data. Once the predetermined time period expires then the service center computer automatically acts to cause the account to be returned to its off status as a precaution. If the transaction is taking longer than expected, then the customer during the set time period may ask via messages from the customer's mobile device (and receive) from the service center computer additional time to carry out the transaction. Alternatively, one or more computers may be programmed selectively to change the account status to off generally immediately after each authorized transaction. Of course these approaches are exemplary. In some embodiments the customer's options for communicating with the one or more computers of the bank service center and controlling their account's on/off status may be changeable or set as determined by the user. The predetermined waiting time period can be set by the customer. For example, the customer can send messages via their mobile device or PC to set the period to 5, 10, 15, 30, or 60 minutes (or other length of time) that the account is on and usable for transactions. Likewise, in some embodiments a request for (a shorter) additional time (e.g., 3, 7, 10, minutes or other length of time) may be set by the customer. Also, the customer can configure their account such that when the predetermined time period expires the account is not turned off but is kept on. Further in some embodiments, an account's current on/off status can be checked by the customer through their phone or online through the Internet.

In some other example embodiments at least one computer which is operative to allow transactions to be conducted or block transactions may be configured responsive to inputs from the customer to selectively block or allow certain types of transactions. This may include, for example, automatically authorizing prearranged bill payment or direct account deduction types of transactions of the types previously discussed. Thus responsive to messages received by a computer from a customer's mobile device, PC, inputs at an ATM interface, or other inputs, these selected types of transactions that would otherwise be blocked can be allowed. Alternatively in some example embodiments other types of transactions on the account can be permitted to be conducted based on the nature of the transaction. For example transactions under a certain user set dollar amount may be permitted to be conducted while transactions over that set amount may be blocked. Similarly the computer may operate responsive to user input data to only allow transactions up to a cumulative total amount within a defined period. For example account status data stored in association with data corresponding to the account may permit total transactions up to $100 on the account within any given 24 hour period, but may block any transactions in excess of that amount.

In other example embodiments the computer may operate in response to stored status data responsive to inputs provided by the customer to allow purchase transactions but to block cash dispensing transactions. As can be appreciated, a plurality of different transaction type criteria, amount criteria and timing criteria may be stored in one or more data stores and used as the basis for either allowing a transaction to be processed or blocking a transaction.

In still other embodiments the system may be operative to enable a customer to deal with situations where the entity holding the account has taken steps to temporarily close the account. This might occur, for example, when the account holding entity is a credit card company that notes suspicious activity related to the account. In these circumstances the credit card company is often monitoring the account and notes one or more transactions that meet their criteria as possibly fraudulent. In such circumstances the credit card company may close the account temporarily preventing all transactions thereon pending verification from the user that the transactions that are suspect are in fact authorized.

In some exemplary embodiments at least one computer is in operative connection with the data store holding account status data may operate in accordance with its programming to cause at least one notification message to be sent to the customer in response to the computer resolving or receiving a message from another system or device indicating that the user's account should be temporarily closed. Such notification messages may include, for example, contacting a user via the user's mobile device registered with the system. Such a notification may include a text message, synthesized voice message or other suitable message via automated or unautomated means. Alternatively or in addition, the user may receive notification messages that their account is temporarily closed due to suspicious activity through the at least one computer causing messages to be sent to other system addresses associated with the user, such as their home e-mail address, work e-mail address, home phone number and/or work phone number. The types of notifications to be given will depend on the information provided to the system by the user and stored in one or more data stores as well as the program capabilities of the particular system.

In some embodiments in response to receiving the notification that the user's account has been temporarily closed by the account holding entity, the user may contact the account holding entity to provide the necessary information that the account holding entity requires to reopen the account. This may include voice communication through an interactive voice response system in operative connection with the at least one computer with access to the data which caused the account to be temporarily closed. Alternatively or in addition it may include communication with an individual in a call center who can review the information which resulted in the account being temporarily closed and who can after receiving verification from the user that the charges in questions are legitimate, can change the closed status of the account.

In still other embodiments one or more computers associated with the computer controlling the account status and/or the open and closed status of the account, may operate to cause communications to the user's mobile device indicating the nature of the suspect transactions. This may be done via text message, interactive voice response system communicating to the user's mobile device, or other suitable methodology. The user may respond to these communications by providing inputs which indicate whether or not the user considers the transactions in question to be authorized and unauthorized. Responsive at least in part to the inputs provided by the user, the at least one computer of the account holding entity may operate to reopen the account. Alternatively if the user indicates that the transactions were not authorized, the card holding entity computers may operate to permanently close the user's account and to cause the opening of a replacement account. Associated with the replacement account may be the taking of such necessary steps to issue to the user a replacement credit or debit card for use in connection with conducting transactions on the new account.

It should be further appreciated that in some example embodiments the at least one computer of the account holding entity may exchange further messages with the user to assure that the communications are received from the authorized account holder. This may include, for example, requiring that the user provide additional information likely to be only readily known by the authorized user and which was previously stored in a data store of a computer accessible by the account holding entity, can be used to verify the user's identity. Alternatively and/or in addition, processes for verifying the user's mobile device may be used. These may include, for example, GPS tracking of the position of the device or other suitable verification techniques to help assure that the messages exchanged which will result in the account being changed from the closed status to the reopened status are from the authorized account holder.

In still other embodiments the system may be operated to enable a user to open an account that has been temporarily blocked by the account holder through a transaction conducted at an automated banking machine such as an ATM. In such circumstances in some exemplary embodiments the machine may operate in accordance with its programming to determine whether an account associated with a card that is presented to the banking machine is available to allow a transaction to be conducted thereon. In circumstances where the account is determined to have been temporarily closed by the account holding entity, the server or host computer may operate to cause messages to be sent which the user can respond to, to reopen the account. This may include, for example, requiring the user to provide one or more inputs to the machine which would be likely only be readily known by the authorized user and which the at least one remote computer can verify as accurate by comparing the stored data. Alternatively or in addition, the machine may instruct the user to utilize their mobile device to contact the computer associated with the account holding entity and to provide one or more verification inputs. These verification inputs may include, for example, the PIN number associated with the account. Such inputs may alternatively or additionally include other data that only the authorized account holder would readily know and which can be verified as accurate based on data stored in at least one data store that is accessible to the computer associated with the account holding entity. Alternatively or in addition the machine and mobile device of the user may operate to directly communicate via NFC; Bluetooth or other suitable methodology so that the identity of the user's mobile device may additionally be verified as being in proximity to the machine. Alternatively and/or in addition GPS tracking information related to the user's mobile device, the ATM and/or both devices may be received and compared through operation of the at least one computer to further verify the identity of the user at the machine.

In an exemplary embodiment responsive to the user providing information that can be verified as accurate through operation of the at least one computer of the account holding entity, and/or upon the analysis of other information that is suitable to verify the identity of the user and/or their mobile device, the user's account which has been temporarily closed can be reopened responsive to operation of the at least one computer. As a result the user can operate their mobile device to change the status associated with their account to be unblocked, if not already unblocked. As a result the user can then again conduct transactions on the account. Thereafter if the user wishes to again block the account, the user may provide inputs through their mobile device which cause data to be received by the at least one computer associated with the account holding entity and which causes the status associated with the account in the at least one data store to be returned to a blocked condition.

As can be appreciated, such features would enable a user to be more readily aware of circumstances which have caused the account holder to close the user's account due to suspicious activity, and may facilitate and expedite the determination of whether fraudulent activity has occurred. This can minimize the exposure of both the customer and the account holding institution to fraud. In addition the capabilities of some example embodiments to enable the user to act to reopen the temporarily closed account may facilitate user convenience by avoiding circumstances where the user is away from their home and is relying on access to their accounts for purposes of paying the expenses that they are incurring. Of course it should be understood that these processes and systems are merely exemplary and that alternative approaches and arrangements may be used.

Figure 30:
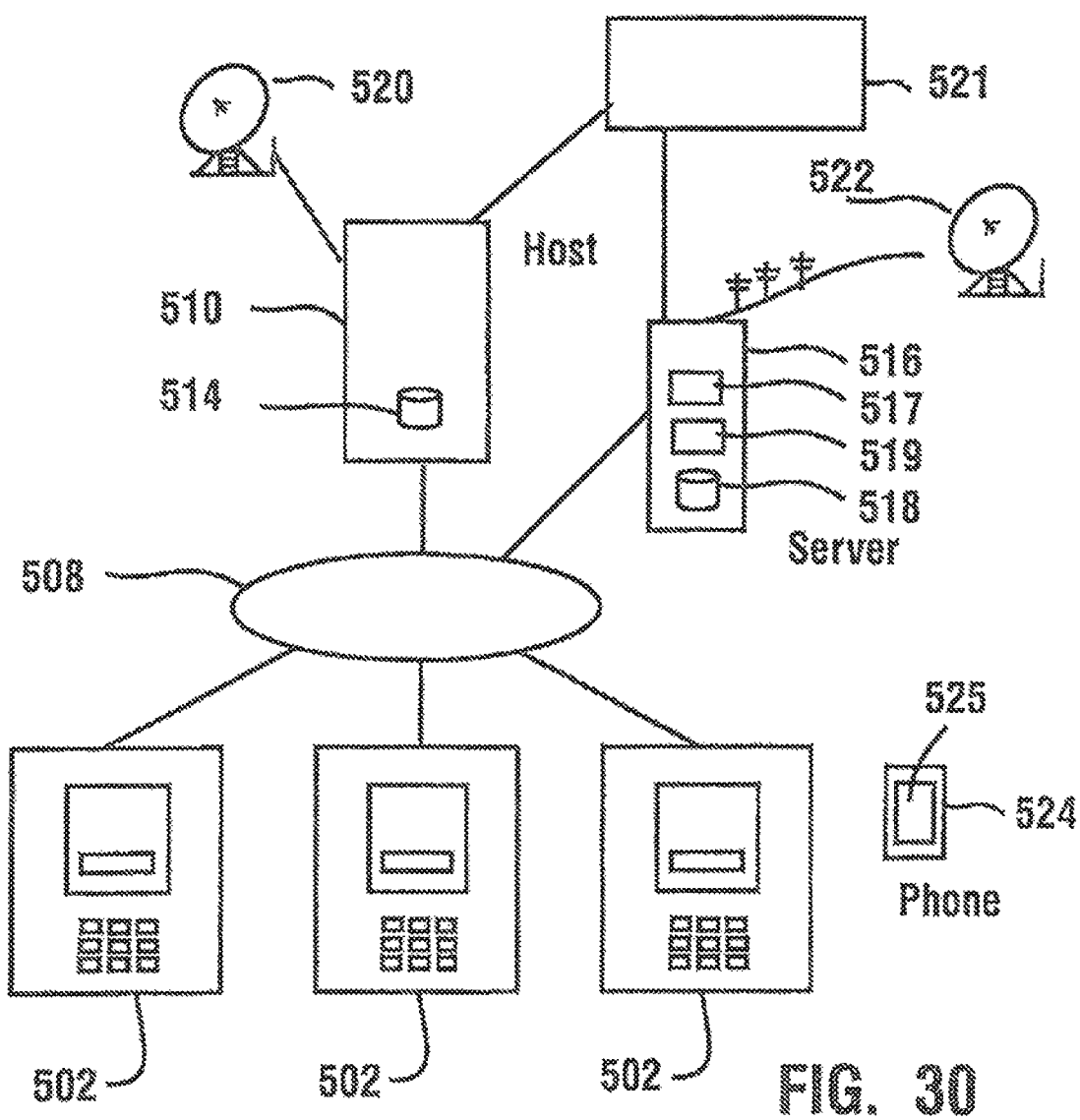
FIG. 30 is a schematic view of an alternative automated banking machine system.

FIG. 30 shows schematically the system of an exemplary embodiment that utilizes a banking server 516 associated with the machines 502, 504, and 506. Server 516 is alternatively referred to herein as a mobile banking server because it is operative to communicate with mobile wireless devices, such as a mobile wireless device 524. Server 516 is operative to cause financial transactions in response to the messages sent by the mobile wireless device 524. The mobile wireless device may be a cell phone, personal digital assistant, a smart phone, portable tablet, a pager, or other suitable mobile wireless device. For purposes of illustration, the cell phone will be discussed as the mobile wireless device of this exemplary embodiment. However, it should be understood that other types of mobile wireless devices could be used as well. It should also be understood that the system is shown schematically for purposes of facilitating explanation.

The system shown in FIG. 30 includes automated banking machines 502, 504 and 506. The automated banking machines may in some embodiments be ATMs and in other embodiments other types of automated banking machines may be used. The automated banking machines may be connected through one or more networks 508 with one or more remotely located computers. Alternatively, the automated banking machines may be connected directly to the one or more remotely located computers. In the exemplary embodiment the remote computers include a host computer 510. The host computer 510 may include one or multiple computers that are in operative communication with one or more data stores schematically indicated 514. The host 510 receives request messages from each of the automated banking machines. The host 510 also sends response messages to the automated banking machines. The request and response messages may be in Diebold 91x format, NCR NDC format, or any other type of format suitable for communication between the host and the automated banking machines.

The exemplary embodiment may also include a banking transaction computer 521 operatively connected to the host computer 510. The banking transaction computer of an exemplary embodiment is associated with a financial institution and includes at least one data store which includes data corresponding to user accounts. The banking transaction computer can also perform banking transactions such as financial account balance determinations or monetary transfers on the accounts in response to messages from the host. The automated banking machines 502, 504, and 506 can operatively communicate with the banking transaction computer 521 regarding banking transactions. The exemplary messages sent between the banking transaction computer 521 and the host computer 510 are in ISO8583 format. However, in other embodiments other message formats may be used. These may include for example IFX format messages or other types of messages that are suitable for the computers and the financial messages involved.

In the exemplary embodiment, the host computer 510 is in operative connection with a wireless communication system schematically indicated 520. Similarly in this exemplary embodiment the server 516 is also in operative connection with a wireless communication system schematically indicated at 522. In exemplary embodiments the wireless communication system may be operative to provide connections to achieve communications with wireless devices such as cell phone 524 as schematically shown in FIG. 30. The wireless communication systems may be in operative connection with one or more wireless networks. This includes, for example, suitable connections to telephone networks, public networks such as the Internet and/or wide area or local area private networks. Alternatively or in addition the wireless communication networks may be operative to communicate wirelessly with other devices. This may include in some embodiments the capability for communication of GPS data for tracking cell phones or other wireless devices as previously discussed. Alternatively or in addition the wireless communication capability may be usable for wireless tracking of the automated banking machines or other items. Such capabilities may include tracking capabilities like those shown in U.S. Pat. No. 7,942,314, the disclosure of which is incorporated herein by reference in its entirety.

In the exemplary embodiment the automated banking machines may include input devices of the types previously discussed. This may include, for example, a card reader which is operative to read data from user cards which correspond to financial accounts. Such readers may include magnetic stripe readers, IC chip readers, wireless readers or other types of readers for example. The automated banking machines may also include other input devices which have a capability to provide user identifying data. The exemplary automated banking machines may also include input devices such as keypads which are usable to receive manual inputs from users. This may include, for example, data such as personal identification numbers (PINs). Keypads may also be used for receiving transaction amounts or other user provided inputs. It should be understood for purposes of this disclosure that keypads can include touch screens or other devices that can receive user selectable inputs. Exemplary automated banking machines may also include other input devices such as for example a bar code reader. Bar code readers may be usable to read for example one-dimensional or multi-dimensional bar codes for purposes of determining the data represented thereby. Of course this is accomplished through operation of one or more banking machine computers that are included in or associated with each of the automated banking machines. Further in some exemplary embodiments image capture devices such as cameras may be associated with or mounted near or within each of the automated banking machines. The image capture devices may operate in connection with one or more computers and systems having the capabilities described in U.S. Pat. No. 7,533,805 the entire disclosure of which is incorporated herein by reference. Of course these capabilities are exemplary and in other embodiments other approaches may be used.

In the exemplary embodiment the host system may operate in a manner like that discussed in the incorporated disclosures, to receive messages from an automated banking machine and to cause financial transfers related to one or more accounts corresponding to the card data on the card that is read for purposes of carrying out the transaction at the particular machine. Thus for example in exemplary embodiments the host 510 may receive one or more messages from an automated banking machine at which a user is requesting a transaction. These host messages may include data corresponding to the card data which identifies the user and/or their financial accounts. The host messages may include data corresponding to a PIN number, data corresponding to a biometric identifier of the user or other identifier presented by the user at the banking machine. The one or more messages sent to the host from the banking machine may generally also include information regarding the type of transaction the user wishes to conduct. This may include, for example, a request for cash withdrawal from the automated banking machine. The one or more messages sent to the host may also include data corresponding to an amount associated with the transaction that the user wishes to conduct. This may include, for example, in a cash withdrawal transaction, a request for $200 to be dispensed from the banking machine and with a corresponding debit assessed to a user's checking account.

In exemplary embodiments the host may operate in accordance with its programming based on data stored in the one or more data stores, to determine that the card data corresponds to an authorized account that is authorized to carry out the requested transaction. The host computer may also operate in accordance with its programming to determine that the PIN number data or other data input by the user and associated with the message corresponds to that which is appropriate for the particular user or account. This is done based on the host computer operating to determine that the data included in the message requesting the transaction corresponds to data in the one or more data stores 514. Of course these approaches are exemplary.

The host computer may also determine that the requested automated banking machine transaction is authorized for the particular account and/or user, and operates to cause one or more messages to be sent from the host to the particular automated banking machine. This may include, for example, messages including data which indicates that the transaction is authorized. In response to receiving one or more messages from the host, the automated banking machine operates to carry out the transaction. In this example this would include operating a cash dispenser to cause cash stored in the machine in the requested amount of $200 to be dispensed from the machine to a user. Of course in a situation where the host computer determines that the transaction is not authorized, then the messages sent to the automated banking machine will indicate that the transaction is not to be conducted. In this case the automated banking machine may operate to display an appropriate message to the user and will operate to cancel the transaction. In some embodiments and based on the messages from the host to the automated banking machine, the user card may be returned to the user. In cases where the card is reported stolen or otherwise the programming of the host indicates the card is being improperly used, the messages to the automated banking machine may operate to cause the banking machine to capture the card. Of course these approaches are exemplary.

Further in exemplary embodiments the automated banking machine may operate once it has carried out successfully the authorized transaction, to generate one or more messages to the host to indicate the successful completion of the transaction. This may be done through operation of the one or more banking machine computers included in or associated with the machine which operate in accordance with their programming to cause such messages to be sent to the host. The host may operate in accordance with its programming in response to the data included in such messages to cause the financial transfer from the user's account corresponding to the value of the cash dispensed. Alternatively if the automated banking machine was not able to carry out the transaction (for example the cash could not be dispensed), the at least one computer of the automated banking machine operates to cause one or more messages to be sent to the host with data indicating that the authorized transaction could not be carried out. The host operates in response to the one or more messages from the automated banking machine to record that the transaction could not be completed. The host also operates in such circumstances in accordance with its programming not to charge the user's account for the value of the requested transaction, even though the transaction was approved. The host may further operate in accordance with its programming to cause a notification to be given in appropriate circumstances of a problem or other condition at the banking machine will need to be remedied because the transaction could not be completed. This might include for example that the transaction was unable to be completed because the automated banking machine does not contain sufficient cash. The host may operate in accordance with its programming to give notice to appropriate entities to replenish the machine with cash. Of course these operations and steps are exemplary and in other embodiments, other approaches may be used.

A typical banking transaction using the automated banking machine 502 is performed as follows. First, a user swipes or otherwise causes an input of the card data from his or her card which is read through the card reader. The user then enters his PIN and enters the desired transaction type and amount using the keypad, touch screen or other input devices as mentioned above. The automated banking machine 502 then sends a request message regarding the banking transaction to the host 510. The host 510 then either by itself or by communicating with other systems verifies that the user is authorized to conduct the transaction. The host 510 then sends a response message to the automated banking machine 502 that includes data which indicates to the machine whether to perform or not perform the transaction. If the host does not have the necessary data to send the response message to the automated banking machine 502 indicating whether to perform or not perform the transaction, the host 510 may in some embodiments send one or more messages corresponding to the request through the network 508 to the banking transaction computer 521 requesting the data. Upon receiving the request message from the host 510, the banking transaction computer 521 will resolve whether the transaction is authorized based on data stored in one or more associated data stores and send the data concerning whether the transaction is authorized to the host 510. The host then sends an appropriate corresponding response to the banking machine.

For example, the automated banking machine 502 may send a request message to the host 510 which indicates that the user is requesting the machine to dispense a certain amount of cash.

The host 510 then sends a request message that the user's account is requesting to withdraw the requested amount of cash to the banking transaction computer 521. The banking transaction computer 521 then determines whether that amount may be withdrawn from the user's account based on data stored in at least one data store. The banking transaction computer 521 sends a reply message regarding that determination to the host 510. If the message or messages from banking transaction computer 521 indicates that the amount of cash can be withdrawn from the user's account and the user is authorized to conduct the transaction, the host 510 then sends a response message which causes the automated banking machine 502 to dispense the cash. Alternatively, the host 510 may send a reply message telling the automated banking machine 502 to display a user denial message on its display, if the banking transaction computer has returned a message to the host indicating that the person is not authorized to conduct the transaction or that the requested amount of cash cannot be withdrawn from the user's account. Then, when the automated banking machine 502 is instructed to dispense cash, when the machine completes dispensing the cash, the machine 502 sends a completion message to the host 510 that says that the cash has been dispensed.

The exemplary embodiment further includes a mobile banking server 516. The mobile bank server 516 is operatively connected to the banking transaction computer 521. The mobile banking sever is also operatively connected to the host and automated banking machines via network 508. The mobile banking server 516 allows a user to use his or her cell phone to conduct banking transactions. In an exemplary embodiment the cell phone would appear to the banking transaction computer to act like an automated banking machine to other transaction terminal computers connected in the network. Such transactions via the cell phone in an exemplary embodiment may include an inquiry about a user's account balance and transferring money between a user's accounts.

The exemplary mobile banking server 516 includes at least one data store with computer executable instructions operative to cause at least one processor in the server to carry out certain steps. The data store may include semiconductor memory, optical memory, magnetic memory or other suitable computer readable memory which can be used to store and recover data. In the exemplary embodiment these instructions include a parser program 517 for parsing messages, and an interface program 519 that operates to register and store the user's information based on the messages, and to recover such information. The mobile banking server 516 is also in operative connection with one or more data stores 518, where user and program instruction data may be stored. The mobile banking server 516 may be operated by the financial institution which holds user financial accounts, or may be operated by a third party. The mobile banking server 516 may include data associated with a plurality of accounts. The accounts may be associated with a single financial institution or a plurality of different financial institutions whose customers may use the system. For example, the mobile banking server 516 may be operatively associated with a bank of a first user and also operatively associated with a credit union which holds a financial account of a second user. Of course these account relationships are exemplary and in some embodiments the mobile banking server could have data for various types of accounts with one or several entities.

The mobile banking server 516 communicates with the banking transaction computer 521 to exchange messages operative to cause a banking transaction on a user's account. In response to the receipt of messages from the mobile banking server 516, the banking transaction computer 521 communicates with the mobile banking server 516 to send messages related to the banking transaction involving the user's account. The messages exchanged between the mobile banking server 516 and the banking transaction computer 521 may be in ISO8583 format or other suitable format that can be used by the banking transaction computer.

In the exemplary embodiment the mobile banking server 516 may have capabilities like those described in U.S. Pat. No. 7,516,087 or 7,946,480 the disclosures of which are incorporated herein by reference in their entirety. This includes for example including data in the one or more data stores 518 which corresponds to user data and messages or other actions to be presented and/or taken when a particular user is determined to be requesting a transaction at a particular automated banking machine. This can include for example presenting certain specific determined messages to the particular user based on stored information and/or criteria associated with that particular user. It may also include certain features to improve security. Of course, these approaches are exemplary.

In this particular exemplary embodiment the one or more server data stores 518 include data corresponding to one or more predetermined notification network addresses. This network address data may correspond to one or more ways of communicating with the particular user or account holder. In exemplary embodiments these ways of communicating may correspond to a network address for communication with a user's wireless device. This data may include, for example, a network address data for calling the particular user's cell phone, such as a cell phone number. Alternatively or in addition, the network address data may include data for communicating a text message to the user's particular cell phone. Alternatively or in addition, the network address data may include an e-mail address at which messages are receivable with the user's cell phone, or other data that can be used for communicating with the particular user's cell phone or other mobile device so as to enable the communication to be provided to the user during or proximate to the conduct of a particular transaction. Further the exemplary embodiment of the one or more servers 516 includes computer executable instructions that are operative to cause the server to generate message content appropriate for messages to be communicated to a user's cell phone or other mobile device related to particular transaction conditions. Alternatively or in addition, such message generation capabilities may be associated with other connected computers and/or the wireless communication system with which the server 516 is connected.

Figure 31:
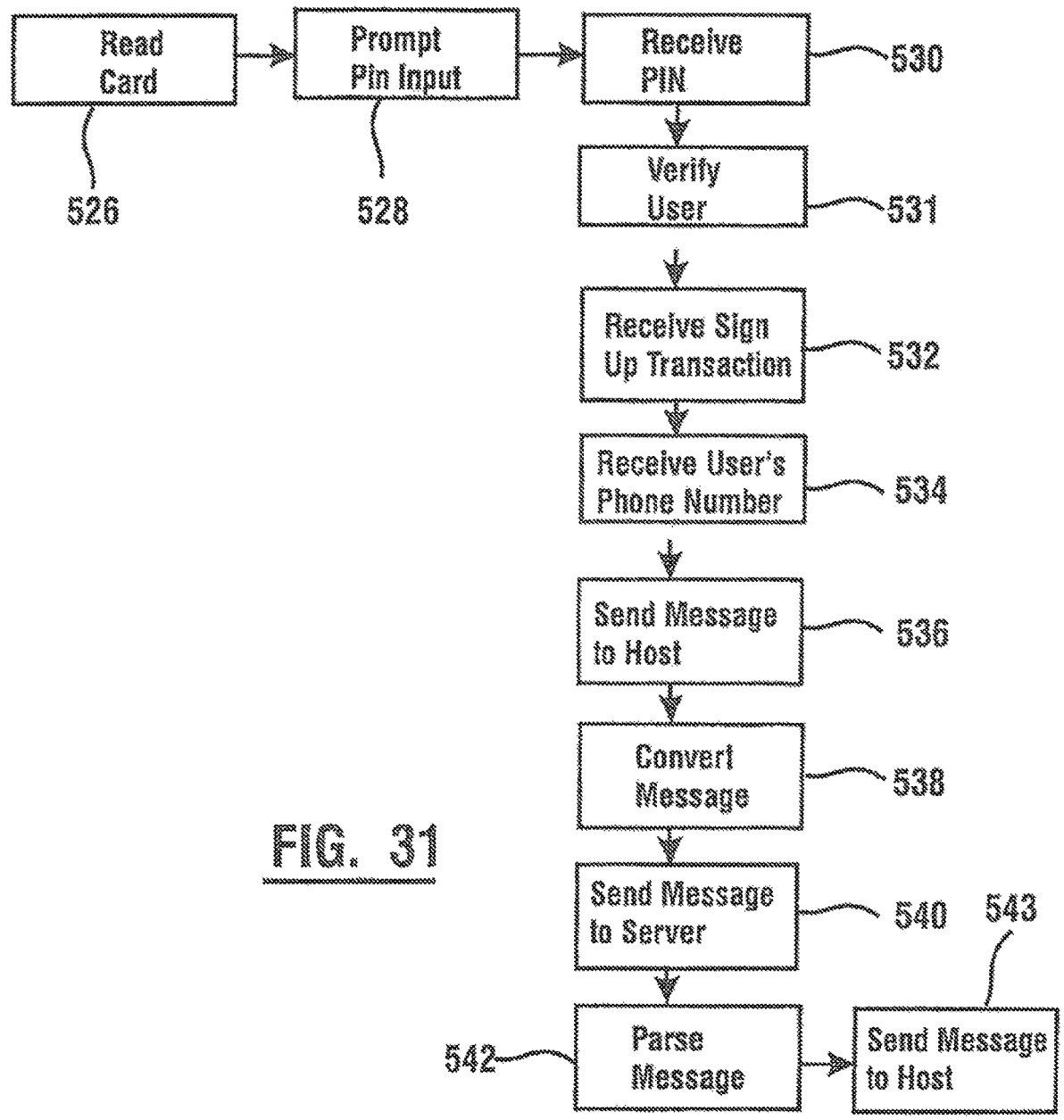
FIG. 31 is a schematic representation of software logic carried out by the exemplary automated banking machine system shown in FIG. 30.

In the system schematically represented in FIG. 30, the system may utilize the mobile banking server 516 to perform banking transactions in response to the messages communicated with the cell phone 524. In an exemplary arrangement, the user is first given the option by the system to register the cell phone 524 for this service. The exemplary software logic flow to accomplish this registration is schematically represented in FIG. 31.

In particular, as can be appreciated before a user approaches the automated banking machine it may be operating in a wait mode. This may include, for example, outputting particular promotional messages or other information to attract a user to the machine and/or providing instructions to a user on how to commence a transaction with the machine. In the exemplary embodiment, the machine user may commence a transaction by causing the card reader to read data from a card which includes data corresponding to the user's financial account. This is represented schematically in FIG. 31 by a step 526 in which the machine operates to cause a user's card to be read. This can be done for example through operation of the particular type of card reader in the machine.

In accordance with the incorporated disclosure, the exemplary embodiment of the banking machine computer is operative to prompt the user to input their personal identification number (PIN). This is represented in a step 528. The machine 502 then operates in accordance with the software instructions associated with its computer to receive PIN data from a user. This is represented by a step 530. The user inputs their PIN through a keypad or other input device on the machine. Of course it should be understood that other input devices for receiving alternative or additional identifying information may be used. This may include for example biometric inputs, facial recognition inputs or other inputs that are suitable for identifying the particular user or their account.

In the exemplary embodiment, the automated banking machine 502 operates in accordance with its programming to provide a user with an output through a display or other output device that includes transaction options that the user may select. The transaction options correspond to transaction types that the user could conduct at a machine. In this exemplary arrangement, one of these transaction options corresponds to setting up the user's cell phone 524 or other mobile wireless device to conduct transactions through the mobile banking server 516. To do this transaction, the automated banking machine 502 first verifies that the user is authorized to conduct banking transactions at step 531. This verification may be done in several ways.

For example, if a previous banking transaction, such as a cash withdrawal, has already been performed by the user in the current transaction session, the user has already been verified to be authorized to conduct banking transactions on the respective account. As previously mentioned, to accomplish this verification, the automated banking machine 502 sends a request message in the Diebold 91× format regarding this banking transaction to the host 510. The host 510 either by itself or by communicating with other systems then verifies that the user account and PIN have the required corresponding relationship and that the user is authorized to conduct the banking transactions.

The computer of the automated banking machine may have associated programming which includes data associated with one or more transactions conducted by the user while at the machine during this transaction session, and if a prior transaction has been carried out which has verified the authority of the user to conduct transactions then the user is deemed to be properly identified and authorized for purposes of registering address data for their mobile device.

If a previous banking transaction has not been satisfactorily completed in this transaction session at the machine, the automated banking machine 502 may operate in accordance with its programming to automatically send a request message in the 91× or other appropriate format to the host 510 to do a balance inquiry transaction to verify that the user's card and PIN data are associated with an authorized user. The host 510 then operates responsive to this message to generate an ISO8583 format message or other appropriate message, and sends a corresponding message to the banking transaction computer 521 to request the balance inquiry. The bank transaction computer 521 then authorizes or refuses the balance inquiry transaction based on the card and PIN data, and sends a reply message regarding that determination to the host. If that reply message corresponds to the banking transaction computer 521 authorizing the balance inquiry transaction, the host sends a response message to the automated banking machine with that account balance data. The receipt of such a message is an indication to the machine that the account is valid, the input PIN is correct and that the user currently operating the machine is authorized to conduct the banking transactions on that account. Of course, these approaches are exemplary and in other embodiments other approaches to verifying the authority of the banking machine user to register a mobile device may be used.

After the person is verified to be authorized to conduct the banking transactions, the automated banking machine 502 may then prompt the user to set up the user's cell phone 524 to conduct transactions with the mobile banking server 516. For example, the automated banking machine 502 may display a message that says "Would you like to sign up for the mobile banking service?" The user then indicates by one or more inputs to the automated banking machine 502 his or her desire to set up his or her cell phone 524 to conduct mobile banking transactions. This is represented by a step 532.

The automated banking machine 502 then prompts the user to enter the network address the user wants to register in connection with the user's account. This may include, for example, the user's cell phone number. The user enters his cell phone number via a key pad or other input device into the automated banking machine as represented by step 534. The automated banking machine then sends a request message in 91× format or other suitable format to the host 510 as represented by step 536. The exemplary request message contains data corresponding to the user's phone number, account number, PIN, transaction type, and amount involved. In this case, the transaction type includes data corresponding to setting up of the user's mobile wireless device to conduct transactions with the mobile banking server, and the amount involved is zero. The host 510 then determines that this is a sign up message. The host 510 receives the 91× format or other message and generates an ISO8583 format or other format message in step 538. The host 510 then sends the user's account number, the PIN, and sign up message in ISO8583 format or other format to the mobile server in step 540. Of course as can be appreciated in other arrangements, other server messages and host messages may be used. Also such messages may be appropriately encrypted or otherwise configured to reduce the risk of interception.

In step 542, the parser software 517 parses the ISO8583 message, and in this exemplary embodiment the user's name, phone number, and account information is resolved through operation of the server. The mobile banking server 516 operates so that all or a portion of this data is stored in the data store 518 or other memory for future use. The mobile banking server 516 then sends a message to the host 510, and the host operates responsive at least in part to the message to send a message to the automated banking machine 502 that the user has set up his or her cell phone 524 to conduct transactions through the mobile banking server 516. This is indicated by step 543. The automated banking machine 502 then provides one or more outputs indicating to the user that this cell phone 524 can now be used to conduct mobile banking transactions. The automated banking machine 502 may also operate to give the user the phone number, text messaging number, short code or other contact data for purposes of conducting banking transactions with the cell phone 524. This information may be in the form of a message displayed on the display screen of the automated banking machine. Alternatively, the information could be sent by the machine via RF such as Bluetooth or Near Field Communication (NFC) messages to the cell phone. Alternatively data could be provided to the phone via visual outputs to the phone. Such codes can include bar codes such as QR codes or other outputs that can be received via the camera or other input devices on the phone. In alternative embodiments the machine may also provide other data to the phone. This may include identifying data, authentication data, a digital certificate or other information useful in identifying the mobile device and/or in carrying out transactions.

Alternatively, a user's mobile device may be registered and enabled to conduct transactions in other ways. This may include, for example, the user registering the phone at a financial institution. This may include the user being identified as authorized and having contact data for the mobile banking server along with security credentials or other data loaded in the phone via a communication interface at the institution. Alternatively, in some embodiments, a user may register the phone using an online banking system. Of course, these approaches are exemplary of many that may be used.

Figure 32:
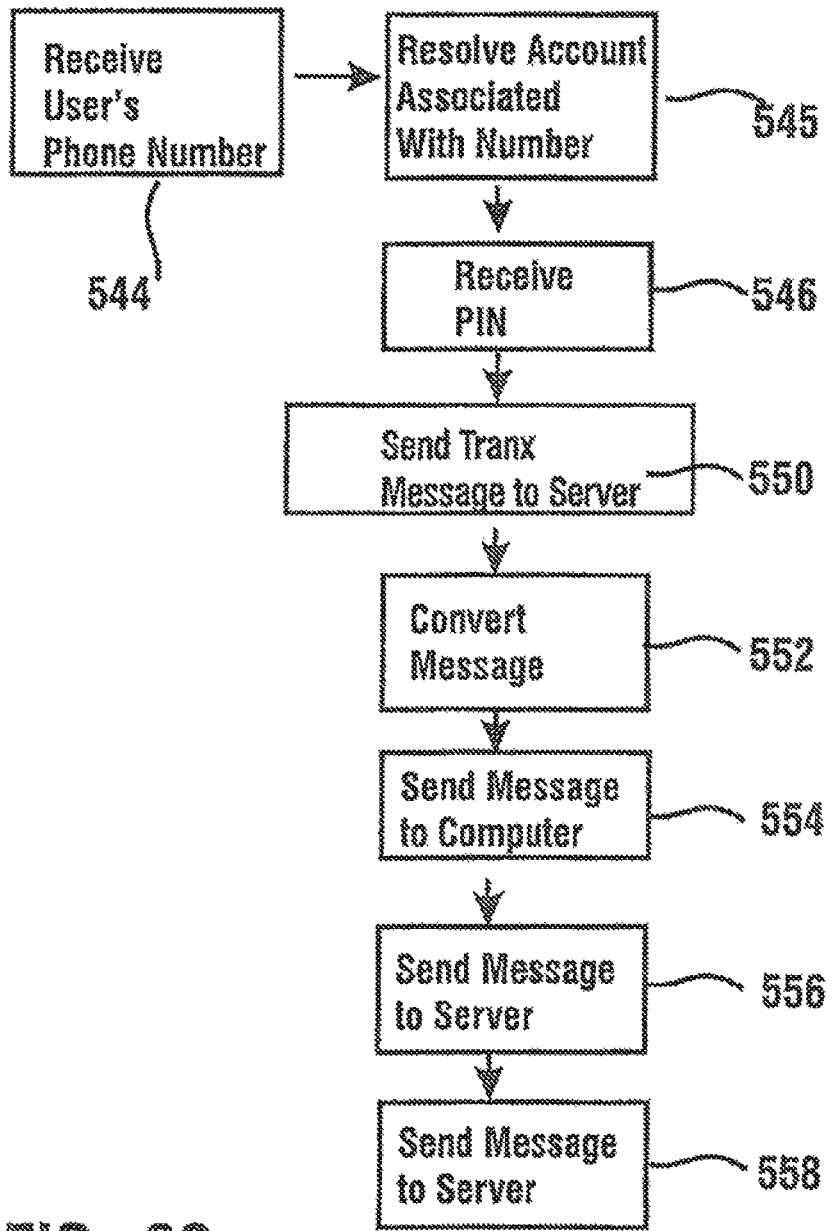
FIG. 32 is a simplified schematic representation of software logic carried out through operation of the exemplary automated banking machine system represented in FIG. 30.

After the cell phone 524 is registered in at least one data store associated with the mobile banking server, the cell phone 524 may be operated to request the mobile banking server 516 to perform transactions as illustrated in FIG. 32. For example, the transactions may include balance inquires and transfers between linked accounts of the user. Optionally, the system could be set up so that other transactions that do not involve the dispensing of cash that can otherwise be performed at a machine can be performed by the cell phone communicating with the mobile banking server 516.

To accomplish a transaction, the user enters or causes the phone to contact the phone number, short code or other system contact data given to him by the automated banking machine 502 or other system used for registration. The cell phone operates to connect with the mobile banking server 516. The mobile banking server 516 receives this number of the cell phone and/or other identifying data and/or identifying credentials such as a digital certificate sent by the cell phone in a step 544. Server 516 then determines that this number and/or other data is registered and associated with the user or the user's account. This is represented in step 545. If the phone corresponds to a registered user or account, the mobile banking server 516 then communicates with the user's cell phone 524 to prompt the user to enter the user's PIN. Such communication may be via audio, text message or other means. The user enters his PIN into the cell phone 524 and this information is sent to the mobile banking server 516 as represented by step 546.

The mobile banking server 516 then communicates messages with the user's cell phone 524 that cause outputs from the cell phone that ask the user what type of transaction that the user wishes to conduct. Such outputs may be audio outputs, visual outputs, or both. The user then operates the cell phone 524 by pressing certain key inputs or providing audio inputs to select the transaction. If the transaction involves a transaction amount the user is prompted to input the amount responsive to messages from the server. The cell phone 524 then sends a message to the mobile banking server 516 in step 550 to perform the selected banking transaction. In step 552, the mobile banking server 516 receives the transaction request message and operates responsive thereto to generate a corresponding ISO8583 format message. The message is then sent to the banking transaction computer 521 in step 554. The ISO8583 message is sent to the banking server that can authorize the transaction based on the user's account data resolved by the server 516 and included in the message. The banking transaction computer 521 then determines if the transaction is permitted or denied and sends a message including data related to the transaction and the determination back to the mobile banking server 516 in step 556. The server 516 then sends one or more messages corresponding to the determination and data in the message from the banking server to the user's cell phone 524 in step 558.

For example, a user may inquire about his account balance in a bank account using his or her cell phone 524. The mobile banking server 516 verifies that the user's cell phone is associated with an authorized account receives a PIN input and prompts the user to input what type of transaction that the user wishes to conduct. The user operates the cell phone 524 to select the transaction which will cause a check of the user's account balance with the user's bank. The cell phone 524 then sends one or more transaction request messages regarding the account balance inquiry to the mobile banking server 516. The mobile banking server 516 receives the transaction request associated messages and generates an appropriate message or messages for such an account balance inquiry in an ISO8583 message format. The message is then routed to the banking transaction computer 521 based on the user's account data. The banking transaction computer 521 operates to verify the account data, determines the balance in the user's account and then sends a message including data corresponding to the user's account balance to the mobile banking server 516. The mobile banking server 516 then sends one or more messages including data corresponding to the user's account balance to the user's cell phone 524. The user's account balance then, for example, may be displayed on the display screen 525 of the user's cell phone 524 or output as an audio output via synthesized speech system, for example.

In the exemplary embodiment, the user when requesting a transaction operates the keypad of the cell phone to enter his PIN, and to select the type of transaction and provide other inputs. Alternatively, the user could input the PIN, type of transaction amount or other data by voice activation or by text messaging. For example, the user may text message the type of transaction that he or she wants to conduct.

The exemplary embodiment of the mobile banking message server operates to provide a cell phone user with transactions that a user could otherwise conduct at an ATM with the exception of receiving cash. Further the mobile banking server in the exemplary embodiment may be operative in a manner similar to an ATM host or other computer that communicates with other banking computers or other financial transactions.

It should be understood that while the mobile banking server has been discussed in connection with carrying out balance inquiries and transfers between linked accounts of a user, in other embodiments other transactions may be performed. These may include the receipt of account statements that provides a detailed record of transactions conducted involving the user's account. Alternatively such transactions may involve viewing cancelled checks or other documents associated with the account of the user. In still other embodiments messages sent to the phone may correspond to monetary value which can be stored in memory of the phone or elsewhere in a connected computer so as to be disbursed responsive to operation of the phone. Checks may be deposited using features like those described in U.S. Pat. No. 7,896,235 the disclosure of which is incorporated herein by reference in its entirety. Of course these transactions are exemplary and other transactions involving determining financial status or transferring financial value may be accomplished utilizing the principles described herein.

Alternatively, in other exemplary embodiments, the system may be set up such that the user's account and PIN number data may be associated with other identifying data that can be input through the phone or other mobile device. For example, at the time of registration, whether at the machine, financial institution, home banking interface or other methodology, the user can be prompted to select an alternative data input which can be linked in a data store with a user's PIN number. The selected data may include a password, phrase or other suitable input that can be provided to a mobile device. The data linking the substitute and the actual PIN number may be stored in a data store associated with the mobile banking server or other connected suitable data store. Thus, for example, when a user conducts a transaction with their mobile device, the user may be prompted to input their authorization data through the phone. The mobile banking server may then operate in accordance with its programming to receive this authorization data and determine if it corresponds to data representative of a user PIN associated with the account data. The user PIN may then be used to attempt to conduct the transaction.

In still other example embodiments, a user's cell phone could include an application that enables the user to establish a plurality of selectable identifying features, which can be input through input devices on a smart phone or other device so as to identify the user. Data corresponding to these plurality of inputs are stored in data stores associated with one or more servers and correlated with a user's account number and/or PIN number. A smart phone application for example, can provide the user with options to set certain features as the identifying features, data corresponding to which is correlated with their account data. The user can be prompted through programmed instructions included in a smart phone application or other programmed instructions, to select categories of images, sounds, signals and/or key inputs to serve as the suitable identifying features which are alternatively referred to herein as authenticating factors. Options may be provided to a user under each of the categories to select a type of input to be utilized as the identifying information for prompting an input, For example, if a user were to select an image feature as a user identifying input, the application on the phone would then prompt the user to select a biometric feature, a body art feature, or an article. In addition, the instructions might include subcategories under each. For example, selecting a biometric feature might cause the phone to provide one or more outputs that prompt the user to select their face, an eye, ear, finger or other body part as the item, the image of which is to serve as an authenticating factor. Based on the selection by the user, the user is then prompted to utilize the camera on the smart phone to capture an image of that particular feature. In response to capturing such an image, the smart phone may in some embodiments operate to cause data corresponding to that image to be stored in one or more data stores in the phone.

Alternatively, in other embodiments the software instructions included in the smart phone may operate to store data aspects or digests (such as a hash, digital fingerprint or other data) corresponding to the image, which are useable to verify the authenticity of a future such image of the user's selected feature. Alternatively, if the user were to provide an input selection corresponding to body art, the user is prompted to select an image of a piercing or tattoo which they may have. The user may then make a selection and use the camera on the phone to capture an image of that selected item. An image or a digest thereof will be stored. Likewise, a user who has selected to capture an image of an article may be prompted to select an article such as a driver's license, identification card, item of jewelry, or other article that they expect to always have with them when authenticating themselves to the machine. Again, the user would be prompted to capture an image of the particular article and data corresponding thereto stored in the data store.

Alternatively, if the user were to select items in a sound category, the software instructions included on the smart phone may prompt a user to select items such as voice recognition, a pass phrase, or other sound. If the user selected voice recognition, they would be prompted to speak their name or some other phrase from which voice characteristics can be recognized. Data corresponding to the audio signals would then be stored through operation of at least one processor in the smart phone in a suitable data store. Alternatively, the user may select a pass phrase. This may be a phrase that is known only to the user. The pass phrase spoken by the use, in exemplary embodiments, may not be converted to a suitable format, such as via speech to text and data corresponding thereto stored in a at least one data store through operation of software included in the smart phone. Alternatively, the user may select other identifying sounds. This might include for example, unusual items such as a bird call or other sound the user is capable of making and the user feels will distinguish them from other persons. Data corresponding to the audible signals associated with the sound may be stored in one or more data stores.

In some example embodiments, the executable instructions in the smart phone may prompt the user to select a particular signal type as an identifying factor. This might include for example, signals that a user can retrieve from an article that the user is likely to have present when authenticating themselves for purposes of a transaction. Such signals might include for example, wireless signals that are generated by credit or debit cards or identification cards. These can include for example, RFID signals or NFC signals that are generated by the card. Alternatively, such signals may include signals that can be generated from an article such as a token with access to particular facilities or features. Alternatively or in addition, selectable signal types may include internal signals that are capable of being generated by a user's smart phone or other device. This might include for example, data corresponding to one or more values that can be resolved based on a digital certificate or other item that is resident in the phone and that can be used to generate a generally unique authenticating value. Of course, other types of signals may be selected via user input to the smart phone.

Finally, in connection with some example embodiments, the user may also provide one or more inputs to select key type inputs as authenticating factors. This may include alpha-numerical values or values corresponding to other symbols that can be selected through a key pad or via icons on a touch screen. The user can choose to input one or several different values that can be keyed in and used as one or more identifying factors for purposes of the application. Data corresponding to such selected values is stored in at least one data store.

In some exemplary embodiments, the user may also establish through operation of the application on the smart phone, a series of prompts that will guide them through inputting the authenticating factors that will then correspond to what they have selected. This might include allowing the user to establish a series of output prompts that will guide the user through the series authenticating factors they have selected. These prompts may include reminders or questions that remind the user of each of the factors and the sequence of factors that are required to be input through the smart phone in order to provide all the authenticating factors. For example, if the user has selected an image of body art as an authenticating factor, the user may input and store the phrase "my favorite tattoo" as a prompt to remind them that that is one of their factors. Likewise, if they have chosen an image of a particular credit card as an authenticating factor, they may input and store a prompt such as "my oldest credit card". Likewise, if the user has selected a numerical prompt that corresponds to a home address, the user might input and store a prompt such as "the street address of grandma's house". Of course, these are merely examples and the user could include a prompt for each authentication factor they have chosen to use.

In some example embodiments, while selecting factors during set up the user may be required to input a prompt and provide an input to cause it to be stored each time they select a given authentication factor. In this way, the user will not forget the authentication factors, or confuse the order in which they are required to be later input. The application may also require that the user have at least a minimum number of identifying factors (for example, three). The application could also limit the number to, for example, no more that a given number (for example, six). Of course, the approach is exemplary and in other embodiments other approaches may be used.

Responsive to operation of the executable instructions operating in the smart phone or similar device, a processor in the phone may operate to store data corresponding to the selected authentication factors, and any associated prompts in memory in the device.

In the exemplary embodiment, when the user chooses to implement these features when they operate the automated banking machine using their traditional card and PIN, the automated banking machine can offer the user a selection which corresponds to the opportunity to conduct future transactions using their smart phone or other wireless device as previously discussed. If the user provides an input selecting this option and their card and PIN data has been authenticated as valid, the machine may operate in accordance with its programming to communicate with the smart phone to collect the stored data corresponding to such of the different authenticating factors the user has selected. The automated banking machine may then operate in accordance with its programming to cause data corresponding to the authenticating data to be stored in at least one data store in the remote mobile banking server or other suitable computer. Once stored on the remote server, some embodiments may operate to cause the data corresponding to the authenticating factors, other than the prompts to be erased from the memory of the smart phone. The mobile banking server may then operate in accordance with its programming to correlate this data, or results, digests or other data resolved using the authenticating factors, with the user's account and/or PIN numbers.

The correlation of the data that corresponds to these authenticating factors and the user's traditional transaction data, then enables the user to carry out transactions through communications via their smart phone with the banking system by first inputting or otherwise providing these authenticating factors to the smart phone. The smart phone can then transmit the currently input data corresponding to the selected authenticating factors to the mobile banking server. The current data received can then be compared with the stored data, and if the input factors correspond or otherwise have a predetermined relationship with what is stored in the at least one data store, the user is then enabled to carry transactions via their mobile device with the banking system in a manner like that previously discussed. Of course, it should be understood that these approaches are exemplary and in other embodiments other approaches may be used.

Further, in some exemplary embodiments, the user may be provided with the capability to periodically change the authenticating factors corresponding to their card and/or PIN number. This may be done, for example, when a user conducts a transaction at an automated banking machine. The machine may include in a manner similar to the mobile device registration option, another option which enables the user to modify their authorization data. Thus the user, once proven to be an authorized user to the machine through input of their card and PIN data, may cause the authorization data stored in connection with the mobile banking server or other server to be changed to new authorization data that corresponds to new authenticating factors such as a phrase, pass code and other suitable factors. Thus if the user were concerned that their authenticating factor data has been intercepted, or if the user is concerned because they have lost their phone, the user may provide inputs through the machine interface to change the authenticating factors.

Alternatively or in addition, the user interface of the machine may operate to enable users to provide inputs that immediately discontinue the ability of the mobile device to operate to conduct transactions. This may be provided through the machine being configured to provide outputs as part of the user interface that enables the user who has been properly authenticated via card and PIN data, to discontinue the capability to conduct transactions via their mobile phone.

Other example arrangement may enable a smart phone or other mobile device that has been set up for wireless operation with a transaction network, to further conduct cash dispensing transactions or other transactions that require the exchange of tangible items with an automated banking machine. This may be done for example, by enabling the smart phone to communicate data which indicates that the smart phone is adjacent to an automated banking machine and is in a position to conduct a transaction therewith. This might be done in some embodiments using the principles discussed in U.S. Pat. No. 8,240,556, the disclosure of which is incorporated herein by reference in its entirety. Alternatively, in some example embodiments, an automated banking machine may operate to provide a user with options to utilize the authorization data associated with their mobile device to identify themselves to the banking system and receive cash or other items of value from the automated banking machine.

For example, FIG. 33 shows an example of an output screen from an automated banking machine that includes the capability of the operator of a mobile device to receive cash. Screen 570 is output through the display of an automated banking machine that may dispense cash to users based on input of card data and appropriate corresponding PIN data. Screen 570 however, also presents a selection that enables the user to conduct a transaction without inputting a card, but rather by selecting a cardless transaction. This may be done for example, by selecting a particular area as indicated on a touch screen, or providing an input through a key or other input device. In order to utilize this option in the exemplary embodiment, the user would need to have a mobile wireless device such as device 572, which is a smart phone. The smart phone would include a corresponding application of the type previously discussed for enabling the user to conduct transactions with the banking network.

Responsive to the receipt of input selecting a cardless transaction, the banking machine may operate in accordance with its programming to output visible indicia, which enables the input of authentication data to the banking system from the mobile wireless device. As shown in FIG. 34, the indicia in this example embodiment includes indicia in the form of a two dimensional bar code. This is represented in a screen 574. The two-dimensional bar code may include various types of data. For example, it may correspond to a particular transaction identifier that is to be associated with this particular user transaction. Alternatively or in addition, the indicia may correspond to the particular automated banking machine at which the transaction is to be conducted. The output indicia may also include security values or other values that are useful in carrying out the transaction. In some example embodiments, the indicia may be generated responsive to operation of one or more computers of the automated banking machine. Alternatively, the automated banking machine may receive all or a portion of the data represented by the indicia from a remote server, such as the host or banking transaction computer.

Figure 35:
FIG. 35 is a schematic representation of a mobile wireless device capturing data from a screen output from an automated banking machine.

In the example embodiment, responsive to screen 574, the user may operate a smart phone 572 and the application thereon to capture an image of the indicia output through the screen. This is represented by FIG. 35. The application in the user's smart phone may then operate to resolve and utilize data corresponding to the indicia for purposes of carrying out a user transaction.

In some example embodiments, the receipt of the indicia may cause the smart phone application to request authorization data. This may be done for example, by the smart phone application instructing the user to input the authenticating factors at the time of the transaction. Alternatively, in some embodiments the application operating on the smart phone may enable the user to input and store the authenticating factor data on the phone for a set period of time, so that the user can then utilize this data immediately during the transaction. The authenticating factor data and data corresponding to at least a portion of data represented by the bar code, may then be sent through operation of the phone to the mobile banking server. In some embodiments, this may be accomplished by the phone sending such information directly. Alternatively in other embodiments, the automated banking machine may receive this data from the phone via wireless communication such as via Bluetooth or an NFC communication. In either case, communication of such data to the server that can correlate the authenticating factor data with the user's account and/or PIN number data and/or other data needed to authorize a transaction, enables the user's request for the transaction to be processed by the banking transaction computer or other computer that can authorize the transaction.

In some embodiments, it should be understood that the user can input their request for the particular amount of cash or other financial transaction desired via the smart phone user interface. This might be done for example, where the smart phone communicates directly with the remote server to deliver the authentication factor data. Alternatively in other example embodiments, the user may provide inputs through the user interface of the automated banking machine to indicate the particular type of desired transaction. For example, a cash withdrawal and the amount they wish to receive. This might be done for example, in cases where the authenticating factor data is sent through the automated banking machine. Of course, it should be understood that these approaches are exemplary and in other embodiments the user may provide the data through the smart phone interface, even when the data is going to be sent via the automated banking machine. Likewise in some embodiments, some data may be input through the automated banking machine in situations where the authentication factor data is sent directly from the cell phone to the remote server.

Further in some alternative embodiments, the user may provide authenticating factor data through the phone and other authorization data through the user interface of the automated banking machine. For example in some embodiments, the authorization data that the user has set up may be received from the phone, while the user may still be required to input a PIN through input devices on the automated banking machine. Alternatively, other inputs such as biometric input or other input can be required of the user directly through the automated banking machine user interface. This might be done for example, where the operator of the machine desires additional identifying data to verify that the dispense of cash from the machine has been properly authorized. Of course, these approaches are examples.

In the exemplary embodiment the authorization data corresponding to the authenticating factors associated with the user is received at the computer that can correlate such data with user transaction information. Such data is used by the system to compare such data to stored data and resolve data corresponding thereto, such as the user's account number data and/or the user's PIN data. In some exemplary systems the data resolved based on the authorization data may be an encrypted form of the user's card and/or PIN data. Such account and PIN data is then included in one or more messages along with data corresponding to the amount of the cash dispense or other transaction type and amount requested by the user, in one or more messages to the banking transaction computer. The computer then determines if the transaction requested is authorized based on the account and PIN data, and if so generates one or more messages responsive to the transaction being authorized. One or more messages are then utilized to cause the automated banking machine at which the user is present to complete the transaction, such as by dispensing a requested amount of cash.

This may be done in several ways, depending on the particular system. For example, in some embodiments in which the indicia output on the screen identifies the machine, authorization of the transaction may cause one or more messages to be routed to that particular machine, which causes the machine to dispense the requested amount of cash. The user can then take the cash to complete the transaction and the user's account will be charged. In alternative embodiments features may be included to assure that the user is still present at the machine where the cash dispense is made. This may be done in a manner similar to that previously discussed to assure that the transactions are authorized. These approaches may include for example, the message to indicate that the transaction is authorized being received by one or more computers, which then causes different indicia to be output from the machine. This indicia may also be in the form of a two-dimensional bar code. Alternatively, such indicia may correspond to signals such as wireless signals that can be received through operation of a smart phone.

The smart phone may then be used to image this indicia or otherwise process this data. The smart phone may operate to cause this data or data that is a function thereof to be transmitted to the mobile banking server or other remote computer. In response to receiving the data corresponding to the indicia that was output from the machine, the machine may then receive signals from the remote server that cause it to operate to dispense the requested cash. In this way, it is assured that that the user who requested the transaction is still present at the machine as the transaction is completed.

Alternatively in other embodiments, the messages identifying authorization of the transaction by the banking computer may be received by one or more computers that cause one or more messages to be sent to the user's smart phone. The data included in messages sent to the user's smart phone, may cause the smart phone in some example embodiments to output indicia from the smart phone. This may include for example, another two-dimensional bar code output through the display on the phone or other indicia that can be read through operation of a reader such as a bar code reader or wireless port on the machine. The machine may then operate to read this indicia from the display of the smart phone or receive it through the port. The phone may analyze this data or send data corresponding thereto to the remote computer to verify that the data that the machine has received corresponds to the data that was sent to the phone of the user that requested the transaction. Responsive to this determination, the automated banking machine may operate to dispense the cash requested in the transaction.

Alternatively in other embodiments, the one or more messages sent to the smart phone may include data, such as data which can be output from the phone received wirelessly such as via NFC communication, by the automated banking machine. The communications may include values that correspond to data in messages that were sent to the user's phone so that the presence of the user's phone at the machine can then be authenticated. Responsive to such authentication, the machine may then operate to dispense the requested cash, or otherwise complete the requested transaction.

It should be understood in some example embodiments the determination of whether data received by the phone is appropriate for allowing the transaction to proceed may occur at computers located remotely from the automated banking machine. Alternatively, such determinations may be made at a computer located at or in the proximity to the automated banking machine, which includes software instructions suitable for authenticating the particular data that is received as genuine. Of course, it should be understood that these approaches are exemplary and in other embodiments other approaches may be used.

It should be understood that while the exemplary transactions have been discussed in connection with dispensing cash, other types of transactions may also be conducted through use of a smart phone or other mobile wireless device application that can be operated in connection with an automated banking machine. Such transactions might include a user receiving paper or electronic checks through operation of the automated banking machine. Alternatively or in addition, such transactions may include the receipt of items such as phone cards, tickets or other tangible items that can be paid for and dispense through operation of the banking machine. Alternatively or in addition, transactions in which the automated banking machine receives cash and credits a user's account can be conducted in a manner using cardless transactions carried out through use of the authorization data which is received through the mobile wireless device such as the smart phone.

It should further be understood that although the transactions that have been described may involve the exchange of tangible items with an automated banking machine, transactions may also be carried out that may involve the use of intangible items. These may include for example, transactions which operate to cause the smart phone to receive data corresponding to credit value stored in a digital wallet associated therewith through communication of messages with the automated banking machine. This might be done for example in a transaction in which the user supplies cash to the machine and receives the credit to their digital wallet. It may also involve a transfer of value from the user's account to their digital wallet on the phone or stored in a cloud system. Alternatively, the user may operate to carry out transactions that provide other data which can be used for things of value, such as additional phone service, electronic access tokens, or providing access to certain facilities, events or other things.

Thus in some example embodiments, the user may be able to use their portable wireless device to carry out transactions which do not involve exchanges of tangible items or other items from an automated banking machine in remote locations, wherever the user happens to be. Further, the user may operate their mobile wireless device in a similar manner adjacent to an automated banking machine to receive cash or other items from the machine without the use of a banking card or other data, as might otherwise be required for operation of the machine.

Figure 36:
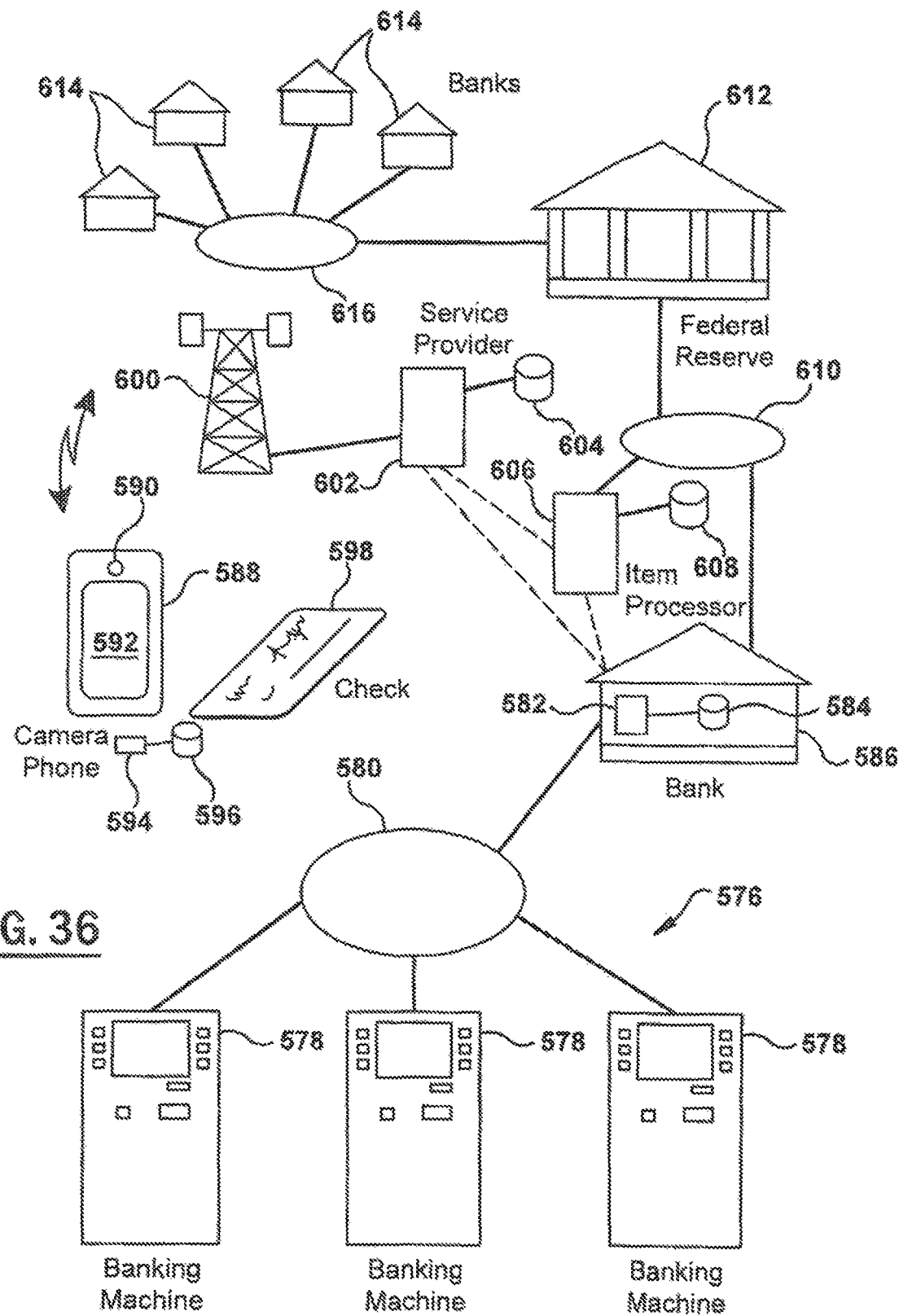
FIG. 36 is a schematic view of an alternative embodiment of an automated banking machine system.

FIG. 36 shows an alternative embodiment of a transaction system schematically indicated 576. System 576 includes a plurality of automated banking machines 578. Automated banking machines 578 may include, for example, output devices such as a display, audio output devices, haptics devices or other types of devices that can output human perceivable outputs. The exemplary automated banking machine may also include input devices. Such input devices may include function keys, a keypad, a touch screen, a card reader, a bar code scanner, a wireless port or other devices which are capable of receiving manual inputs or other types of inputs from users or devices operated by machine users.

In the exemplary embodiment, the automated banking machines 578 are operative to dispense cash to users. Cash is dispensed to users in responsive at least in part to user identifying data that is input by a user corresponding to an authorized financial account. Cash is dispensed responsive at least in part to the account data indicating the account includes sufficient funds in an amount being requested by a user at the machine. The machine operates to cause the user's account to be assessed for funds dispensed. Each of the automated banking machines has at least one computer (alternatively referred to as a processor herein) associated therewith. The automated banking machines 578 of the exemplary embodiment do not include a check imager. For purposes of this disclosure a check imager includes a device that is operative to scan a check of a user, that a user wishes to deposit in the machine to deposit in their account and/or redeem for cash. It should be understood, however, that the principles described herein may also be used in conjunction with automated banking machines that do accept check imagers.

In the exemplary embodiment each of the automated banking machines 578 is connected in a network 580. Network 580 of the exemplary embodiment may be a private network, public network, virtual private network or other suitable communications medium to enable the automated banking machines to communicate with at least one remote computer 582. In the exemplary embodiment remote computer 582 is in operative connection with at least one data store 584. As schematically indicated, computer 582 is a host computer associated with a bank or other financial institution 586. In the exemplary embodiment the automated banking machines communicate data corresponding to user and/or account identifying data through the network 580 to the host computer 582. The host computer 582 is operative to analyze the data sent from the automated banking machine and compare such information to data stored in the at least one data store 584 to determine if the data input to the machine corresponds to an authorized user and/or financial account. The host computer 582 is operative to authorize transactions responsive at least in part to such a determination.

In the exemplary embodiment the at least one host computer 582 is also operative to receive data corresponding to the transaction type and amount that a user at an automated banking machine wishes to conduct. For example if the user is requesting a cash withdrawal at the automated banking machine, the at least one host computer 582 operates to analyze data stored in the at least one data store to determine if the transaction is authorized and whether the account has sufficient funds or is associated with data that corresponds to an authorization to allow the requested transaction. Responsive to making the determination that the transaction is authorized, the at least one host computer 582 is operative to send at least one message to the automated banking machine where the user is located to cause the machine to carry out the requested transaction. In the case of automated banking machines 578, generally the user will be provided with cash dispensed from the machine. Of course if the transaction is not authorized, the at least one host computer is operative to send a message to the automated banking machine to indicate that the transaction cannot be performed. Responsive to the automated banking machine dispensing the requested cash to the user, the exemplary machines send at least one message to the host computer 582. The host computer operates responsive thereto to cause the user's account to be assessed an amount corresponding to the dispensed cash. Of course these approaches are exemplary and in other embodiments other or different transaction steps may be used.

In the exemplary system 576, users of automated banking machines 578 that do not include a check imager are nonetheless able to make check deposits into their account and/or to receive cash in exchange for such deposited checks. This is accomplished in the exemplary embodiment by authorized users being able to use portable wireless devices such as a smart phone 588 in connection with the system. The exemplary portable wireless devices (which are alternatively referred to herein as mobile devices) include a camera 590 and an output device such as a display 592. Such mobile devices include at least one processor 594 and at least one data store 596 as schematically shown.

In the exemplary embodiment the portable wireless devices 588 are enabled to capture images of checks or other instruments schematically indicated 598. The exemplary portable wireless device includes a software application resident thereon that includes computer executable instructions that cause the device to provide outputs that guide a user through certain transaction steps as hereinafter described. Those transaction steps include imaging one or both sides of a check associated with a check transaction.

In the exemplary embodiment the mobile devices are enabled to communicate wirelessly in one or more wireless networks schematically indicated 600. The mobile devices communicate check data that includes data corresponding to an image of at least one side of the check and/or other check or user related data, to at least one remote computer 602. At least one remote computer 602 is in operative connection with at least one data store 604. In the exemplary embodiment the computer 602 is operated by a service provider. The computer is operative to receive check data including check images and other data, including check images and other data from the mobile device, and to provide messages to the mobile device sending the check data, that corresponds to the check data that has been delivered to the remote computer 602. This data in exemplary embodiments may correspond to the particular check transaction being carried out by the user. The exemplary mobile device operates responsive at least in part to the data sent by the computer 602 responsive to receiving the check data, to provide at least one output. As hereinafter explained, the at least one output from the mobile device can be provided as an input to at least one input device of an automated banking machine 578 in order to accomplish a check related transaction at the machine even though the machine does not include a check imager. Although in the exemplary embodiment the at least one computer 602 that receives the check data is indicated as operated by a service provider entity, it should be understood that in some embodiments the at least one computer may be operated by the financial institution owning the automated banking machines or other financial processing entity.

In the exemplary embodiment the at least one computer 602 is in operative communication with at least one computer 606. At least one computer 606 of the exemplary embodiment is operative to perform check item processing. At least one computer 606 is in operative communication with at least one data store schematically indicated 608. It should be understood that although the at least one computer which performs item processing is shown as separate from at least one computer 602 and the at least one host computer 582, in some embodiments the functions of one or more of these computers may be combined. Further it should be understood that in some arrangements such computers may be operated by the bank or other financial institution which operates the automated banking machines or by a different banking or service provider entity. It should be understood that such computers are shown separately for purposes of this schematic description in order to facilitate understanding of the functions performed by each.

In the exemplary embodiment the item processing computer 606 is operative to receive the check data including image data from the at least one computer 602. In the exemplary embodiment the at least one computer 606 is operative to resolve data from the check image. This includes data included in the MICR (Magnetic Ink Character Recognition) line on the check as well as the amount for which the check is written. This can be accomplished using character recognition software which is applied to the check image data so as to resolve these values and data. The at least one computer 606 may also perform other functions such as assuring that the check has been signed by the maker who has written the check and/or is endorsed by the recipient of the check. Further in some exemplary embodiments the at least one computer 606 may operate to analyze the check data to determine instances of probable check fraud. This may include analyzing images for purposes of determining if a check may be a photocopy or is otherwise fraudulent. Alternatively in some embodiments it may include analyzing the maker signature and/or endorsement signature as either a genuine signature of the indicated individual or for properties which indicate that it is not a photocopy or facsimile signature. In addition, other tests may be carried out by the computer in some embodiments associated with resolving check data and/or verifying the genuineness of the check. Of course these approaches are exemplary and in other embodiments other approaches may be used.

In the exemplary embodiment the at least one item processing computer 606 is in operative connection with the at least one computer 582 which is associated with the bank or other financial institution which, in the exemplary embodiment, is operative to communicate with the automated banking machines 578. As later described in more detail, the at least one computer 602 is operative to provide data to the mobile device responsive to receipt of the check data that uniquely identifies the check data that the user has sent. This received data is operative to cause the exemplary mobile device 588 to provide at least one output which is communicated as a check related input to the automated banking machine at which the user is conducting a transaction. In the exemplary embodiment this check related input uniquely identifies the particular check transaction. In the exemplary arrangement this check related input that is received by the machine is communicated to the at least one host computer 582. This check related input that uniquely identifies the check is communicated to the at least one computer 606. Such data may also be accompanied by other data such as data that identifies the financial institution 586 as the bank of first deposit for the check. Such data may also include other transaction identifying data such as a transaction number, deposit account data or other information that can be used to identify the particular transaction in which the check was involved.

In the exemplary embodiment the at least one item processing computer 606 is configured to process check data so as to present the check data for payment. In some exemplary embodiments the at least one bank which operates the automated banking machines may also send images and data associated with checks it receives to the at least one computer 606 for processing. As later explained in greater detail, the at least one computer 606 operates to enable checks that are written on accounts held by the bank 586 to be charged against those particular accounts on which the checks are drawn and the associated amounts credited to accounts into which the checks are deposited. In addition in cases where checks that are deposited in accounts held by the bank 586 are drawn on other banks, the at least one computer 606 of the exemplary embodiment is enabled to send images and data corresponding to those checks for payment to the banks on which the checks were written. This may be done in the exemplary embodiment by communicating the check related data and check images through one or more networks 610 to the Federal Reserve system schematically indicated 612. The Federal Reserve system of the exemplary embodiment operates to forward the checks to the banks on which the respective checks were drawn schematically indicated 614. This is done through one or more networks 616. In the exemplary embodiment the Federal Reserve also operates to settle accounts between financial institutions related to amounts owed by various maker banks to banks of first deposit which hold the accounts into which the checks have been deposited by their customers.

In the exemplary embodiment the Federal Reserve bank also operates to handle the returns for any checks that are presented electronically for payment to a maker bank, and for which check payment is refused. This may include, for example, checks that are dishonored due to insufficient funds in the account on which the check is drawn. It may also include checks that have a stop payment order applied, or checks drawn on accounts that have been closed, or checks that are identified as having missing or forged maker signatures. Of course these reasons for refusing payment on a check are merely exemplary. The data associated with dishonored checks are sent through the Federal Reserve electronically to the at least one computer 606 so that the account of the person who has deposited the check in the bank of first deposit is not provided with credit for the amount of the check. In addition it should be understood that in other embodiments, entities other than or in addition to the Federal Reserve may perform these functions. This may include, for example, a private clearinghouse which performs these functions for a plurality of member banks. Further in some exemplary embodiments, some images and data for checks may be sent directly to maker banks for presentment under agreements that exist between banks or groups of banks. Further some systems may send some images and data checks directly to maker banks, for some checks through private clearinghouses and for some other checks through the Federal Reserve. Numerous different arrangements for the presentment, payment and return of checks may be utilized in various embodiments.

Figure 38:
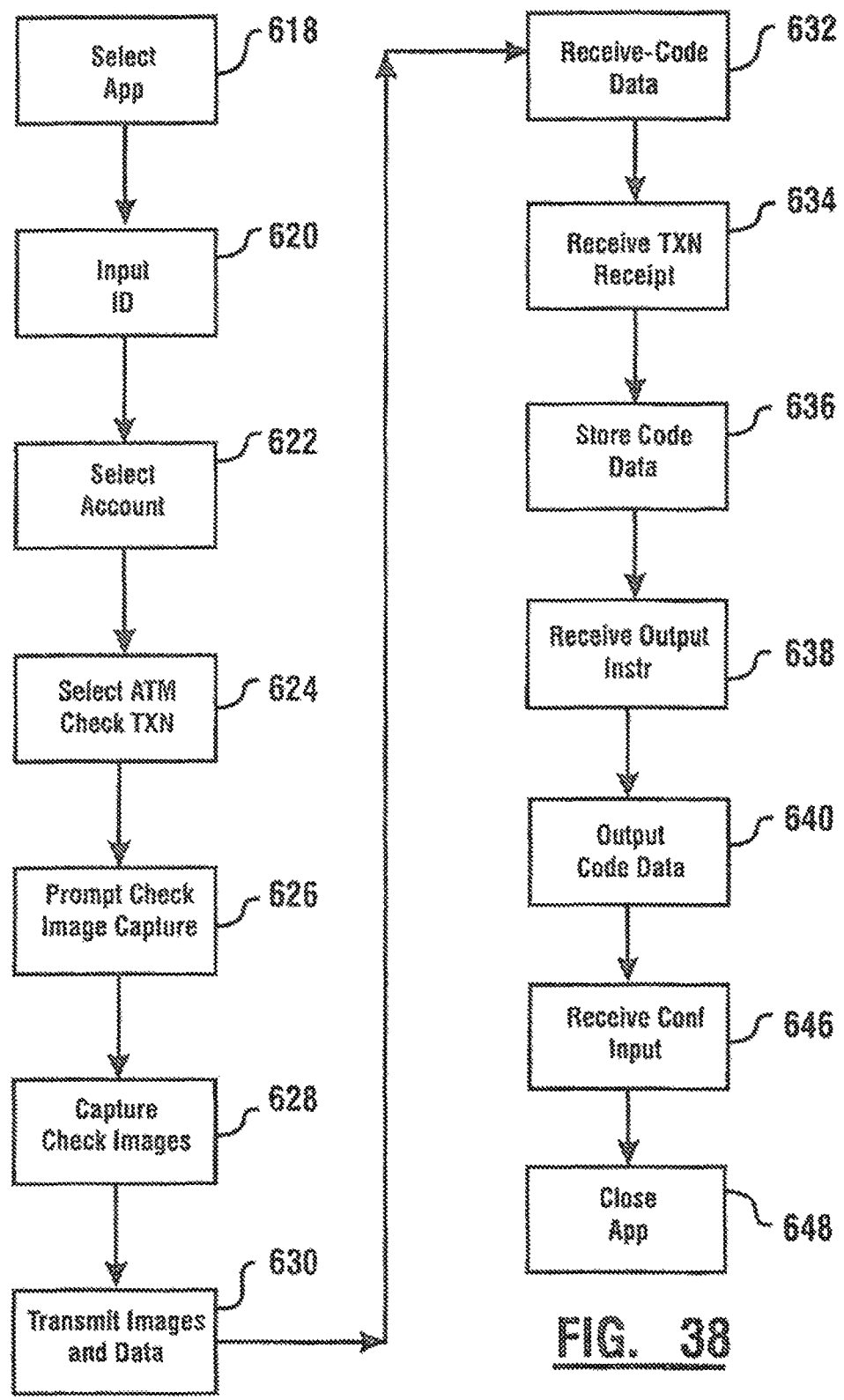
FIG. 38 is a flow chart showing a schematic logic flow carried out by a portable wireless device used in the system of FIG. 36.

The exemplary system 576 is particularly adapted for use in connection with automated banking machines that do not include a check imager, but which nonetheless enable the financial institution or other entity operating the automated banking machine to receive check based deposits. In the exemplary embodiment, the mobile devices of customers include programming that carries out the logic flow schematically indicated in FIG. 38. In the exemplary embodiment the portable wireless device includes programming included in an application which provides the ability to deposit checks into automated banking machines that do not include a check imager. Of course this approach is exemplary and other approaches may be used. As represented in FIG. 38, the user of the portable wireless device provides one or more inputs through the touch screen display 592 or other input device such as a keypad of the device to select the automated banking machine check deposit application. This is represented by a step 618. In the exemplary application, the application prompts the user to input identifying data that authenticates the user as authorized to operate the application. This is represented in a step 620.

Responsive to proper user identification inputs, the application causes an output through the display of the portable wireless device which presents the user with account selections. The account selections may correspond to numerous accounts that the user has, into which the check may be deposited. This is represented in a step 622. In addition the outputs from the phone may include the ability to conduct a check deposit transaction directly to the user's account separate and apart from an automated banking machine such as is described in the patents incorporated herein by reference. In the exemplary embodiment, the transaction selections include an automated banking machine check related transaction. Such a check transaction might be desired by a user, for example, in cases where the user wishes to receive cash for a check immediately at an automated banking machine rather than depositing their check in the account separate from an automated banking machine and then withdrawing cash at a later time when the user is adjacent to a machine. Of course these approaches are exemplary and numerous different transaction options may be provided.

As represented schematically in FIG. 38, the user may select an automated banking machine check transaction through one or more inputs through an input device on the portable wireless device. This is represented in a step 624. Responsive to this selection, the exemplary application is operative to provide outputs through the display of the portable wireless device that prompts the user to capture images from one and/or both sides of the check. The outputs may further instruct a user to carry out other steps or to provide other inputs as well. This is represented in a step 626.

The portable wireless device operates to capture the images of one or both sides of the check through operation of the camera 590. The capturing of the check image data is represented by step 628. In the exemplary embodiment, the application then operates to cause the check data which includes the one or more check images and/or other data which is associated with the check images, such as for example account data, check amount or other items, to be transmitted through the wireless network 600 to the at least one computer 602. This is represented in FIG. 38 by step 630. In response at least in part to the receipt of the check data, the at least one computer 602 is operative to send to the portable wireless device at least one message which includes data related to the check related transaction in which the check is submitted to the at least one server. These received messages include data which correspond to at least one check related input which will be provided by the user to the automated banking machine in a manner hereinafter discussed. For purposes of this disclosure, the data that is received by the portable wireless device from the at least one computer 602 is described as a code or code data. However, it should be understood that such code data may include any manner of data which is usable to identify the particular check, the images for which are uploaded from the mobile wireless device to the at least one computer 602 in connection with the check related transaction. This is represented schematically in FIG. 38 by step 632.

In the exemplary embodiment the at least one computer 602 is also operative to send to the portable wireless device, data which corresponds to a receipt for the check related transaction. The receipt of this additional data can be used by the user to establish or prove that they transmitted the particular check to the at least one computer 602, is represented by a step 634.

In the exemplary embodiment the portable wireless device is operative to store in the at least one data store of the device, the data corresponding to the code data, which is used to provide at least one output from the portable wireless device that is received as at least one input to the automated banking machine. In exemplary embodiments the storage of this data may be maintained by the portable wireless device for an extended period of time until the user is ready to conduct the related transaction at the automated banking machine. Thus, the application may enable the user to close the application at this stage and perform other activities through their portable wireless device until they are ready to complete the transaction at the automated banking machine. The application may be structured for example, to enable the user to restart the application and recover this data so as to recover the data from the at least one data store that corresponds to the particular check that has been sent to the at least one computer 602. Of course it should be understood that this approach is exemplary and in other embodiments, the application may be structured so that the user scans the check with the phone while at the automated banking machine, and there is no significant delay between when the data received from the at least one computer 602 is stored in the portable wireless device and when the user outputs such data for purposes of providing at least one check related input to the automated banking machine. Variations on these approaches will be apparent to those skilled in the art from the teachings herein.

Figure 39:
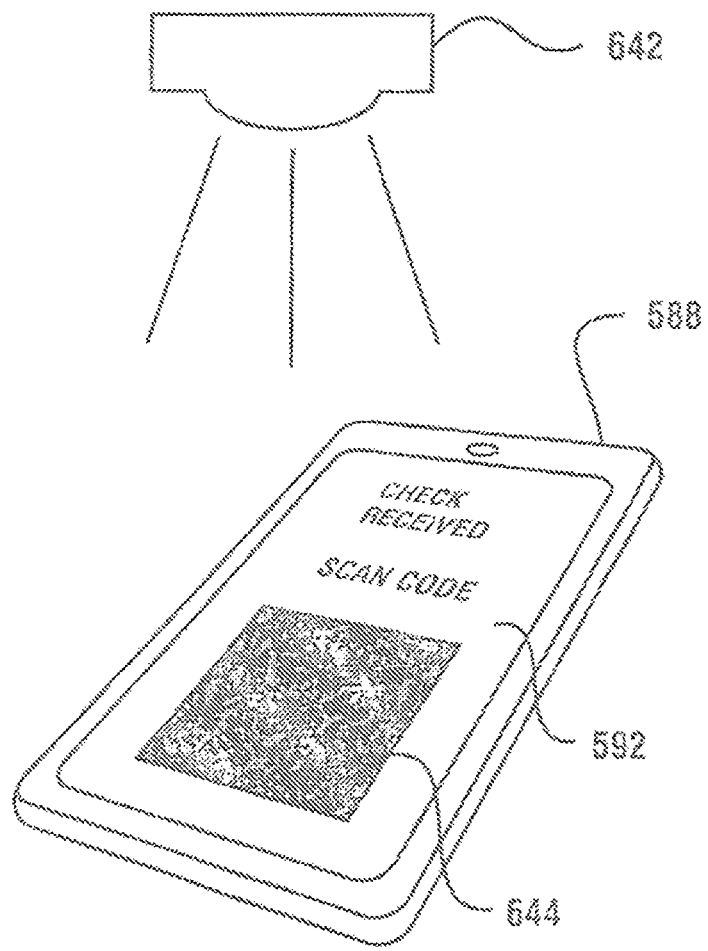
FIG. 39 is an isometric view of a portable wireless device providing an exemplary output that is received by an input device associated with an automated banking machine in the system shown in FIG. 36.

In the exemplary application, the user either in proximity to when the data is received from the at least one computer 602, or at sometime thereafter, provides at least one input to an input device of the mobile device which comprises an instruction to the portable wireless device to provide at least one output based on the received data. This is represented in a step 638. Responsive to receiving the instruction to provide the output in step 638, the portable wireless device is then operative to provide at least one output as represented in step 640. This at least one output corresponds to at least one check related input that is provided to at least one input device on the automated banking machine. For example, in some exemplary embodiments, the output may include a numeric or alphanumeric code that can be visually perceived by a user and then input through a keypad (either a physical keypad or a touch screen display keypad) on an automated banking machine. In other example embodiments, the output may include data that produces a two-dimensional bar code that can be received as a check related input by a bar code reader on the automated banking machine. This is represented in FIG. 39 which demonstrates a bar code scanner 642 associated with an automated banking machine reading output indicia in the form of a two-dimensional bar code 644 from the display 592 of the portable wireless device. In still other exemplary embodiments the output data may be provided via wireless signals such as RF signals that are received through a wireless port of the automated banking machine. Of course other approaches may be used to provide outputs from the portable wireless device that constitute at least one check related input that is received through operation of at least one input device on the automated banking machine.

In the exemplary application the portable wireless device receives at least one confirmation input that indicates that the at least one output has been delivered as at least one check related input to the automated banking machine. This is represented by a step 646. As can be appreciated, the confirmation input may depend on the particular type of output from the portable wireless device that is received as a check related input. For example in cases where the output is an alphanumeric code which is manually input by a user to the automated banking machine, the confirmation input may include a manual input to the portable wireless device. Alternatively, in cases where the output is delivered either through a bar code scanner or through a wireless port, the portable wireless device may receive a confirmation input via wireless communication from the automated banking machine. Such confirmation input may include RF or IR inputs which indicate that the output has been received and has been resolved through operation of at least one computer of the machine. Of course these approaches are exemplary and in other embodiments other approaches may be used.

Once the at least one output from the portable wireless device has been received by the automated banking machine as at least one check related input, the user may then close the application on the mobile device. This is represented by a step 648. Of course it should be understood that the logic shown is schematic and is exemplary of logic that may be executed by the portable wireless device in connection with check related transactions. Other exemplary embodiments may include additional or different steps so as to achieve similar functions.

Figure 37:
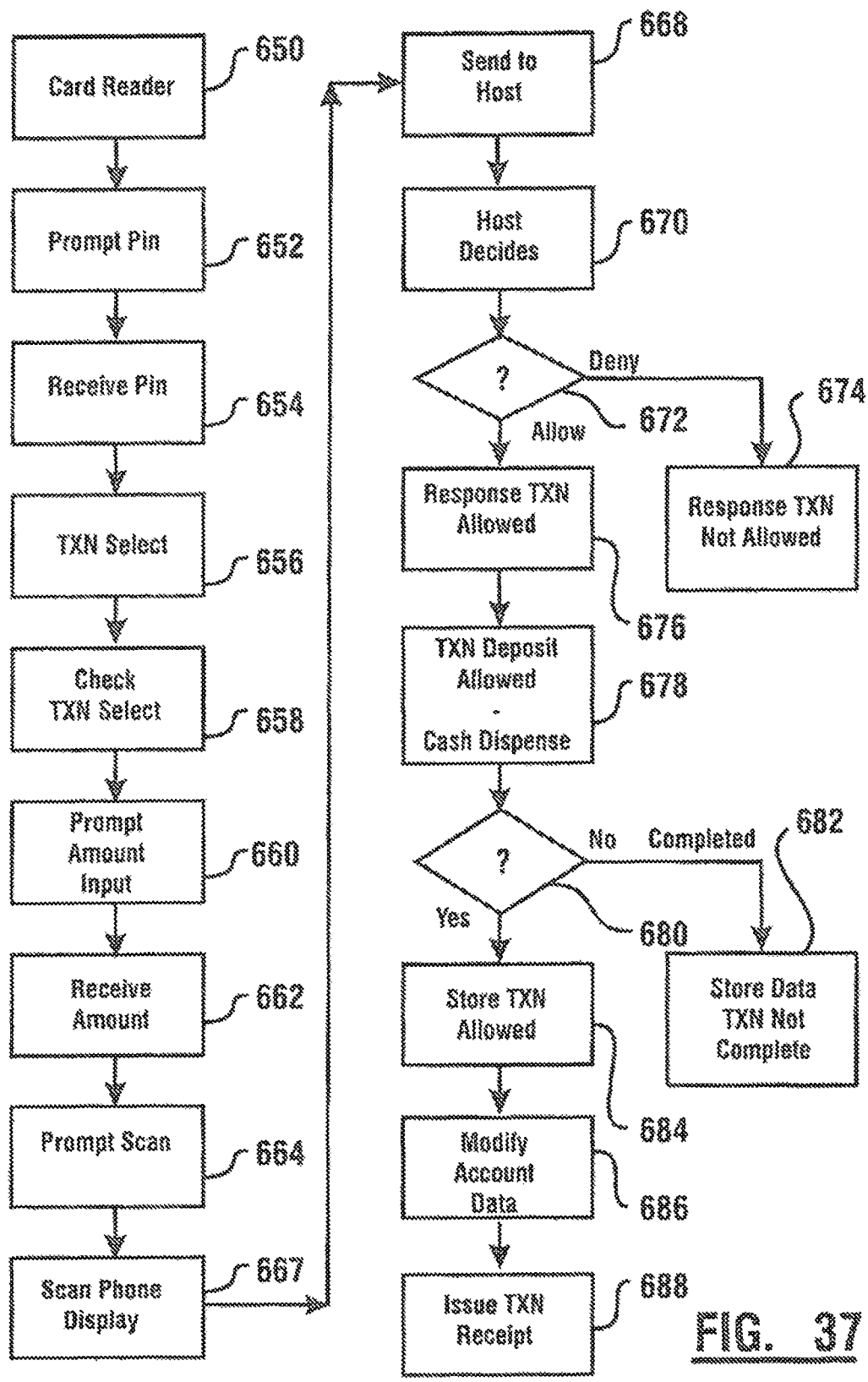
FIG. 37 is a flow chart that schematically shows logic carried out in connection with an exemplary automated banking machine of the system shown in FIG. 36.

FIG. 37 shows schematically steps carried out in connection with an automated banking machine of an exemplary embodiment. The schematic logic flow is associated with the automated banking machine carrying out a check deposit and/or a check cashing transaction but the machine does not include a check imager.

The logic flow begins with a step 650 in which user and/or account identifying data is read from a card through operation of a card reader. It should be understood while in the exemplary embodiment a data bearing record such as a card is used, other types of readers and identifying inputs to identify a user and/or their financial account may be used in other embodiments.

In response to reading the card data, at least one computer associated with the machine operates to prompt a user to input a personal identification number (PIN). The prompt is provided through a display on the automated banking machine. This is represented by a step 652. The automated banking machine receives the user PIN input through a keypad touch screen or other suitable input device. This is represented by a step 654. The at least one processor that transaction. This may be done via a display or other output device. It should be understood that numerous types of transactions may be offered to a user. These may include, for example, a cash dispensing transaction, a balance inquiry transaction, a transaction to transfer funds between accounts, a transaction to load value to a digital wallet or other types of transactions in addition to check related transactions. Further in exemplary embodiments, more than one check related transactions may be offered. For example the user may be prompted to select between a check cashing transaction and a check deposit transaction. The types of transactions offered will depend on the desires of the machine owner and the programming of the computer associated with operation of the machine. As represented by a step 658, for purposes of this example the user provides at least one input through at least one input device to select a check related transaction.

In the exemplary embodiment, the user is next prompted through an output via an output device to input an amount associated with the check. This is represented in a step 660. In response to the prompt, the user inputs the check amount through at least one input device on the automated banking machine. This is represented by a step 662. It should be understood that in exemplary embodiments manual input devices such as a keypad or a touch screen display with virtual keys may be used for this purpose. Alternatively in other embodiments a check amount may be received through an input device on the automated banking machine from the mobile wireless device such as via a wireless port. This might occur, for example, when the check amount has been input to the portable wireless device in connection with sending the check data to the remote computer 602. In other embodiments the amount of the check may be resolved or confirmed through operation of the at least one computer 602, and the data sent to the mobile device and included with the other check related data. In such embodiments the portable wireless device may communicate the check amount data via NFC, IR, Bluetooth or other wireless communications, for example. In the exemplary embodiment the automated banking machine provides at least one output that prompts the user to provide a check related input.

In this exemplary embodiment the at least one computer associated with the machine provides an output that prompts a user to scan a two-dimensional bar code output from their portable wireless device. This is represented in a step 664. In response to receiving this prompt, the user may operate the portable wireless device in the manner previously described in connection with step 638 to provide one or more inputs which cause the portable wireless device to output the two-dimensional bar code that corresponds to the check related data received from computer 602. When the output from the portable wireless device is provided in accordance with step 640 of FIG. 38, the automated banking machine operates in a step 667 to read the data output from the display of the portable wireless device. This scanned display data includes at least one check related input that uniquely corresponds to the particular check transaction in which the user's check was sent to the remote computer 602.

The automated banking machine of the exemplary embodiment that operates in accordance with its programming to send data corresponding to the check related input to the at least one host computer 582. This is represented by step 668. Thereafter in a step 670, the host computer 582 determines if the card and PIN data corresponds to an authorized user, and whether the authorized user is permitted to conduct a check transaction in the amount indicated as associated with the check on their account. This determination which is made by the at least one computer 582 is done responsive to the data stored in the at least one data store 584. This determination is represented in FIG. 37 by a step 670.

The at least one host computer 582 determines whether to allow the transaction or deny the transaction. This is represented by a step 672. If the transaction is denied, one or more messages are sent by the at least one computer 582 to the computer associated with the automated banking machine which indicates to the user that the transaction is not authorized. This is represented in a step 674.

If the transaction is allowed, the at least one computer 582 operates to send one or more messages to the computer associated with the automated banking machine indicative that the transaction is allowed. This is represented in a step 676. For example if the transaction requested is a check deposit to the user's account, the user may receive outputs through the display of the machine which indicates that a value corresponding to the amount of the check has been added to their account.

Alternatively in other embodiments where a user has requested a check cashing transaction, further messages may be exchanged with the automated banking machine. For example in some embodiments the messages may cause operation of the cash dispenser to dispense cash to a user corresponding to the amount of the check. Further in still other embodiments depending on the nature of the system, the automated banking machine may treat a check cashing transaction as two separate transactions. One of these may involve a deposit of the check to the user's account, and a separate transaction thereafter which represents a cash withdrawal from the account. In that case the automated banking machine may receive the one or more messages indicating that the amount of the check has been deposited to the user's account, and may thereafter operate in accordance with the programming of its associated computer to cause messages to be sent to the at least one computer 582 requesting a cash dispense in an amount corresponding to the amount of the check. Such messages may include the card and PIN data previously input, as well as data indicating that the user is to receive cash as a withdrawal from their account in an amount having a relationship to the check. These messages may be generated automatically through operation of the machine associated computer, and sent to the at least one host computer 582 which verifies the user and account identifying data and sends messages in the automated banking machine associated computer indicative that the transaction is authorized. This may include messages that cause the cash dispenser to dispense cash to the user. These steps associated with the particular check transaction type carried out through operation of the automated banking machine are represented by a step 678.

It should be understood that in some embodiments the automated banking machine may operate in accordance with its programming to facilitate check cashing transactions in circumstances where the amount of the check does not correspond to an exact amount that the machine may dispense. For example some automated banking machines may dispense several denominations of bills, the smallest of which may be a five dollar bill. In such cases the automated banking machine may operate to round the check amount either up or down (depending on the programming of the computer associated with the machine) to the nearest value that the machine can dispense based on the bill denominations that are available. In this case it would be an amount that is divisible by five. Further in some embodiments the automated banking machine may only dispense one denomination of bills such as twenty dollar bills. In such embodiments the programming associated with the automated banking machine associated computer may round up or down to the nearest amount divisible by twenty. In such exemplary embodiments when cash in excess of the amount of the check is dispensed, the additional amount is charged to the user's account through operation of at least one computer 582. Likewise when an amount of cash less than the amount of the check is dispensed, the excess value of the check is credited to the user's account. Of course it should be understood that in some embodiments automated banking machines may be operative to cash checks to the penny. This may include machines that have coin and bill dispensers that can dispense coin in multiple denominations and bill dispensers that can dispense bills in multiple denominations. The principles described may also be used with such machines. However, the approaches described may be more likely to provide benefit in connection with automated banking machines that are set up for primarily cash dispensing operations, and then do not dispense coin or a large variety of bill denominations.

Returning to the exemplary transaction flow represented in FIG. 37, at least one computer processor associated with the automated banking machine carries out a step 680 in which a determination is made whether the automated banking machine could carry out the functions necessary to complete the transaction. In the case of a check cashing transaction, this may include determining whether the appropriate amount of cash could be dispensed through operation of the cash dispenser. In the case of a check deposit transaction to the user's account, this may include notifying the user of the deposit and providing them with a receipt. Of course the nature of the steps to complete the transaction will depend on the exact transaction type. If the automated banking machine could not operate to complete the transaction, the automated banking machine sends one or more messages to the one or more computers 582 to indicate that the transaction could not be completed. This is represented in a step 682. In this case the at least one computer 582 stores data concerning the transaction including the fact that a check has been sent from the phone to a check processor so that the transaction can be reconciled. Such reconciliation may include, for example, computer or manual intervention to recover the check data and be sure that the amount of the check is added to the user's account if the check is valid and paid when presented to the maker bank. Of course these approaches are exemplary and in other embodiments other approaches may be used.

If the automated banking machine was able to successfully carry out the functions necessary to complete the transaction, one or more messages are sent to the computer 582 indicating that the transaction was completed. The messages from the automated banking machine associated computer are operative to cause the at least one computer 582 to store the transaction related data. Such check related data will generally include the check related input data, check amount and other data related to the transaction so as to facilitate recognizing the check and completing the check payment process. The storing of this data is represented in a step 684. In addition, in the exemplary embodiment the at least one remote computer 582 is operative to modify the data stored in the at least one data store 584 to modify the user's account associated data in accordance with the transaction conducted. This is represented in a step 686. This may include, for example, in the case of a check deposit transaction, granting in connection with the user's account a provisional credit for the amount of the check as a deposit to the account. This provisional credit will correspond to an amount added to the user's account if the check is not dishonored upon presentment. Likewise embodiments where a check transaction involves a check deposit to the account and a cash withdrawal associated with a cash dispense, the account is provisionally credited for the amount of the check and assessed for the amount of the cash withdrawal. Of course these approaches are exemplary and are dependent on the particular nature of the transaction conducted.

Further in the exemplary embodiment the at least one computer (alternatively referred to herein as at least one processor) associated with the automated banking machine operates in accordance with its programming to issue to the user a transaction receipt. Such a transaction receipt may include the details of the transaction conducted. In some embodiments it may be issued to the user on paper, through operation of a printer in the automated banking machine. In other embodiments the transaction receipt may alternatively or additionally be issued electronically to the user's portable wireless device. Alternatively or in addition, the transaction receipt data may also be sent to other systems such as a home banking system or other system associated with the user. This is represented by a step 688.

Although in this previously described embodiment the at least one check related input provided to the automated banking machine includes visible indicia that can be scanned through operation of a scanning device, in other alternative embodiments the at least one check related input may include other types of inputs provided through at least one input device of the automated banking machine. For example in some embodiments the messages communicated by the at least one computer 602 to the mobile device may result in the mobile device receiving at least one code that can be visibly output to a user through a display of the mobile device. This particular output which corresponds to the particular check transaction may then be provided as at least one check related input through a manual input device on the automated banking machine. Thus for example an alphanumeric code may be input to the machine via a keypad, touch screen, voice recognition or other suitable device. This at least one check related input may then be utilized in a manner like that previously discussed for purposes of correlating the check data sent from the mobile device to the at least one computer 602 and the at least one computer 606 with the data corresponding to the automated banking machine transaction.

Further in other exemplary embodiments, the at least one check related input provided by the mobile device may include a wireless input such as an IR input or an RF input such as a Bluetooth or NFC type input. This at least one check related input may be sent from the mobile device to an input device including a wireless port on the automated banking machine. The data communicated from the mobile device to the wireless port again may serve the function of identifying the check data. Of course it should be understood that these approaches are exemplary and in other embodiments other types of check related inputs may be used.

As can be appreciated from FIG. 36, upon completion of the automated banking machine transaction, data corresponding to the transaction including the at least one check related input received by the automated banking machine is stored in the at least one data store 584 associated with at least one computer 582. In exemplary embodiments the data stored in association with the at least one check related input may include the indicated check amount, the account data associated with the individual providing the check, a transaction identifier generated through operation of the at least one computer 582 and/or the automated banking machine and/or other associated transaction data. In the exemplary embodiment the data which identifies the transaction and data corresponding to the at least one check input is communicated from the at least one computer 582 to the at least one computer 606 which performs item processing. Of course as previously discussed, in addition to check related transaction data received through automated banking machines the processor may perform other functions for the bank 586 such as processing other checks as check images that are received by the bank as the bank of first deposit.

In the exemplary embodiment the at least one computer 606 operated in connection with the item processing activity receives the check data and data corresponding to the at least one check data input from the at least one computer 602. The data corresponding to the at least one check related input that was sent by the at least computer 602 to the mobile device, corresponds or otherwise has a predetermined relationship with the at least one check related input that was received in connection with the check transaction through the automated banking machine. By correlating the data corresponding to the at least one check related input, the at least one computer 606 is able to identify the particular check data, including the check and/or images that correspond to the particular check involved in the transaction. Responsive to this information, the at least one computer 606 is able to analyze the check data to determine if the amount of the check as indicated by the user input during the automated banking machine transaction corresponds to the amount written on the check. In the event that the amount of the check was entered at the automated banking machine incorrectly, steps are taken responsive to operation of the at least one computer 606 to indicate an anomaly and to take appropriate action so as to correct the any errors. This may include, for example, providing for further automated or manual review of the check images so as to determine the correct check amount. Alternatively and/or in addition, such corrective actions may include crediting or debiting the individual's account who conducted the transaction at the automated banking machine so as to adjust for the correct amount on the check. Of course the steps taken will depend on the capabilities of the particular system and the type of anomaly which is detected through operation of the computer 606 or other operations of the system.

In the exemplary embodiment the at least one computer 606 is operative to determine the bank and account number associated with the particular check. As previously mentioned this is determined from data that is included on the MICR line of the check. If the computer 606 determines that the check is drawn on an account that is held by the bank of first deposit for the check transaction which in this case is bank 586, the at least one computer 606 operates to generate a record to indicate that the particular check is drawn on the bank of first deposit. In the exemplary embodiment the at least one computer 606 is operative to also generate records indicating the nature of the financial transfer including the account from which the funds represented by the check are to be withdrawn and the transaction and/or account to which the funds represented by the check are to be deposited. In such cases the account for deposit may be based on account number data sent by the at least one computer 582 to the at least one computer 606. Alternatively in other embodiments the account to be credited for the amount of the check can be represented by other data such as the at least one check related input or other transaction identifier utilized in connection with the particular transaction. In some exemplary embodiments the transaction data related to the check that is drawn on the bank 586 may be sent promptly to one or more computers at the bank 586. Alternatively in other embodiments the check related data may be accumulated with other data from multiple checks associated with automated banking machine transactions that are drawn on the bank as the bank of first deposit. This data may be sent as an accounting file or other file to the bank as a batch one or more times a day. Of course these approaches are exemplary and in other embodiments, other approaches may be used.

In the exemplary system the at least one computer 606 associated with the item processing, is also operative in connection with carrying out image based check presentment in connection with checks that are received and that are drawn on banks other than the bank of first deposit, which in this case is bank 586. In an exemplary embodiment the at least one computer 606 is operative to collect checks that are drawn on other banks and organize them as image cash letters which are a collection of check images and check data for checks drawn on a particular maker bank. In some cases the image cash letter will be associated with one particular bank of first deposit. Alternatively if the check image processor is operating a service bureau, it may be possible to combine checks associated with numerous banks of first deposit into an image cash letter that is to be routed to a particular maker bank with the funds selectively dispersed among the different banks of first deposit, when the funds associated with those checks is paid to the service bureau. Of course these approaches are examples.

As previously discussed, generally image cash letters will be routed to the maker banks upon which the checks are drawn via the Federal Reserve or a clearinghouse. The funds that are payable to the bank of first deposit in connection with the image cash letters will be credited by the Federal Reserve or the clearinghouse to the bank of first deposit. This will be done in connection with balancing accounts between the different financial institutions upon which checks are written. The Federal Reserve or clearinghouse may then operate to credit the account of the bank of first deposit as is appropriate for the checks which were presented. Further in the exemplary embodiment the at least one computer associated with the item processing may also prepare the associated accounting records to indicate the various accounts and amounts involved in the check transactions and provide records to the bank concerning the crediting of accounts.

It should be understood that in the exemplary embodiment the at least one computer 606 associated with item processing may also perform other functions. This may include, for example, receiving information regarding returned checks that are dishonored upon presentment to the maker bank. This information may be provided to the bank of first deposit so that the account of the person making the check deposit has the amount of the check not credited thereto or if a provisional credit has been made, deducted therefrom. Further in some exemplary embodiments the at least one computer associated with item processing may also operate to process in clearing items. This may include receiving image cash letters and check images from the Federal Reserve or an automated clearinghouse that correspond to checks drawn on bank 586 as the maker bank, and which are deposited in other banks which are the bank of first deposit for those checks. The at least one computer 606 may process the in clearing items to determine that the amounts can be paid and to prepare accounting files that make the appropriate deductions from the particular accounts. Further the at least one computer 606 may also process any return items that are dishonored when presented. Further in some embodiments the at least one computer 606 may also process the data necessary for preparation of statements related to accounts held at the bank 586. This may include, for example, preparing statements that include image data that show the particular checks and amounts that are drawn on the bank accounts of customers of bank 586. Further the one or more computers associated with the item processing system may perform other functions as well, depending on the nature of the particular system.

As can be appreciated, the operation of the exemplary system 586 enables check related deposit transactions and/or check cashing transactions to be carried out at automated banking machines that do not include a check imager. Thus the automated banking machines may be lower cost devices that are commonly employed when checks are to be received. However, it should be understood that while the operation of the system has been described in connection with automated banking machines that do not include a check imager, the same principles may be applied to automated banking machines that include check imagers and other devices therein for processing checks. Further, while the exemplary system has been described in connection with automated banking machines that dispense cash, it should be understood that the system may also be employed in connection with automated banking machines that do not dispense cash and/or that perform other functions. This may include, for example, machines at which users can make payments for goods and/or services. This may include, for example, machines that dispense tickets, scrip or other items. Further, such principles may be used in connection with automated banking machines that are operative to load value into digital wallets, phone accounts, stored value accounts or other similar accounts which contain value which may be utilized by a particular user. The principles described may also be applied to numerous other types of systems.

Figure 40:
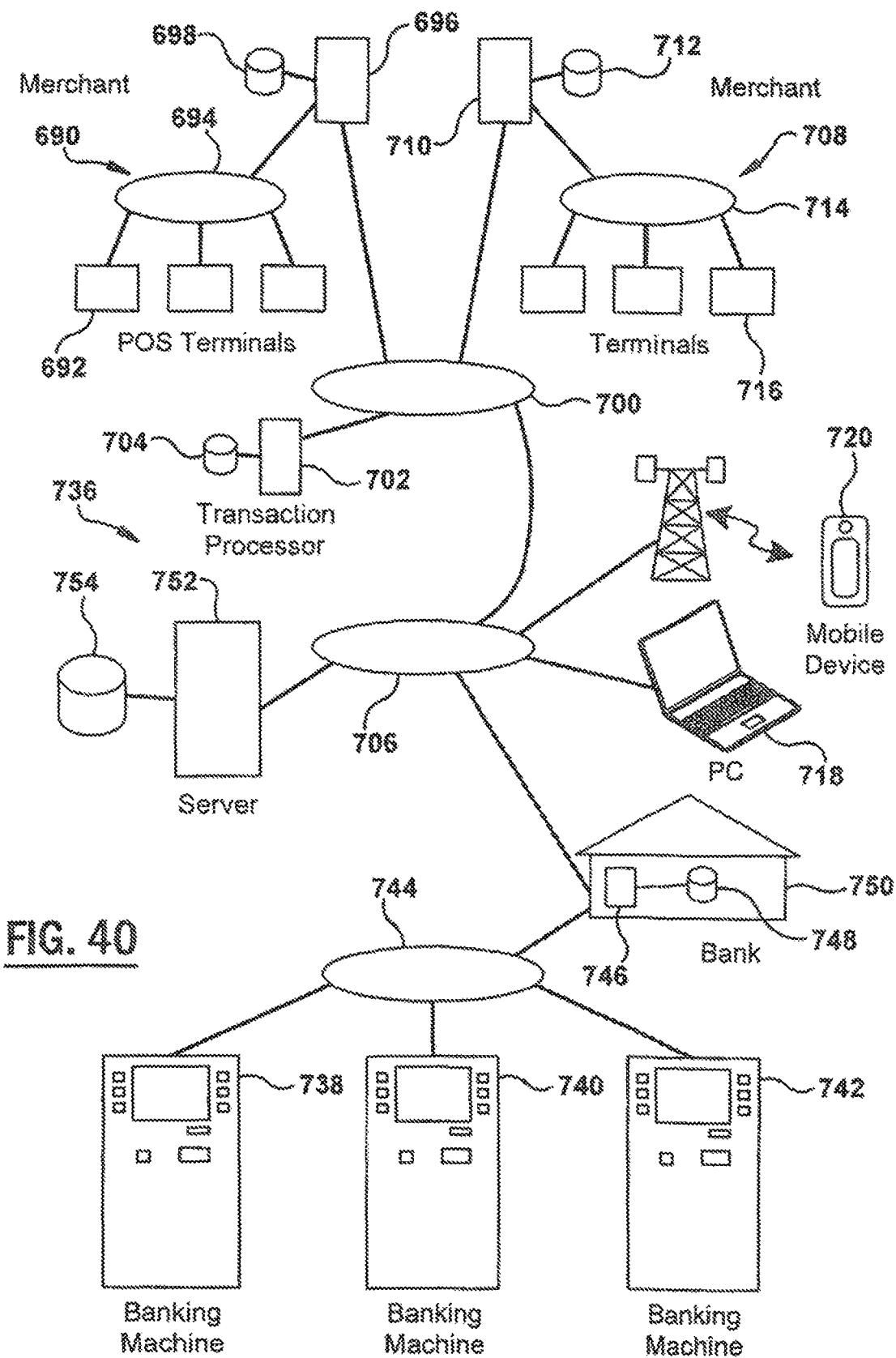
FIG. 40 is a schematic view of an alternative automated banking machine system.

A further alternative transaction system is schematically represented in FIG. 40. This particular system generally indicated 736 enables the user to associate a data bearing record such as a debit card or a credit card that can be used for conducting transactions at an automated banking machine, with data corresponding to a particular merchant's customer affinity program. Such affinity programs are sometimes referred to as reward or loyalty programs, are commonly offered by different merchants to give their customers discounts, promotions or other incentives and benefits in exchange for making purchases of goods or services from the particular merchant. Thus in the exemplary embodiment once a data bearing record such as a particular transaction card is linked to the particular merchant's affinity program, the user may receive the benefits associated with the affinity program whenever they use the particular card in connection with acquiring goods or services of that merchant. In addition the user may receive advertisements, promotional items, coupons, notices or other useful information in conducting transactions in connection with automated banking machines using the card that is linked to the particular merchant affinity program.

In the exemplary embodiment system 670 includes a plurality of automated banking machines such as machine 738, 740 and 744. These automated banking machines may be machines of the type previously described that are usable in connection with carrying out cash dispensing transactions or other types of transactions that include automated transfers of value. The automated banking machines are in operative connection with at least one network 744. The at least one network is in operative connection with the at least one host computer 746 which is in operative connection with at least one data store 748. In the exemplary embodiment the at least one computer 746 is in operative connection with a financial institution schematically represented as bank 750. The at least one computer 746 may be operative to enable transactions such as cash dispensing, check deposit, cash acceptance, envelope deposit or other transactions at the automated banking machines in the manner previously discussed or referred to. Of course these particular approaches are exemplary and in other embodiments, other approaches may be used.

In the exemplary embodiment the automated banking machines are in operative connection with at least one computer 752. Computer 752 is in operative connection with at least one data store 754. In the exemplary embodiment the at least one computer 752 is operative to cause promotional offers and other messages to be output selectively through the automated banking machines 738, 740 and 742 during transactions. This may be done in the manner described in U.S. Pat. No. 7,516,087 the disclosure of which is incorporated herein by reference in its entirety. Of course alternative approaches may be utilized as well. In this particular exemplary embodiment the at least one computer 752 is operative to present promotional offers including offers for discounts, incentives or other offers to users during transactions at the automated banking machines based on the user identifying data presented by the user at the machine. This identifying data may include, for example, the information read from the user's card. The at least one computer 752 may also be operative to provide promotional items directly from the machines such as through the printing of coupons, vouchers, tickets or other items. Further in the exemplary embodiment the at least one computer 752 is operative to cause the output of messages that enable a user to provide inputs which indicate the acceptance of promotional offers, offers for sale, offers for other benefits or other things which are accepted by users through inputs to the automated banking machines.

As schematically represented in FIG. 40, a first merchant system 690 is associated with a first merchant. The first merchant system may be operated by a merchant who provides goods or services to customers. The first merchant system includes a plurality of point of sale terminals 692 through which purchasers from the merchant may make payment using data bearing records such as a credit or debit card. Point of sale terminals 692 are in operative connection with a merchant network 694 operated by the merchant that is connected to one or more merchant computers 696. The merchant computers 696 are in operative connection with one or more data stores 698. The merchant computer systems may be operative in exemplary embodiments to store data including price data associated with particular items, transaction data, inventory data and other data that is useful to the merchant in carrying out their business. In addition in exemplary embodiments, the merchant computers 696 are operative to process and store the data corresponding to particular customers who are participants in customer affinity programs operated by the merchant. This may include, for example, information about particular individuals who are entitled to additional discounts, promotional offers, credits, rebates or other benefits in connection with their purchases from the merchant. In exemplary embodiments these customers may be identified via particular codes or other data that can be represented through indicia such as a bar code, an RFID tag or other identifier on an article that is provided by a merchant to the user. The data from this article may be presented by the user in the time of making a purchase transaction from the merchant to identify themselves as the particular member of the affinity program, so that they can get the benefits the merchant provides. Further this enables the merchant to track the purchases being made by the particular user so that they can then provide targeted promotional messages and the like to the user based on the user's buying habits, patterns and other information.

In the exemplary embodiment the one or more merchant computers 696 also enable conducting purchase transactions by communicating through a transaction processing network 700 with one or more transaction processors. Such a transaction processor is represented by one or more computers 702 which are in operative connection with one or more data stores 704. In the exemplary embodiment the one or more computers 702 associated with the transaction processor have accessible thereto data concerning whether particular accounts are authorized to conduct particular transactions and the permissible limits associated with such transactions. This may include, for example, the transaction processor having information concerning credit or debit cards that are authorized to conduct transactions and the limits that are available concerning such transactions. Further in other embodiments the transaction processor may have access to data that is the same or generally up to date that is maintained in connection with an account of a user as maintained by the bank that holds the account. This may be done for example by periodically (such as daily, hourly, etc.) updating debit card account data, stored in connection with computer 746 and bank 750 through one or more networks 706. In this way the transaction processor may have access to data regarding accounts that is generally a mirror image of the account data for the particular account that is retained by the bank.

In the exemplary embodiment the at least one transaction processor computer 702 operates in accordance with its programming to either authorize or deny a transaction on each account as it is presented from the merchant system. The at least one computer 696 of the merchant operates to either allow or prevent the transaction based on the information from the transaction processor. In addition the at least one computer 696 of the merchant is also operative to store the data regarding the particular user and each of their transactions in connection with the user identifier for the affinity program and other data maintained by the merchant.

In the exemplary embodiment a further merchant system 708 is also shown schematically. Merchant system 708 is also associated with a particular merchant. This merchant operates to accept sales transactions through the merchant system which includes at least one merchant computer 710 and at least one data store 712. The exemplary merchant system further includes at least one merchant network 714. The merchant system 708 is operative to receive and carry out purchase transactions through terminals 716. In this exemplary embodiment the terminals 716 may include point of sale terminals such as those previously discussed. Alternatively or in addition, terminal 716 may include online terminals including, for example, user owned terminals which can be operated to carry out transactions. This might include terminal devices such as home PCs, tablet computers, mobile devices or other devices through which consumers can present purchase transactions.

As described in connection with merchant system 690 the at least one computer 710 may be operative to hold affinity data including the particular affinity identification data associated with particular users. The at least one merchant computer 710 is also operative to communicate with the one or more transaction processors for purposes of authorizing credit or debit transactions which are requested through the various terminals.

Of course it should be understood that these approaches are exemplary and are somewhat simplified from those actually used in practice. This is described in this manner herein for purposes of brevity in describing the system features herein.

In the exemplary embodiment the user is enabled to selectively link one or more of their accounts to one or more affinity programs. This may be done through the auspices of the account holder's bank or through a service bureau or other entity that provides the service that enables the user to obtain the benefits associated with the applicable affinity program whenever they use a particular account to make purchases from a merchant that has been linked by the user to the particular merchant's affinity program.

Figure 41:
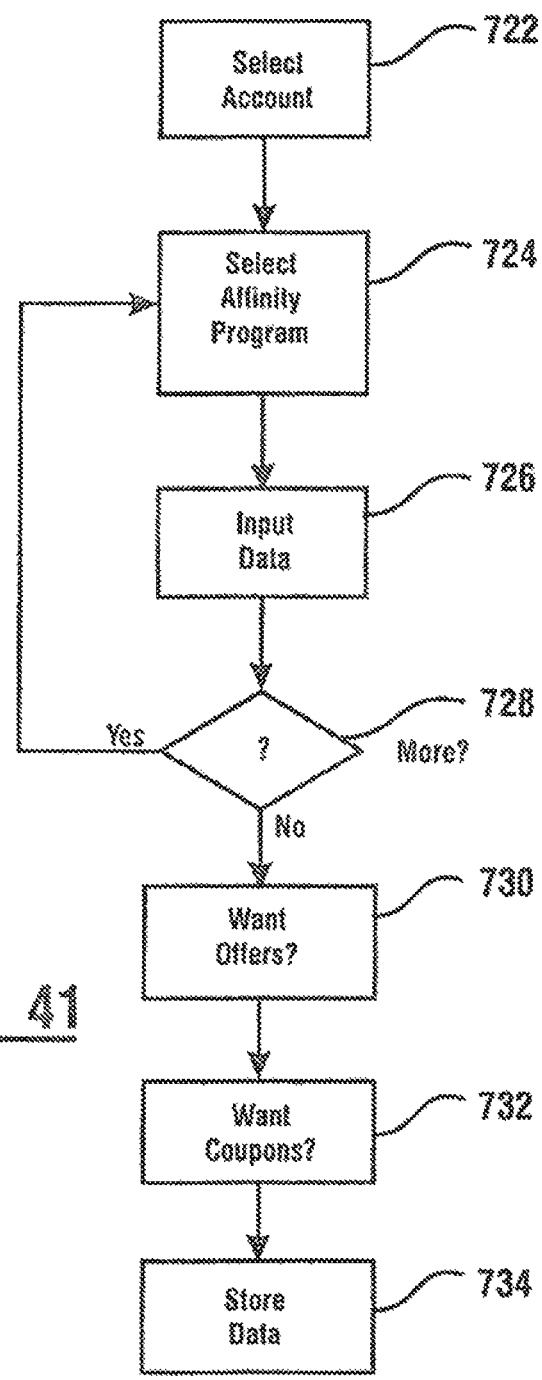
FIG. 41 is a flow chart showing a schematic view of logic carried out in connection with a portable wireless device or other computing device used in connection with the system shown in FIG. 40.

In an exemplary embodiment the user is enabled to associate such a account with an affinity program using a computing device associated with the user. This may include for example the user's PC indicated 718 or a mobile device such as a smart phone indicated 720. In an exemplary embodiment one or more computers associated with a bank such as bank 750 provides a user interface which can be accessed by a user so as to associate their particular accounts and the credit or debit cards associated therewith with selected merchant affinity programs have authorized the bank or other account holding entity to provide such associations. FIG. 41 shows schematically the logic flow associated with associating such account data with particular affinity programs. In connection with this logic flow, the bank may operate a secure web site or other portal which enables the user to securely connect to account data associated with their various accounts. This might include, for example, a credit card account associated with a card issued by the bank as well as a debit card account associated with an account held with the bank. Through an appropriate secure system, a user may be presented through their computing device with a selectable menu of outputs which identify their particular accounts. This is represented by a step 722. After selecting the particular account, the user may be presented in the exemplary embodiment with a menu of available affinity programs with which the user can associate their particular account. The user may then provide inputs so as to select a particular affinity program of a merchant with which to associate the particular account. This is represented in a step 724. The user then provides one or more inputs so as to cause an association which is operative to link the particular selected account with the particular affinity program in one or more databases such as database 748 associated with the at least one computer 746 of the merchant's bank. This is represented in a step 726.

In the exemplary embodiment the user interface provided through the user's PC, mobile device or other device is then operative to prompt the user as to whether they wish to create more associations linking particular accounts with particular affinity programs. This is represented in a step 728. If the user wishes to link additional accounts and/or already selected accounts to additional affinity programs, the user can repeat steps 722 through 726 as often as desired to link their respective debit and credit card accounts to particular merchant affinity programs.

Further in exemplary embodiments the user is also given the opportunity to select particular promotional items and activities which they wish to receive or in which they wish to participate. For example in a step 730 the user may be queried concerning whether they want promotional offers and the type and character of promotional offers they wish to receive in connection with the linking of their account to the affinity program. This might include, for example, selections indicating whether the user wishes to be notified of particular discounts, sales, contests, free giveaways or other items that are being offered by the particular merchant. The nature of the information presented and which the user can select will depend on the character of the particular merchant. In addition, in some cases the user may be given the option of receiving information concerning coupons or other similar items that the merchant offers in connection with their particular affinity program. This is represented in a step 732. Of course it should be understood that other or additional types of queries and responses may be solicited from the user in connection with the particular merchants and affinity programs which are selected and linked to the user's accounts. Upon the conclusion of the input data which is operative to link particular accounts to affinity programs. Thus, the data corresponding to the user inputs is stored in at least one data store. This is represented by a step 734. This data corresponding to the association of the user's accounts with the particular affinity programs and the user selections in connection therewith are then communicated and distributed through operation of one or more computers to the appropriate other computers connected in the system. This may include, for example, communication of the data to the one or more computers 796 and 710 operated by respective merchants. This may also include sending the data to the one or more computers 752 and also to one or more bank computers and/or other computers that utilize the information concerning the association of the user accounts and the particular affinity programs.

This data may be used, for example, so that when the user utilizes their card or other data bearing records, that includes their account data in connection with making a purchase from a merchant the user account data automatically indicates a user is a member of the merchant's affinity program. The at least one computer of the merchant links the account data to the data corresponding to the user identifier, the other data associated with the user that is stored in connection with the affinity program. This may include for example, the user receiving discounts, free items or other benefits automatically from the particular merchant without having to provide a separate user identifier specific to the merchant. Similarly in cases where purchases are made online using the account data, linking the user account data to an affinity program would be recognized by the at least one merchant computer as associated with the particular member of the merchant's affinity program. At least one computer operates to correlate the user's affinity data with the merchant to the transaction, so that the user receives the corresponding benefits.

Further in exemplary embodiments the at least one merchant computer may also operate to provide the user with additional benefits to protect account data or other things in connection with transactions. This might be done for example by utilizing the linkage between the merchant's affinity identifier for the particular customer to account data for the customer. Such linkage data may enable the user to make online purchases or to conduct other transactions using their affinity program identifying number, which the merchant can correlate to the user's account data through data the merchant has securely stored in its computers. Thus, for example, in connection with making online purchases a user can avoid transmitting their credit or debit account information through a network and instead may utilize their affinity information which may be of no value to criminals in the event that it is intercepted. Thus for example the consumer may utilize their affinity data for making purchases in lieu of account data, and a merchant may then have the account data for purposes of authorizing a transaction.

Further in some exemplary embodiments the merchants may utilize the data provided by the consumer for purposes of communicating to the consumer at various computer devices associated with the consumer such as their mobile devices and PCs. Such communications may relate to opportunities for the particular consumer to obtain benefits from the merchants. In addition, the at least one computer 752 may also include the data that associates the account data that can be read from a card at an automated banking machine, with the identifying data of the user for the particular merchant affinity programs. This data is stored in one or more databases in connection with the at least one computer 752. The at least one computer 752 also stores data corresponding to the promotional offers, sales opportunities and to other promotions that the merchants offer in connection with their affinity program.

In the exemplary embodiment the at least one computer 752 or other computers are operative to present through the automated banking machine such promotional offers and transaction messages as may be associated with the particular affinity programs. Thus for example in the situation where a user presents their user card or other data bearing record at an automated banking machine for purposes of making a cash withdrawal transaction, the at least one computer 752 receives the information concerning the card data and/or the user, and is operative to determine the affinity programs with which the user is associated. The at least one computer 752 is also operative to determine such promotional offers or other presentations that are appropriate based on the user's selections that should be presented to the user through the automated banking machine during the transaction. This may include, for example, offers to receive discounts on particular items if they are purchased from the merchant. Such offers may be presented through the interface of the automated banking machine, and the user can then provide inputs selecting to receive or decline such offers.

In cases where the user elects to select the offer, the data corresponding thereto is stored in the at least one data store 754. Thereafter the data corresponding to the selected item by the consumer is communicated to the merchant computer associated with the particular merchant. Thus, for example, if the promotional item is a discount on a purchase of a particular item from the merchant, this data is stored in connection with the particular merchant computer. Thereafter when the consumer utilizes their account in connection with a merchant transaction, the merchant computer is automatically able to associate the information regarding the discount the consumer is entitled to receive when they purchase the particular item, with the user's item purchase. As a result the user automatically receives the discount. Of course this approach is exemplary and in other embodiments other types of promotions and features might be used.

Likewise the at least one computer 752 may be operative to offer the user coupons, tickets, electronic value or other things that the user can receive directly at the machine. In such cases the at least one computer may be operative to cause outputs from the automated banking machine to deliver such items to the user. This may include for example the printing of a coupon or ticket that the user can then take and redeem to receive the benefit described. Alternatively the at least one computer 752 may operate to cause a transfer of value such as to an electronic wallet or to a stored value account. Such items are delivered to the at least one output device such as a machine. Such an output device may include a wireless port that is operative to deliver stored value or other data corresponding to a value to the user's portable device such as a smart phone. Such data that the user may be able to redeem through transactions with the merchant is communicated to the merchant computer system so that the user can take advantage of the particular benefit.

In alternative embodiments the at least one computer 752 may be operative to provide a user with information concerning the status of their affinity accounts. This might be done for example in response to inputs during a transaction at an automated banking machine. Alternatively or in addition such data could be delivered through a public or a private network to the computing devices associated with a user such as their mobile device, PC or other device.

As can be appreciated the exemplary system enables a user to receive the benefit of affinity programs with selected merchants without the need to provide to the merchant in connection with a particular transaction, a separate purchaser identifier that is associated with the merchant affinity program. Instead the user can use their linked account for purposes of transactions and receive all of the benefits of the affinity program. In addition in some exemplary embodiments, selected benefits such as coupons, discounts or other things that a user has selected via an automated banking machine or other ways, can be linked and stored in the at least one merchant computer so that the user can automatically receive the benefit thereof at the time of their transaction. Further in still other embodiments such a system may enable the user to use a less sensitive identifier such as an affinity program identifier for purposes of carrying out online transactions instead of transmitting data that universally identifies their account. This may provide the user with enhanced security against criminal attacks and theft of their account data.

Of course it should be appreciated that these particular approaches are exemplary and numerous other arrangements, transactions and systems may be carried out by employing the principles described herein.

While certain exemplary embodiments previously described enable a user of the mobile device the capability to conduct or authorize transactions, other embodiments may include additional features which provide capabilities for conducting transactions via mobile devices. These may include features described in connection with the following U.S. patents, each of which is incorporated herein by reference in its entirety: U.S. Pat. Nos. 8,191,767; 8,186,578; 8,177,126; 8,172,130; 8,146,803; 8,146,802; 8,127,983; 8,104,676; 8,091,778; 8,070,055; 8,052,050; 8,033,456; 8,011,575; 7,992,778; 7,992,777; 7,992,776; 7,959,077; 7,946,480; 7,946,477; 7,896,235; 7,874,479; 7,850,073; 7,712,656; 7,686,213; 7,657,473; 7,638,448; 7,555,461; 7,537,154; 7,490,758; 7,461,779; 7,445,155; 7,445,146; 7,418,427; 7,392,938; 7,344,066; 7,216,800; 7,207,477; 7,201,313; 7,150,393; 7,040,533; 7,025,256; 6,905,072; 6,796,490; 155 6,702,181; and 6,315,195. All of these patents are owned by the assignee of the present invention.

Thus, the features and characteristics of the embodiments previously described achieve desirable results, eliminate difficulties encountered in the use of prior devices and systems, solve problems and attain one or more of the objectives stated above.

In the foregoing description certain terms have been used for brevity, clarity and understanding, however no unnecessary limitations are to be implied therefrom because such terms are for descriptive purposes and are intended to be broadly construed. Moreover, the descriptions and illustrations given herein are by way of examples and the invention is not limited to the exact details shown and described.

In the following claims any feature described as a means for performing a function shall be construed as encompassing any means known to those skilled in the art capable of performing the recited function, and shall not be deemed limited to the particular means shown in the foregoing description or mere equivalents thereof.

Having described the features, discoveries and principals of the invention, the manner in which it is constructed, operated, and utilized, and the advantages and useful results attained; the new and useful structures, devices, elements, arrangements, parts, combinations, systems, equipment, operations, methods, processes, and relationships are set forth in the appended claims.

The invention claimed is:

1. An apparatus, comprising:
a processor coupled with a first network and a second network;
the processor is operable to receive from a mobile device coupled with the first network data representative of an image of a check;
the processor is operable to determine an account the check is drawn on from the data representative of an image of a check;
the processor is operable to determine an amount of the check from the data representative of an image of a check;
the processor is operable to generate code data that uniquely identifies the check;
the processor operable to send the code data to the mobile device via the first network;
the processor is operable to receive a check cashing request from an automated banking machine without a check imager that is coupled with the second network, the check cashing request comprises data representative of code data provided by the mobile device to the automated banking machine;
the processor is operable to correlate the code data provided by the mobile device with the code data that was sent to the mobile device; and
the processor is operable to authorize a check cashing transaction responsive to the code data provided by the mobile device via the second network correlating to the code data sent to the mobile device via the first network.

2. The apparatus set forth in claim 1, wherein the code data comprises data representative of a bar code image.

3. The apparatus set forth in claim 2, wherein the bar code image is a two dimensional bar code.

4. The apparatus set forth in claim 1, wherein the check cashing transaction further comprises data representative of an amount of the check; and
the processor is further operable to verify the data representative of the amount of the check in the check cashing transaction matches the amount determined from the image of the check.

5. The apparatus set forth in claim 1, the processor is operable to cause the account the check is drawn on to be debited for the amount of the check responsive to determining the amount of the check from the data representative of the image of the check.

6. The apparatus set forth in claim 1, the processor is operable to cause the account the check is drawn on to be debited for the amount of the check responsive to the code data provided by the mobile device via the second network correlating to the code data sent to the mobile device via the first network.

7. The apparatus set forth in claim 1, the processor is further operable to analyze the data representative of the check image to determine whether the check is an original document.

8. The apparatus set forth in claim 1, the processor is further operable to analyze the data representative of the check image to determine whether the check is a copy.

9. The apparatus set forth in claim 1, the processor is further operable to analyze the data representative of the check image to determine whether a signature on the check is valid.

10. A tangible, non-transitory computer readable medium of instructions with instructions encoded thereon for execution by a processor, and when executed operable to:
receive from a mobile device coupled with a first network data representative of an image of a check;
determine an account the check is drawn on from the data representative of an image of a check;
determine an amount of the check from the data representative of an image of a check;
generate code data that uniquely identifies the check;
send the code data to the mobile device via the first network;
receive a check cashing request from an automated banking machine that does not have a check imager coupled with a second network, the check cashing request comprises data representative of code data provided by the mobile device to the automated banking machine but does not include check image data;
correlate the code data provided by the mobile device with the code data that was sent to the mobile device; and
authorize a check cashing transaction responsive to the code data provided by the mobile device via the second network correlating to the code data sent to the mobile device via the first network.

11. The computer readable medium of instructions set forth in claim 10, wherein the code data comprises data representative of a bar code image.

12. The computer readable medium of instructions set forth in claim 11, wherein the bar code image is a two dimensional bar code.

13. The computer readable medium of instructions set forth in claim 10, wherein the check cashing transaction further comprises data representative of an amount of the check; and
the instructions are further operable to verify the data representative of the amount of the check in the check cashing transaction matches the amount determined from the image of the check.

14. The computer readable medium of instructions set forth in claim 10, further operable to cause the account the check is drawn on to be debited for the amount of the check responsive to determining the amount of the check from the data representative of the image of the check.

15. The computer readable medium of instructions set forth in claim 10, the instructions are further operable to cause the account the check is drawn on to be debited for the amount of the check responsive to the code data provided by the mobile device via the second network correlating to the code data sent to the mobile device via the first network.

16. The computer readable medium of instructions set forth in claim 10, the instructions are further operable to analyze the data representative of the check image to determine whether the check is an original document.

17. The computer readable medium of instructions set forth in claim 10, the instructions are further operable to analyze the data representative of the check image to determine whether the check is a copy.

18. The computer readable medium of instructions set forth in claim 10, the instructions are further operable to analyze the data representative of the check image to determine whether a signature on the check is valid.

19. A method, comprising:
receiving from a mobile device coupled with a first network data representative of an image of a check;
determining an account the check is drawn on from the data representative of an image of a check;
determining an amount of the check from the data representative of an image of a check;
generating code data that uniquely identifies the check;
sending the code data to the mobile device via the first network;
receiving a check cashing request from an automated banking machine that does not have a check imager that is coupled with a second network, the check cashing request comprises data representative of code data that does not include image data provided by the mobile device to the automated banking machine;
correlating the code data provided by the mobile device with the code data that was sent to the mobile device; and
authorizing, by a processor, a check cashing transaction responsive to the code data provided by the mobile device via the second network correlating to the code data sent to the mobile device via the first network.

20. The method set forth in claim 19, the code data comprises coded image data that uniquely identifies the check.

* * * * *